US007610546B1

(12) United States Patent
Nagao et al.

(10) Patent No.: US 7,610,546 B1
(45) Date of Patent: Oct. 27, 2009

(54) DOCUMENT PROCESSING APPARATUS HAVING CAPABILITY OF CONTROLLING VIDEO DATA

(75) Inventors: Katashi Nagao, Tokyo (JP); Kazuyuki Marukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 989 days.

(21) Appl. No.: 09/624,580

(22) Filed: Jul. 24, 2000

(30) Foreign Application Priority Data

Aug. 2, 1999 (JP) ................................ P11-218652

(51) Int. Cl.
*G06N 3/00* (2006.01)

(52) U.S. Cl. ....................................................... 715/203

(58) Field of Classification Search .............. 715/500.1, 715/501.1, 516, 513, 517, 523, 530, 234, 715/243, 254, 203; 707/103 R; 709/204, 709/218; 345/800, 302
See application file for complete search history.

(56) References Cited

U.S. PATENT DOCUMENTS 4,864,502 A 9/1989 Kucera et al. ............... 364/419
5,077,668 A 12/1991 Doi ............................ 364/419
5,185,698 A 2/1993 Hesse et al. ................. 364/419
5,384,703 A 1/1995 Withgott et al. ......... 364/419.19
5,475,811 A * 12/1995 Neumann et al. ........... 345/473
5,546,520 A * 8/1996 Cline et al. ................. 345/800
5,572,643 A * 11/1996 Judson ........................ 709/218
5,598,557 A * 1/1997 Doner et al. ................... 707/5
5,675,710 A 10/1997 Lewis .......................... 395/10
5,708,825 A * 1/1998 Sotomayor ............... 715/501.1
5,854,624 A * 12/1998 Grant ......................... 345/169
5,915,091 A * 6/1999 Ludwig et al. .............. 709/204
5,950,163 A * 9/1999 Matsumoto ................. 704/260
5,953,056 A * 9/1999 Tucker ........................ 348/157
5,963,203 A * 10/1999 Goldberg et al. ............ 345/723
6,021,418 A * 2/2000 Brandt et al. ............... 715/516
6,088,702 A * 7/2000 Plantz et al. ............ 707/103 R
6,115,035 A * 9/2000 Compton et al. ............ 715/717
6,199,042 B1 * 3/2001 Kurzweil .................... 704/260
6,278,446 B1 * 8/2001 Liou et al. .................. 715/700
6,317,708 B1 * 11/2001 Witbrock et al. ............... 704/9

(Continued)

FOREIGN PATENT DOCUMENTS

JP 59-197926 11/1984

(Continued)

OTHER PUBLICATIONS

Technology Finder, Nikkel Multimedia, Dec. 1997, pp. 98-103.
Article from The Journal of the Institute of Electronics, Information and Communication Engineers, vol. 82, No. 4, pp. 346-355.

*Primary Examiner*—Kyle R Stork
(74) *Attorney, Agent, or Firm*—K & L Gates LLP

(57) ABSTRACT

A document processing apparatus is disclosed that has a capability of outputting video data related to document data. When electronic document data including information (video tag) specifying video data is input, video data related to that electronic document data is detected. The video data related to the electronic document data is output in synchronization with or independently of the output of the electronic document data thereby presenting to a user not only the document but also the video data related to the document.

43 Claims, 53 Drawing Sheets

U.S. PATENT DOCUMENTS

| | | | | |
|---|---|---|---|---|
| 6,369,835 | B1 * | 4/2002 | Lin | 715/726 |
| 6,430,357 | B1 * | 8/2002 | Orr | 386/69 |
| 6,452,612 | B1 * | 9/2002 | Holtz et al. | 715/723 |
| 6,532,218 | B1 * | 3/2003 | Shaffer et al. | 370/260 |
| 6,567,980 | B1 * | 5/2003 | Jain et al. | 725/61 |
| 6,636,245 | B1 * | 10/2003 | Estipona | 345/790 |
| 6,636,888 | B1 * | 10/2003 | Bookspan et al. | 709/203 |
| 6,738,075 | B1 * | 5/2004 | Torres et al. | 715/723 |

FOREIGN PATENT DOCUMENTS

| | | |
|---|---|---|
| JP | 02-002598 | 1/1990 |
| JP | 10-021029 | 1/1998 |
| JP | 10-274997 | 10/1998 |
| JP | 11-045289 | 2/1999 |
| WO | 99/22563 | 5/1999 |

* cited by examiner

FIG. 11A

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| INDEX | ID x 1<br>ID x 7<br>ID x 13<br>ID x 15 | ID x 2<br>ID x 8 | ID x 3<br>ID x 9<br>ID x 14 | ID x 4<br>ID x 10 | ID x 5<br>ID x 11 | ID x 6<br>ID x 12 |

FIG. 11B

| DATE AND TIME OF UPDATING | 1999 : 12 : 10 : 19 : 56 : 10 | | | | | |
|---|---|---|---|---|---|---|
| CATEGORY | SPORT | COMPANY | COMPUTER | PLANT | ART | EVENT |
| PROPER NOUN | MR. A<br>.... | B COMPANY<br>.... | C COMPANY<br>G COMPANY<br>.... | D SPECIES<br>.... | MR. E<br>.... | MR. F<br>.... |
| WORD SENSE | BASEBALL (4546)<br>GROUND (2343)<br>.... | LABOR (3112)<br>EMPLOYMENT (9821)<br>.... | MOBILE (2102)<br>.... | CHERRY-1 (1111)<br>ORANGE-1 (9911)<br>.... | CHERRY-2 (1112)<br>ORANGE-2 (9912)<br>.... | CHERRY-3 (1113)<br>.... |
| | | | | | | |
| DOCUMENT ADDRESS | SP1<br>SP2<br>SP3<br>... | SO1<br>SO2<br>SO3<br>... | CO1<br>CO2<br>CO3<br>... | PL1<br>PL2<br>PL3<br>... | AR1<br>AR2<br>AR3<br>... | EV1<br>EV2<br>EV3<br>... |

| | COMPUTER | TELEVISION | |
|---|---|---|---|
| COMPUTER | | 0.55 | |
| TELEVISION | 0.55 | | |
| VTR | 0.25 | 0.60 | |
| | | | |

FIG. 18A

<document><head><sentence>[<noun phrase><adjective phrase: word sense = "3cf072"> 素敵に </adjective phrase><noun: identifier = "a200"> エイジング </noun></noun phrase>/8</sentence><sentence><verb phrase: identifier = "a876"><adverb phrase: relation = "object"><noun phrase: identifier = "a1000"; relation = "subject"; word sense = "3be2c7> ガン </noun phrase><noun: identifier= "a8"; word sense = "Off5e7"> 転移 </noun><adverb phrase> 抑え </verb phrase> られる！？ </sentence></head>

FIG. 18B

<paragraph><sentence><adverb phrase: relation = "subject"><noun phrase: corefernce = "a89"> この転移 </noun phrase>, </adverb phrase><adverb phrase: relation = "condition"><adverb phrase: relation = "subject"><noun phrase: identifier = "a15"><noun phrase: coreference = "a1"; relation = "essentail"; word sense = "3be2c7"> がん </noun phrase><noun; word sense = "0f2e4c"> 細胞 </noun></noun phrase> が <adverb phrase> 増えるだけでは </adverb phrase> 発生しない。
</sentence><sentence><adverb phrase: relation = "subject"><noun phrase: identifier = "a18">: coreference = "a15"><noun phrase: coreference = "a1"; relation = "essential"> がん </noun phrase><noun: word sense = "0f2e4c"> 細胞 </noun></noun phrase> が </adverb phrase><adverb phrase: relation = "means"><adverb phrase: relation = "means"><adverb phrase: relation = "object"><noun phrase: identifier = "a12"><adverb phrase: relation = "underfined"><adverb phrase: relation = "indirect object"><adverb phrase: relation = "place"><noun phrase: syntax = "parallel"><noun phrase: word sense = "0f2e4c"> 細胞 </noun phrase> と <noun phrase: word sense = "0f2e4c"> 細胞 </noun phrase></noun phrase> の </adverb phrase> 間に </adverb phrase> ある </adverb phrase> <noun phrase><noun: syntax = "backward dependency"> 蛋白 <exception: relation = "underfined"; pronunciation = "null"> （たんぱく） </exception> </noun> 質 </noun phrase> などを </adverb phrase> 溶かし、</adverb phrase><adverb phrase: relation = "object"><verb phrase: relation = "underfined"><adverb phrase: relation = "subject"><noun phrase: coreference = "a18"; word sense = "0f6fa3"> 自分 </noun phrase> の </advereb phrase> 進む </verb phrase> 道を </adverb phrase> つくって、</adverb phrase><adverb phrase: relation = "indirect object"><noun phrase: identifier = "a33"; syntax = "parallel"><noun phrase; word sense = "0ef4e6" > 血管 </noun phrase> や <noun phrase: pronunciation = " りんぱかん "> リンパ管 </noun phrase></noun phrase> に </adverb phrase> 入り込む。
</sentence><sentence: identifier = "a16"><adverb phrase: relation = " 主語 "><verb phrase: relation = "content"><adverb phrase: relation = "object"><noun phrase><adverb phrase: relation = "content"><adverb phrase><adverb phrase> 循環しながら </adverb phrase><verb><verb phrase: relation = "underfined"><adverb phrase: relation = "object"><noun phrase: identifier = "a69"> 新たな "<noun: pronounciation = " すみか "> 住み家 </noun>"</noun phrase> を </adverb phrase> 探して </verb phrase> 潜り込む、</verb></adverb phrase> といった </adverb phrase><adjective phrase: relation = "underfined"; word sense = "3ce6b4"> 複雑な </adjective phrase> 動き </noun phrase> を </adverb phrase> する </verb phrase> ことが、</adverb phrase><noun phrase: relation = "time"> 近年 </noun phrase> 解明されつつある。</sentence></paragraph></document>

EXAMPLE 1

EXAMPLE 2

EXAMPLE 3

FIG. 19

```
<document><sentence><adverb phrase: relation="time">During<noun phrase:
relation="essential"><adverb phrase: coreference="wsj">its</adverb phrase><adjective
phrase>centennial</adjective phrase>year</noun phrase>,</adverb  phrase><proper
noun phrase: identifier="wsj"relation="subject">The Wall Street Journal</proper noun phrase>
will report<noun phrase: relation="object">events>adverb phrase>of<noun phrase>the past
century</noun phrase></adverb phrase><complementary sentence><noun phrase>that</noun
phrase>stand<adverb phrase: relation="essential">as<noun phrase>milestones<adverb phrase>
of<noun phrase>American business history</noun phrase></adverb phrase></noun phrase>
</adverb phrase></complementary sentence></noun phrase>.</sentence><sentence><noun
phrase: coreference="a3" relation="subject"><cardinal number phrase: type="integer"; value="3";
relation="essential">THREE</cardinal number phrase>COMPUTERS<complementary
sentence>THAT  CHANGED<noun phrase: relation="object">the face<adverb phrase>of<noun
phrase>personal computing</noun phrase></adverb phrase></noun phrase></complementary
sentence></noun phrase>were launched<adverb phrase: relation="time">in<date phrase
identifier="a1977">1977</date phrase></adverb phrase></sentence><sentence><date phrase>
That year</date phrase><proper noun phrase: identifier="a3;syntax="parallel"; relation=
"subject">the<proper noun phrase: identifier="a2">Apple<noun phrase: pronunciation="two">
II</noun phrase></proper noun phrase>,<proper noun phrase: identifier="cp">Commodore
Pet</proper noun phrase>and<proper noun phrase: identifier="trs">Tandy TRS</proper noun
phrase></proper noun phrase>came<adverb phrase: relation="essential">to market</adverb
phrase>.</sentence><set of sentences to be read continuously><sentence><noun phrase:
coreference="a3"; relation="subject">The computers</noun phrase>were<adjective phrase:
identifier="a87";relation="essential">crude</adjective phrase><adverb phrase>by<noun
phrase><adverb phrase>today's</adverb phrase>standards</noun phrase></adverb
phrase>,</sentence><sentence: identifier="a222" relation="example"><noun phrase:
identifier="aonrs" relation="subject"><proper noun phrase: coreference="a2">Apple<noun:
pronunciation="two">II</noun></proper noun phrase>owners</noun phrase>
<adjective phrase: relation="underfined">,for exampe,</adverb phrase><verb: syntax=
"parellel"><verb phrase>had to use<noun phrase: relation="object"><adverb phrase:
coreference="aonrs">their</adverb phrase>television sets</noun phrase><adverb
phrase>as screens</adverb phrase></verb phrase>and<verb phrase>stored<noun
phrase: relation="object">data</noun phrase><adverb phrases: relation="indirect object">
on audiocassettes</adverb phrase></verb phrase></verb>.</sentence></set of sentences
to be read continuously></document>
```

EXAMPLE 4

FIG. 20A

¥Com=Lang=JPN¥¥Pau=100¥¥Com=begin_s¥ [¥Pau=50¥¥Com=begin_ph¥ 素敵にエイジング] / 8 ¥Pau=100¥¥Com=begin_s¥¥Pau=50¥¥Com=begin_ph¥ ガン転移、抑えられる！？

FIG. 20B

¥Pau=500¥¥Com=begin_p¥¥Pau=100¥¥Com=begin_s¥¥Pau=50¥¥Com=begin_ph¥ この転移、¥Pau=50¥¥Com=begin_ph¥ ガン細胞が増えるだけでは発生しない。¥Pau=100¥¥Com=begin_s¥¥Pau=50¥¥Com=begin_ph¥ がん細胞が ¥Pau=50¥¥Com=begin_ph¥ 細胞と ¥Pau=50¥¥Com=begin_ph¥ 細胞の間にある ¥Pau=50¥¥Com=begin_ph¥ 蛋白質などを溶かし、¥Pau=50¥¥Com=begin_ph¥ 自分の進む道をつくって、¥Pau=50¥¥Com-begin_ph¥ 血管や ¥Pau=50¥¥Com=begin_ph¥ りんぱかんに入り込む。¥Pau=100¥¥Com=begin_s¥¥Pau=50¥¥Com=begin_ph¥ 循環しながら Pau=50¥¥Com=begin_ph¥¥ 新たな"すみか"を探して潜り込む、といった ¥Pau=50¥¥Com=begin_ph¥ 複雑な動きをすることが、¥Pau=50¥¥Com=begin_ph¥ 近年解明されつつある。

FIG. 21

¥Com=Lang=ENG¥¥Pau=100¥¥=begin_s¥¥Com=Vol=0¥¥Pau=50¥ ¥Com=begin_ph¥During¥Pau=50¥¥Com=begin_ph¥its ¥Pau=50¥¥ Com=begin_ph¥centennial year, ¥Pau=50¥¥Com=begin_ph¥The Wall Street Journal will report ¥Pau=50¥¥Com=begin_ph¥ events¥Pau=50¥¥Com=begin_ph¥of ¥Pau=50¥¥Com=begin_ph¥ the past century ¥Pau=50¥¥Com=begin_ph¥that stand ¥ Pau=50¥¥Com=begin_ph¥as ¥Pau=50¥¥Com=begin_ph¥ milestones ¥Pau=50¥¥Com=begin_ph¥of ¥Pau=50¥¥ Com=begin_ph¥American business history.
¥Pau=100¥¥Com=begin_s¥¥Com=Vol=80¥¥Pau=50¥¥ Com=begin_ph¥THREE COMPUTERS THAT CHANGED ¥Pau=50¥¥ Com=begin_ph¥the face ¥Pau=50¥¥Com=begin_ph¥ of ¥Pau=50¥¥ ¥Com=begin_ph¥personal computing were launched ¥Pau=50¥ ¥Com=begin_ph¥ in ¥Pau=50¥¥Com=begin_ph¥1977.
¥Pau=100¥¥Com=begin_s¥¥Com=Vol=80¥¥Pau=50¥¥ Com=begin_ph¥That year ¥Pau=50¥¥Com=begin_ph the ¥ Pau=50¥¥Com=begin_ph¥Apple ¥Pau=50¥¥Com=begin_ph two, ¥ Pau=50¥¥Com=begin_ph¥Commodore Pet and ¥Pau=50¥¥ Com=begin_ph¥Tandy TRS came ¥Pau=50¥¥Com=begin_ph¥to market.
¥Pau=100¥¥Com=begin_s¥¥Com=Vol=80¥¥Pau=50¥¥ Com=begin_ph¥The computers were ¥Pau=50¥¥Com=begin_ph¥ crude ¥Pau=50¥¥Com=begin_ph¥by ¥Pau=50¥¥Com=begin_ph¥ today's standards. ¥Pau=100¥¥Com=begin_s¥¥Com=Vol=0¥¥ Pau=50¥¥Com=begin_ph¥Apple two owners ¥Pau=50¥¥ Com=begin_ph¥, for example, ¥Pau=50¥¥Com=begin_ph¥had to use ¥Pau=50¥¥Com=begin_ph¥their television sets ¥ Pau=50¥¥Com=begin_ph¥as screens and ¥Pau=50¥¥ Com=begin_ph¥stored ¥Pau=50¥¥Com=begin_ph¥data ¥Pau=50¥ ¥Com=begin_ph¥on audiocassettes.

FIG. 32A

EXAMPLE 1

<document: video file = "V3"><scene = "VM5"; in = "00:00:00:00; out = "00:00:03:12"><head><sentence>[<noun phrase><adjective phrase: word sense = "3cf072"> 素敵に </adjective phrase><noun: identifier = "a200"> エイジング </noun></noun phrase>/8</sentence><sentence><verb phrase: identifier ="a876"><adverb phrase: relation = "object"><noun phrase: identifier = "a1000"; relation = "subject"; word sense = "3be2c7> ガン </noun phrase><noun: identifier= "a8"; word sense = "Off5e7"> 転移 </noun><adverb phrase> 抑え </verb phrase> られる！ ？ </sentence></head>

FIG. 32B

<paragraph><sentence><adverb phrase: relation = "subject"><noun phrase:
corefernce = "a89"> この転移 </noun phrase>, </adverb phrase><adverb
phrase: relation = "condition"><adverb phrase: relation = "subject"><noun
phrase: identifier = "a15"><noun phrase: coreference = "a1";
relation = "essentail"; word sense = "3be2c7"> がん </noun phrase><noun:
word sense = "0f2e4c"> 細胞 </noun></noun phrase> が </adverb phrase>
増えるだけでは </adverb phrase> 発生しない。
</sentence><sentence><adverb phrase: relation = "subject"><noun phrase:
identifier = "a18">: coreference = "a15"><noun phrase: coreference = "a1";
relation = "essential"> がん </noun phrase><noun: word sense = "0f2e4c">
細胞 </noun></noun phrase> が </adverb phrase><adverb phrase:
relation = "means"><adverb phrase: relation = "means"><adverb
phrase: relation = "object"><noun phrase: identifier = "a12"><adverb
phrase: relation = "underfined"><adverb phrase: relation = "indirect
object"><adverb phrase: relation = "place"><noun phrase: syntax =
"parallel"><noun phrase: word sense = "0f2e4c"> 細胞 </noun phrase>
と <noun phrase: word sense = "0f2e4c"> 細胞 </noun phrase></noun
phrase> の </adverb phrase> 間に </adverb phrase> ある </adverb phrase>
<noun phrase><noun: syntax = "backward dependency"> 蛋白 <exception:
relation = "underfined"; pronunciation = "null"> （たんぱく） </exception>
</noun> 質 </noun phrase> などを </adverb phrase> 溶かし、</adverb
phrase><adverb phrase: relation = "object"><verb phrase: relation =
"underfined"><adverb phrase: relation = "subject"><noun phrase:
coreference = "a18"; word sense = "0f6fa3"> 自分 </noun phrase> の
</advereb phrase> 進む</verb phrase> 道を </adverb phrase> つくって、
</adverb phrase><adverb phrase: relation = "indirect object"><noun phrase:
identifier = "a33"; syntax = "parallel"><noun phrase; word sense = "0ef4e6" >
血管 </noun phrase> や <noun phrase: pronunciation = " りんぱかん ">
リンパ管 </noun phrase></noun phrase> に </adverb phrase> 入り込む。
</sentence><sentence: identifier = "a16"><adverb phrase: relation =
" 主語 "><verb phrase: relation = "content"><adverb phrase: relation =
"object"><noun phrase><adverb phrase: relation = "content"><adverb
phrase><adverb phrase> 循環しながら </adverb phrase><verb><verb
phrase: relation = "underfined"><adverb phrase: relation = "object"><noun
phrase: identifier = "a69"> 新たな "<noun: pronunciation = " すみか "> 住み家
</noun>"</noun phrase> を </adverb phrase> 探して </verb phrase> 潜り込む、
</verb></adverb phrase> といった </adverb phrase><adjective phrase:
relation = "underfined"; word sense = "3ce6b4"> 複雑な </adjective phrase>
動き </noun phrase> を </adveerb phrase> する </verb phrase> ことが、
</adverb phrase><noun phrase: relation = "time"> 近年 </noun phrase> 解明
されつつある。</sentence></paragraph></scene></document>

EXAMPLE 11

FIG. 33

EXAMPLE 12

EXAMPLE 13

<document: video file="V2"><sentence: scene="VS1"><adverb phrase: relation="time">During<noun phrase: relation="essential"><adverb phrase: coreference="wsj">its</adverb phrase><adjective phrase>centennial</adjective phrase> year</noun phrase>,</adverb phrase><proper noun phrase: identifier="wsj"relation= "subject">The Wall Street Journal</proper noun phrase>will report<noun phrase: relation= "object">events<adverb phrase>of<noun phrase>the past century</noun phrase></adverb phrase><complementary sentence><noun phrase>that</noun phrase>stand<adverb phrase: relation="essential">as<noun phrase>milestones<adverb phrase>of<noun phrase> American business history</noun phrase></adverb phrase></noun phrase></adverb phrase></complementary sentence></noun phrase>.</sentence><sentence: scene="VS2"> <noun phrase: coreference="a3" relation="subject"><cardinal number phrase>:type= "integer"; value="3"; relation="essential">THREE</cardinal number phrase>COMPUTERS <complementary sentence>THAT CHANGED<noun phrase: relation="object">the face <adverb phrase>of<noun phrase>personal computing</noun phrase></adverb phrase> </noun phrase></complementary sentence></noun phrase>were launched<adverb phrase: relation="time">in<date phrase identifier="a1977">1977</date phrase></adverb phrase> </sentence><sentence: scene="VS3><date phrase> ← EXAMPLE 14
That year</date phrase><proper noun phrase:identifier="a3"; syntax="parallel"; relation= "subject">the<proper noun phrase: identifier="a2">Apple<noun phrase: pronunciation="two"> II</noun phrase></proper noun phrase>,<proper noun phrase: identifier="cp">Commodore Pet</proper noun phrase>and<proper noun phrase: identifier="trs">Tandy TRS</proper noun phrase></proper noun phrase>came<adverb phrase: relation="essential">to market</adverb phrase>.</sentence><set of sentences to be read continuously><sentence: scene="VS4"> <noun phrase: coreference="a3"; relation="subject">The computers</noun phrase>were <adjective phrase: identifier="a87"; relation="essential">crude</adjective phrase><adverb phrase>by<noun phrase><adverb phrase>today's</adverb phrase>standards</noun phrase></adverb phrase>,</sentence><sentence: scene="VS5"; ← EXAMPLE 16
identifier="a222" relation="example"><noun phrase: identifier="aonrs" relation="subject"> <proper noun phrase: coreference="a2">Apple<noun: pronunciation="two">II</noun> </proper noun phrase>owners</noun phrase><adjective phrase: relation="underfined">,for exampe,</adverb phrase><verb: syntax="parellel"><verb phrase>had to use<noun phrase: relation="object"><adverb phrase: coreference="aonrs">their</adverb phrase>television sets</noun phrase><adverb phrase>as screens</adverb phrase></verb phrase>and <verb phrase>stored<noun phrase: relation="object">data</noun phrase><adverb phrases: relation="indirect object">on audiocassettes</adverb phrase></verb phrase></verb>. </sentence></set of sentences to be read continuously></document>

EXAMPLE 15

FIG. 34A

¥VIDEO FILE = "V3" ¥¥ SCENE = "VM5" in = "00:00:00:00"

out = "00:00:03:12" ¥

FIG. 34B

¥VIDEO FILE = "V2" ¥¥ SCENE = "VS1" ¥ SCENE = "VS2"

¥ SCENE = "VS3" ¥ SCENE = "VS4" ¥ SCENE = "VS5" ¥

DOCUMENT PROCESSING APPARATUS HAVING CAPABILITY OF CONTROLLING VIDEO DATA

BACKGROUND OF THE INVENTION

1. Field of the Invention

The present invention relates to a technique of processing an electronic document, and more particularly, to a document processing apparatus capable of outputting video data related to electronic document data.

2. Description of the Related Art

WWW (World Wide Web) is widely used to supply hypertext information via the Internet.

The WWW is a system that allows electronic document to be treated in a new manner, that is, generated, processed, disclosed, and used in common. However, from the point of view of practically using documents, the WWW has a limitation in the capability of processing documents. Thus, there is a need for a higher-level document processing technique such as categorization or summarization of documents. In order to realize such high-level document processing, it is necessary to automatically process the contents of documents.

However, such automatic processing of the contents of documents has difficulties as described below.

Firstly, the HTML (Electronic Markup Language) prescribes the manner of representing documents, but does not prescribe the contents of the documents. Secondly, it is not necessarily easy for users to understand the contents of documents that are linked to one another via a hypertext network. Thirdly, authors usually write documents without bearing in mind the convenience of readers, and no adjustment is made as to the difference in convenience between authors and readers.

Although the WWW is a new electronic documentation system having various advantages, the WWW is not capable of performing high-level document processing which needs additional automatic processing. In other words, in order to realize the high-level document processing, it is required to automatically process documents.

To the above end, systems for assisting in automatically processing a document has been developed on the basis of natural language processing technology. One such method is to automatically process a document according to tags which have been attached, by the author of the document or other person, to the document so as to represent attribute information about the internal structure of the document.

In recent years, computers have become increasingly popular, and many computers are connected to one another via a network. As a result, there occurs a need for a higher-level document processing technique to perform generation of a text document, labeling, and a modification of a text document, in accordance with an index depending upon the content of a document. More specifically, there is a need for a technique to summarize or categorize a document in response to a request issued by a user.

There is also a need for a document viewer capable of displaying a document and a summary thereof in a desirable manner depending upon the type of a display device. Furthermore, there is a need for a technique of reading aloud text data when the text data is displayed. It is more desirable to read aloud text data in synchronization with the operation of displaying the text data or an image.

If video data such as a motion image or a still image related to document data is output, a user can easily obtain various kinds of high-level information. Thus, it is desirable to provide a technique for outputting video data in synchronization with various operations performed upon document data.

SUMMARY OF THE INVENTION

In view of the above, it is an object of the present invention to provide a method and apparatus for processing a document, having a capability of outputting video data in synchronization with the operation of displaying a document thereby presenting various kinds of high-level information to a user.

According to an aspect of the present invention, there is provided a document processing apparatus comprising: detection means for detecting video data designation information attached to electronic document data; video data selection means for selecting video data in accordance with video data designation information detected by the detection means; document output control means for controlling outputting of electronic document data; and video output control means for controlling outputting of the video data selected by the video data selection means, in correspondence with the electronic document data output by the document output control means.

The document processing apparatus according to the present invention preferably further comprises display means for displaying the electronic document data and the video data.

The document processing apparatus may further comprise summary generation means for generating a summary of the electronic document data, wherein the document output control means controls outputting of the summary, and wherein the detection means detects video data designation information contained in the summary.

Preferably, the document output control means controls the outputting of electronic document data such that the electronic document data being displayed is scrolled or switched part by part, and the video output control means controls the outputting of the video data, in synchronization with the progress of the operation of outputting the electronic data controlled by the document output control means.

The document processing apparatus may further comprise voice output control means for controlling the output of a voice reading aloud the electronic document data, wherein the video output control means controls the outputting of the video data, in synchronization with the progress of the operation of reading aloud the electronic data.

Preferably, the video data designation information is attached in the form of tag data to the electronic document.

The video data may be motion image data or still image data.

According to another aspect of the present invention, there is provided a document processing method comprising the steps of: detecting video data designation information attached to electronic document data; selecting video data in accordance with video data designation information detected in the detection step; controlling outputting of the electronic document data; and controlling outputting of the video data selected in the selection step, in correspondence with the electronic document data output.

Preferably, the document processing method according to the present invention further comprises the step of displaying the electronic document data and the video data.

The document processing method may further comprise the step of generating a summary of the electronic document data, wherein the step of controlling the outputting of electronic document data controls outputting of the summary, and wherein the detection step detects video data designation information contained in the summary.

Preferably, the step of controlling the outputting of electronic document data controls the outputting of the electronic document data such that the electronic document data being displayed is scrolled or switched part by part, and the step of controlling the outputting of the video data controls the outputting of the video data in synchronization with the progress of the operation of outputting the electronic data controlled in the document output control step.

The document processing method may further comprise the step of controlling the output of a voice reading aloud the electronic document data, wherein the video output control means controls the outputting of the video data, in synchronization with the progress of the operation of reading aloud the electronic data.

Preferably, the video data designation information is attached in the form of tag data to the electronic document.

In the document processing method, the video data may be motion image data or still image data.

According to still another aspect, there is provided a storage medium including a computer-controllable program stored thereon, the program comprising the steps of: detecting video data designation information attached to electronic document data; selecting video data in accordance with video data designation information detected in the detection step; controlling outputting of the electronic document data; and controlling outputting of the video data selected in the selection step, in correspondence with the electronic document data output.

In this storage medium, the program preferably further comprises the step of displaying the electronic document data and the video data.

In this storage medium including a computer-controllable program stored thereon, the program may further comprise the step of generating a summary of the electronic document data, wherein the step of controlling the outputting of electronic document data controls outputting of the summary, and wherein the detection step detects video data designation information contained in the summary.

In this storage medium including a computer-controllable program stored thereon, the step of controlling the outputting of electronic document data preferably controls the outputting of the electronic document data such that the electronic document data being displayed is scrolled or switched part by part, and the step of controlling the outputting of the video data preferably controls the outputting of the video data in synchronization with the progress of the operation of outputting the electronic data controlled in the document output control step.

In this storage medium including a computer-controllable program stored thereon, the program may further comprise the step of controlling the output of a voice reading aloud the electronic document data, wherein the video output control means controls the outputting of the video data, in synchronization with the progress of the operation of reading aloud the electronic data.

In this storage medium including a computer-controllable program stored thereon, the video data designation information is preferably attached in the form of tag data to the electronic document.

In the storage medium including a computer-controllable program stored thereon, the video data may be motion image data or still image data.

According to still another aspect of the present invention, there is provided a signal carrying a computer-controllable program, the program comprising the steps of: detecting video data designation information attached to electronic document data; selecting video data in accordance with video data designation information detected in the detection step; controlling outputting of the electronic document data; and controlling outputting of the video data selected in the selection step, in correspondence with the electronic document data output.

In this signal carrying a computer-controllable program, the program preferably further comprises the step of displaying the electronic document data and the video data.

In this signal carrying a computer-controllable program, the program may further comprise the step of generating a summary of the electronic document data, wherein the step of controlling the outputting of electronic document data controls outputting of the summary, and wherein the detection step detects video data designation information contained in the summary.

In the signal carrying a computer-controllable program, the step of controlling the outputting of electronic document data preferably controls the outputting of the electronic document data such that the electronic document data being displayed is scrolled or switched part by part, and the step of controlling the outputting of the video data preferably controls the outputting of the video data in synchronization with the progress of the operation of outputting the electronic data controlled in the document output control step.

In the signal carrying a computer-controllable program, the program may further comprise the step of controlling the output of a voice reading aloud the electronic document data, wherein the video output control means controls the outputting of the video data, in synchronization with the progress of the operation of reading aloud the electronic data.

In the signal carrying a computer-controllable program, the video data designation information is preferably attached in the form of tag data to the electronic document.

In the signal carrying a computer-controllable program, the video data may be motion image data or still image data.

BRIEF DESCRIPTION OF THE DRAWINGS

FIGS. 11A and 11B are tables illustrating a categorization model according to the embodiment of the invention;

FIGS. 18A and 18B are schematic diagrams illustrating an example of a tag file according to the embodiment of the invention;

FIG. 19 is a schematic diagram illustrating another example of a tag file according to the embodiment of the invention;

FIGS. 20A and 20B are schematic diagrams illustrating an example of a read-out file according to the embodiment of the invention;

FIG. 21 is a schematic diagram illustrating another example of a read-out file according to the embodiment of the invention;

FIGS. 32A and 32B are schematic diagrams illustrating an example of tag file including a video tag according to the embodiment of the invention;

FIG. 33 is a schematic diagram illustrating another example of tag file including a video tag according to the embodiment of the invention;

FIGS. 34A and 34B are schematic diagrams illustrating a video output file according to the embodiment of the invention;

DESCRIPTION OF THE PREFERRED EMBODIMENTS

The present invention is described in further detail below with reference to preferred embodiments, as to the following items.

1. Configuration of Document Processing Apparatus
2. Document Data Structure
3. Manual Categorization of Document Data
   - 3.1 Procedure
   - 3.2 Indexing
   - 3.3 Browsing, Generation of Categories, and Categorization
   - 3.4 Creation/Registration of the Categorization Model
4. Automatic Categorization of Document Data
   - 4.1 Procedure
   - 4.2 Automatic Categorization
5. Reading Aloud Document
6. Generating and Displaying Summary
7. Outputting Video File
   - 7.1 Video File and Tags
   - 7.2 Outputting Video Data
   - 7.3 Outputting Video Data During the Operation of Displaying Summary
   - 7.4 Outputting Video Data During the Operation of Reading Aloud Document
   - 7.5 Various Modes of Outputting Video Data
8. Functional Block Configuration of Document Processing Apparatus

1. Configuration of Document Processing Apparatus

Figure 1:
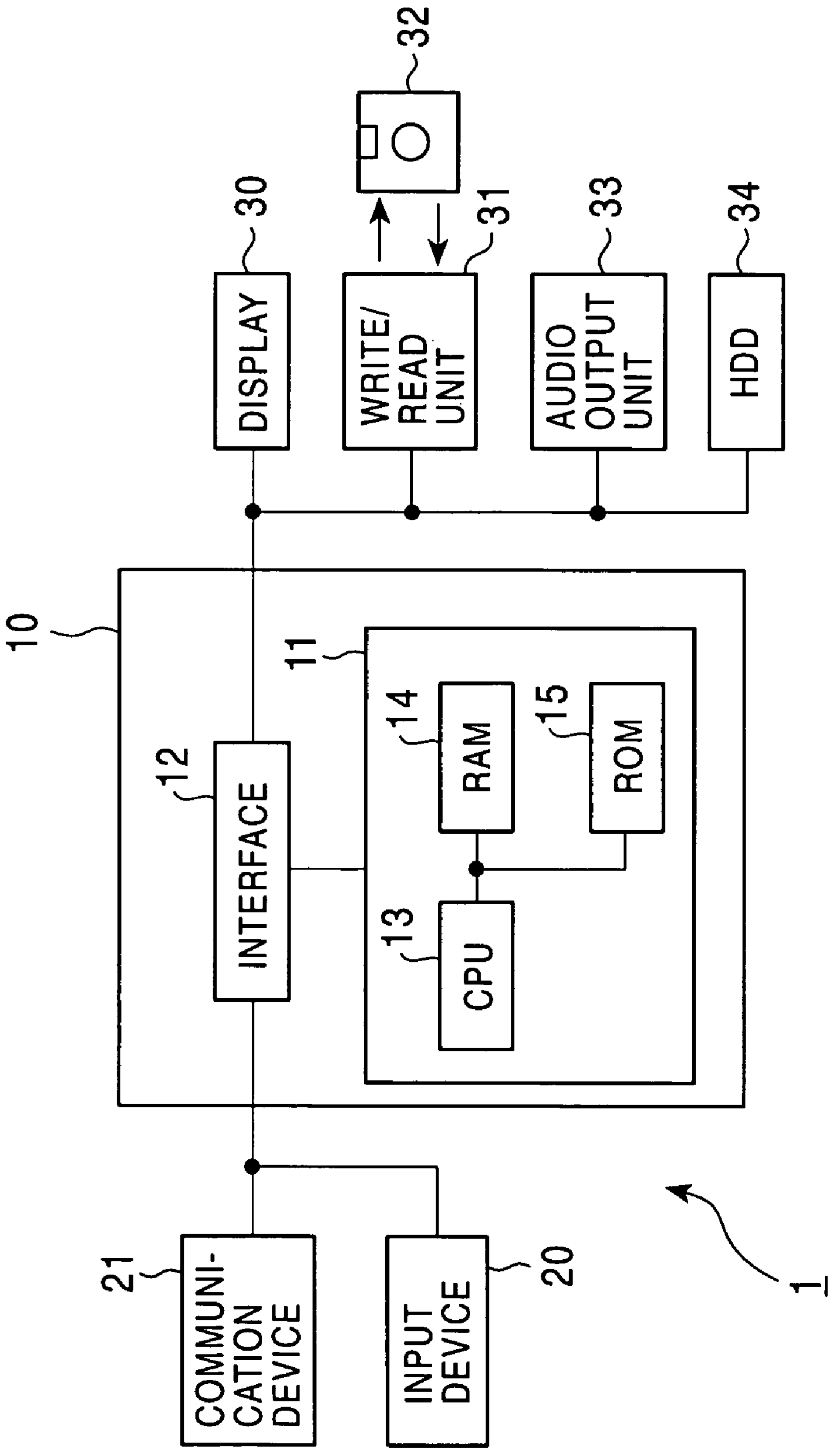
FIG. 1 is a block diagram illustrating an embodiment of a document processing apparatus according to the present invention.

As shown in FIG. 1, a document processing apparatus according to an embodiment of the present invention includes a main unit 10 including a controller 11 and an interface 12, an input unit 20 used by a user to input data or a command to the main unit 10, a communication device 21 for transmitting and receiving a signal to or from an external device, a display unit 30 for displaying an output from the main unit 10, a write/read unit 31 for writing and reading information onto and from a recording medium 32, a voice output unit 33, and an HDD (hard disk drive) 34.

The main unit 10 including the controller 11 and the interface 12 serves as the core of the document processing apparatus 1.

The controller 11 includes a CPU 13 for processing a document, a RAM 14 serving as a volatile memory, and a ROM 15 serving as a nonvolatile memory.

The CPU 13 executes a program in accordance with a procedure stored in the ROM 15, wherein the CPU 13 temporarily stores data in the RAM 14 if necessary.

Operations performed by the controller 11 include, as will be described in detail later, categorization of given document data, summarization, generation of a file used to output data by voice, and document analysis required in the above operations. The controller 11 also controls the process of outputting video data related to document data. Programs and application software required for the above operations are stored in the ROM 15, the HDD 34, or the storage medium 32.

As describe above, the document processing program used by the controller 11 may be stored in advance in the ROM 15 or may be loaded from the storage medium 32 or the HDD 34. Alternatively, the document processing program may be downloaded from an external server via the communication device 21 and a network such as the Internet.

The interface 12 is connected to the controller 11, the input unit 20, the communication device 21, the display 30, the write/read unit 31, the audio output unit 33, and the HDD 34.

Under the control of the controller 11, the interface 12 inputs data via the input unit 20, inputs and outputs data from and to the communication device 21, outputs data to the display 30, inputs and outputs data from and to the write/read unit 31, output data to the audio output unit 33, and inputs and outputs data from and to the HDD 34. In the above operation, the interface 12 adjusts timing of inputting or outputting data between various parts described above and also converts data format as required.

The input unit 20 is used by a user to input data or a command to the document processing apparatus 1. The input unit 20 may include a keyboard and a mouse. Using the input unit 20, the user may enter a keyword via the keyboard. The user may also select, using the mouse, an element of an electronic document displayed on the display 30.

Hereinafter, an electronic document handled by the document processing apparatus 1 will be referred to as document data or simply as a document. Furthermore, the term "element" is used to describe various elements of a document. Elements include a document itself, a sentence, and a word.

The communication device 21 serves to receive a signal that is transmitted by an external apparatus to the document processing apparatus 1 via a communication line. The communication device 21 also serves to transmit a signal over the communication line. If the communication device 21 receives one or more document data from the outside, the communication device 21 transfers the received document data to the main unit 10. The communication device 21 also transmits data to an external apparatus via the communication line.

Furthermore, the communication device 21 also serves to receive one or more video data (video files) that may be or may not be associated with document data.

The display 30 serves as an output device of the document processing apparatus 1, for displaying characters and/or image information. The display 30 may include a cathode ray tube (CRT) or a liquid crystal display (LCD). The display 30 may display one or more windows in which characters and/or graphic images are displayed.

The write/read unit 31 serves to write and read data to and from a recording medium 32 such as a floppy disk.

Although in the present embodiment, a floppy disk (magnetic disk) is employed as the storage medium 32, the storage medium 32 is not limited to the floppy disk. Other types of removable storage media such as an optical disk, a magnetooptical disk, and a memory card may also be employed. As for the write/read unit 31, a device (such as a disk drive or a card drive) adapted to writing/reading data to and from an employed medium may be used.

In the case where a document processing program to be used to process a document is stored on the storage medium 32, the write/read unit 31 may read the document processing program from the storage medium 32 and transfer it to the controller 11.

When document data or video data is stored on the storage medium 32, the write/read unit 31 may read such a data from the storage medium 32 and transfer it to the controller 11. This provides another way for the document processing apparatus 1 to acquire document data and video data.

Furthermore, after processing document data by the document processing apparatus 1, the controller 11 may store the resultant document data on the storage medium 32 using the write/read unit 31.

The audio output unit 33 serves as an output device of the document processing apparatus 1, for providing a voice output corresponding to a document.

More specifically, the audio output unit 33 outputs a voice signal synthesized by the controller in accordance with document information (read-out file) that will be described later.

The HDD 34 serves as a mass storage device used by the document processing apparatus 1 to store a large amount of data. The HDD 34 writes and reads information under the control of the controller 11.

The HDD 34 is used to store various application programs such as a voice synthesis program executed by the controller 11. The HDD 34 may also be used to store document data or video data input to the document processing apparatus 1.

2. Document Data Structure

The data structure of document data is described below. In the present embodiment, a document is processed in accordance with attribute information described by a tag attached to a document. Tags used in the present embodiment include a syntactic tag and a semantic/pragmatic tag wherein the syntactic tag indicates the structure of a document and the semantic/pragmatic tag makes it possible for a machine to understand the contents of documents written in various languages.

A syntactic tag may be used to describe the internal structure of a document.

Figure 2:
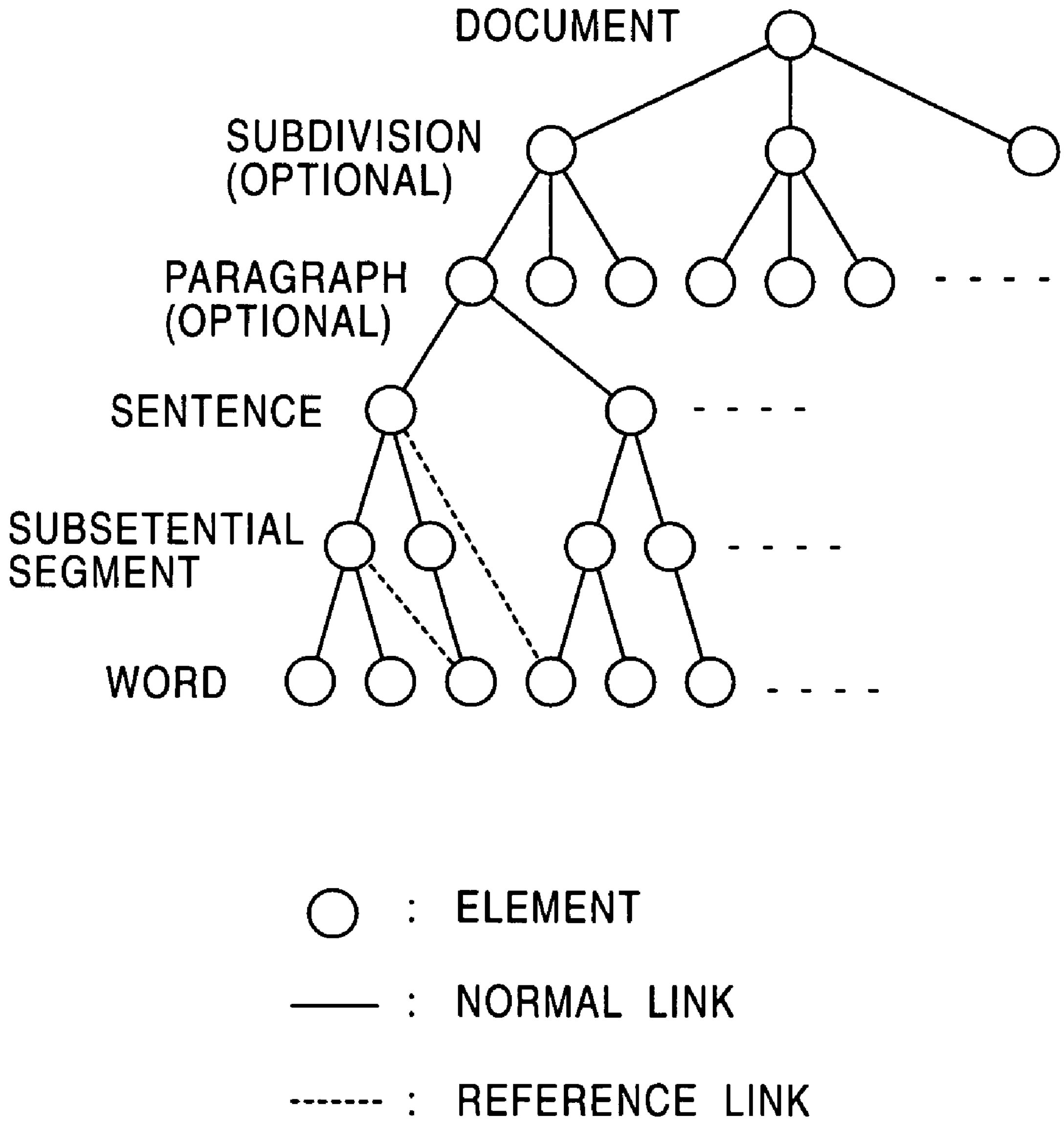
FIG. 2 is a schematic diagram illustrating a document structure employed in the embodiment of the invention.

The internal structure, to be represented by tags, includes elements such as a document, sentences, and words which are linked to one another by normal links or reference links, as shown in FIG. 2.

In FIG. 2, open circles represent elements. Open circles at the bottom represent elements in the lowest level in a document. Solid lines represent normal links indicating direct connections between elements such as sentences or words. Broken lines represent reference links indicating dependence between elements.

The internal structure of a document is composed of, in order from the highest level to the lowest level, a document, a subdivision, a paragraph, a sentence, a subsentential segment, . . . , and a word element, wherein the subdivision and the paragraph are optional.

Tags may also be used for the semantic purpose. For example, when a word has a plurality of senses (meanings), a tag may be used to specify a particular sense.

In the present embodiment, tagging is performed according to XML (Extensible Markup Language) similar to HTML (Hyper Text Markup Language).

Some examples of tagging are described below. In these examples, tags are described within brackets < >.

Note that tagging is not limited to those examples but tagging may be performed in many different ways. Two specific examples of documents including tags are shown below, where one of the example is written in English and the other is written in Japanese. Note that internal structures of documents written in other languages can also be described using tags.

When a sentence “Time flies like an arrow.” is given, tagging may be performed as follows.

<sentence><noun phrase: word sense=“time0”>time</noun phrase>

<verb phrase><verb: word sense=“fly1”>flies</verb>

<adverb phrase><adverb: word sense=like0>like</adverb><noun phrase>an

<noun: word sense=“arrow0”>arrow</noun></noun phrase>

</adverb phrase></verb phrase>.</sentence>

In the above example, <sentence>, <noun>, <noun phrase>, <verb>, <verb phrase>, <adverb>, and <adverb phrase> are used to indicate a sentence, a noun, a noun phrase, a verb, a verb phrase, an adjective/adverb (including preposition and postposition phrases), and an adjective/adverb phrase. In other words, the syntactic structure of the sentence is described by those tags.

A start tag is placed immediately before an element and a corresponding end tag is placed immediately after that element. Herein, end tags placed immediately after the respective elements include a symbol “/” to indicate that the tags are end tags. The term “element” is used herein to describe a syntactic element such as a phrase, a paragraph, or a sentence.

The expression, word sense=“time0”, indicates that word “time” is used herein to describe the 0th sense of a plurality of senses of word “time”. More specifically, although “time” has senses as a noun, an adjective, and a verb, “time” is used herein as a noun (first sense). Similarly, word “orange” has three senses, namely, the name of a plant, one of colors, and one of fruits, which can be distinguished from each other by specifying a word sense.

Figure 3:
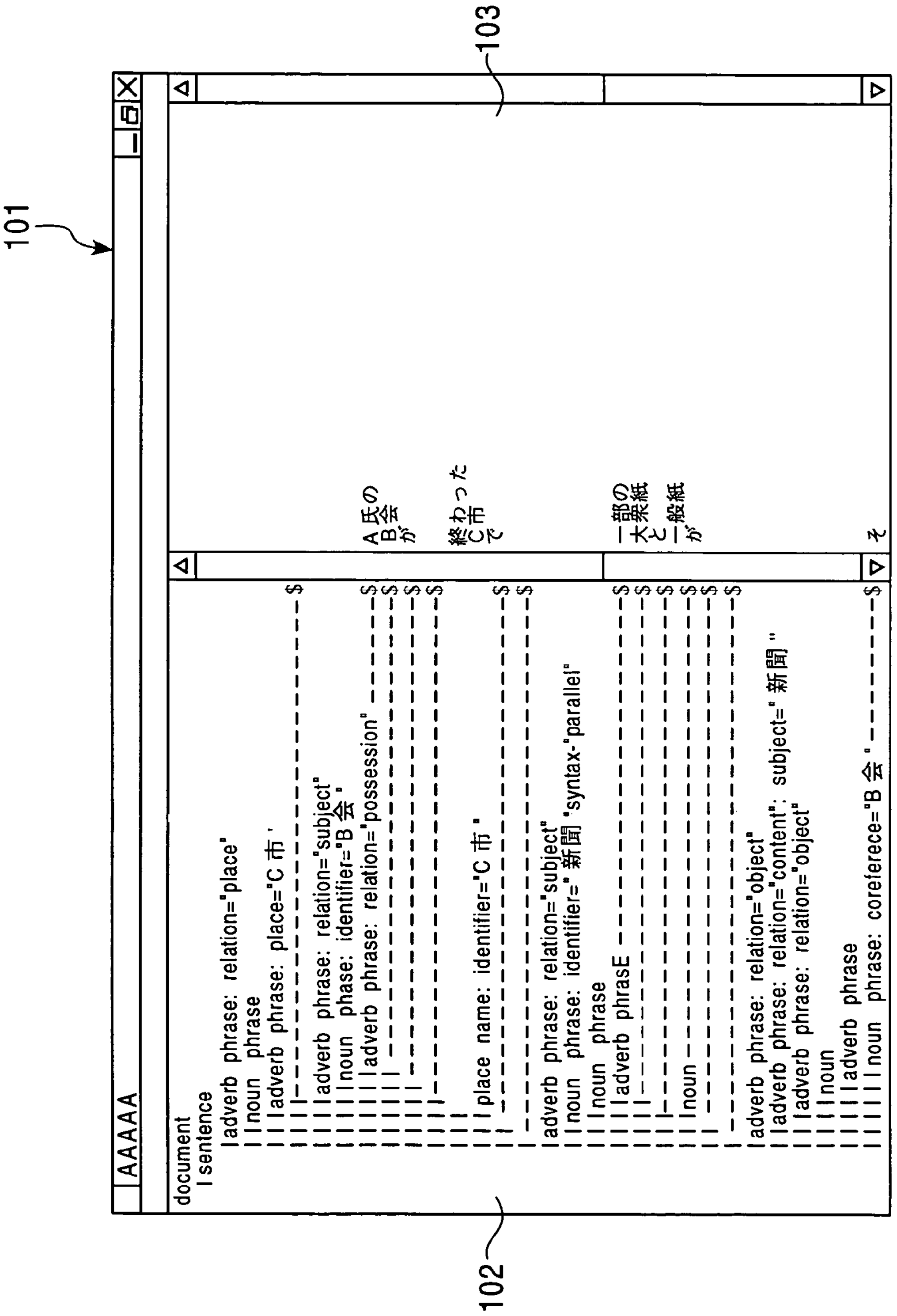
FIG. 3 is a schematic diagram illustrating a window for displaying a sentence structure according to the embodiment of the invention.

In the present embodiment, the syntactic structure of document data may be displayed in a window 101 on the display 30, as shown in FIG. 3. In the window 101, word elements are displayed in a subwindow 103 on the right side, and the internal structure of a sentence is displayed in a subwindow on the left side.

In this specific example in FIG. 3, a part of a sentence “A氏のB会が終わった C市で、一部の大衆紙と一般紙がその写真報道を自主規制する方針を紙面で明らかにした。” (Convention B was held in C City under the leadership of Mr. A. Some of newspaper companies, including usual and popular newspaper companies, have announced, on their papers that they will restrict themselves in terms of insertion of photographs of Mr. A.) is shown in the window 101. This document may be tagged, for example, as follows.

<document><sentence><|adverb phrase: relation=“place”><noun phrase><adverb phrase: place=“C市”><adverb phrase: relation=“subject”> <noun phrase: identifier=“B会”><adverb phrase: relation=“position”><person name: identifier=“A氏”>A氏</person name></adverb phrase><organization name: identifier=“B会”>B会</organization name></noun phrase>が</adverb phrase>終わった</adverb phrase><place name: identifier=“C市”>C市</place name></noun phrase>で</adverb phrase><adverb phrase: relation=“subject”><noun phrase: identifier=“press”; syntax=“parallel”><noun phrase><adverb phrase>-部の</adverb phrase>大衆紙</noun phrase>と<noun>-般紙</noun></noun phrase>が</adverb phrase><adverb phrase: relation=“object”><adverb phrase: relation=“content”; subject=“press”><adverb phrase: relation=“object”><noun phrase><adverb phrase><noun: coreference=“B会”>そ</noun>の</adverb phrase>写真報道</noun phrase>を</adverb phrase>自主規制する</adverb phrase>方針を</adverb phrase><adverb phrase: relation=“location”>紙面で</adverb phrase>明らかにした。</sentence></document>

As can be seen, the structure of the document is described by pairs of tags <*> and </*>.

For example, a pair of tags <document> and </document> indicates the range of a document, and a pair of tags <sentence> and </sentence> indicates the range of a sentence. A pair of tag <noun phrase: identifier=“B会”> and </noun phrase> is used to describe a noun phrase “A氏のB会” with an identifier “B会”.

Thus, the internal structure of the sentence is described by tags as shown in the subwindow on the left side of FIG. 3.

In the above sentence, syntax=“parallel” indicates that “一部の大衆紙” and “一般紙” are parallel in relation. Herein, “parallel” elements are such elements having the same dependency. When no particular dependency is specified, “<noun phrase: relation=x><noun>A</noun><noun>B</noun></noun phrase>” indicates that A depends on B. Expression, relation=x, indicates a relational attribute.

A relational attribute describes a relation between elements in terms of syntax, meaning, and rhetoric. More specifically, a relation attribute describes a grammatical function such as a subject, an object, and an indirect object, a theme/role such as an acting person, a person receiving an action, and a beneficiary, and a rhetorical relation such as a reason and a result.

In the present example, relatively simple syntactic functions such as a subject, object, and indirect object are described by relational attributes.

Furthermore, in the present example, the attributes of proper nouns such as “A氏”, “B会”, and “C市” (“Mr. A”, “Convention B”, “City C”) are described by tags <place name>, <person name>, and <organization name>. By attaching a tag <place name>, <person name>, or <organization name>, it is possible to indicate that a tagged word is a proper noun.

3. Manual Categorization of Document Data 3.1 Procedure

In the document processing apparatus 1 of the present embodiment, when document data is input from the outside via the communication device 21 (or via the write/read unit 31), the document data is categorized in accordance with the content thereof. Although in the following description, document data is assumed to be input from the outside via the communication device 21, the categorization may also be performed in a similar manner when document data stored on a removable medium such as a floppy disk is input via the write/read unit 31.

In general, categorization is performed either in a manual fashion by a user in accordance with the content of given document data or in an automatic fashion by the document processing apparatus 1.

Categorization is performed on the basis of a categorization model that will be described later. In the initial state, the document processing apparatus 1 has no categorization model. Therefore, when the document processing apparatus 1 is in the initial state, it is required to manually generate a categorization model and perform categorization. If a categorization model has been generated, it becomes possible to automatically categorize given document data.

First, the manual categorization process to be performed initially is described. That is, when the document processing apparatus in the initial state receives document data from the outside, the manual categorization process is performed by the controller 11 in accordance with an operation performed by a user so as to generate a categorization model and categorize the document data.

Figure 4:
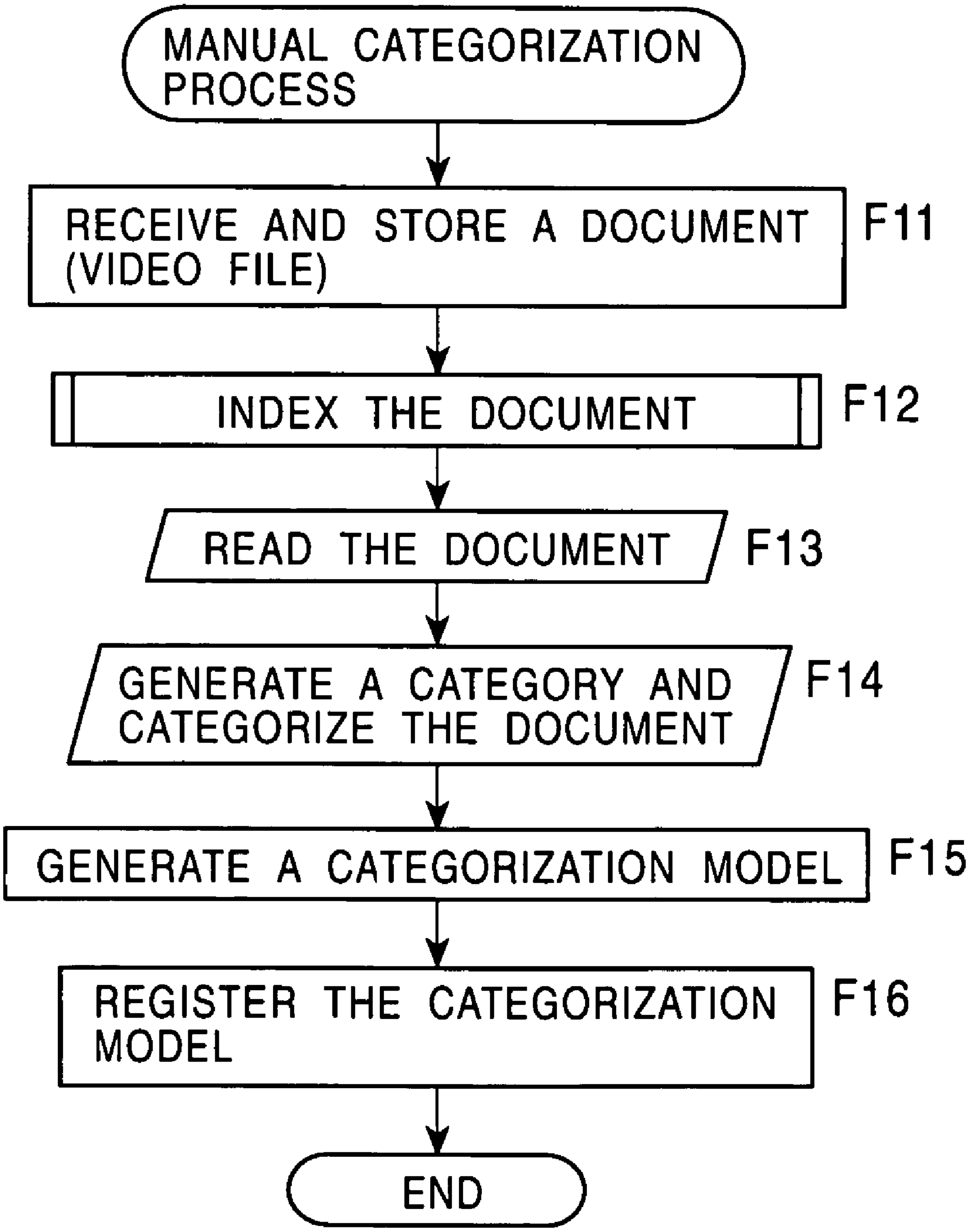
FIG. 4 is a flow chart illustrating a manual categorization process according to the embodiment of the invention.

The outline of the manual categorization process is shown in FIG. 4. Each step in this process will be described in further detail later.

In step F11 in FIG. 4, the receiver 21 of the document processing apparatus 1 receives a document. In this step F11, the receiver 21 receives one or more documents via, for example, a communication line. The received one or more documents are transferred to the main unit 10 of the document processing apparatus 1. The controller 11 stores the one or more documents into RAM 14 or the HDD 34.

The received documents may include a video file including video data (motion image data or still image data) related to the documents. (In some cases, only video data is received.) When one or more video files are received, the controller 11 also stores the video files in the RAM 14 or the HDD 34. The process performed upon video files will be described later.

In step F12, the controller 11 of the document processing apparatus 1 extracts words characterizing the plurality of documents received via the receiver 21 and generates an index for each document. The controller 11 stores the generated index 11 in the RAM 14 or the HDD 34.

As will be described later, the index of each document includes a proper noun and/or other words that characterize the document. Therefore, categorization or retrieval can be performed using an index.

In step F13, a user reads a document as required. In this step, the document processing apparatus 1 performs an operation in response to a command issued by the user. The next step F14 is also performed in response to an operation of the user.

The document data input to the document processing apparatus 1 is displayed on the screen of the display 30 in response to a command issued by the user so that the user can read it.

When the user reads a document, the user may issue various commands by clicking an icon or the like on the screen so as to perform various processes such as summarization that will be described later. When the user reads a document in the manual categorization process, step F14 is performed to generate categories and categorize the document.

In step F14, the controller 11 generates and displays categories in accordance with an operation performed by the user. The user then specifies a category for each document data. In response, the controller 11 categorizes and displays document data.

In step F15, the controller 11 generates a categorization model on the basis of categories generated by the user in step F14 and also on the basis of categorization performed by the user for each document data.

The categorization model includes data that represents correspondence between categories and elements of indexes (generated in step F12) of respective documents. That is, the categorization model represents how documents are categorized.

In step F16, the resultant categorization model is registered. The registration is performed by the controller 11 by storing the categorization model in the RAM 14.

By performing the process shown in FIG. 4 in the above-described manner, one or more document data input to the document processing apparatus 1 in the initial state are manually categorized, and a categorization model is generated.

The respective steps in the process shown ion FIG. 4 are described in further detail below.

3.2 Indexing

In step F14, the controller 11 generates an index for each document data input.

A specific example of an index generated for certain document data is shown below.

<index: date="AAAA/BB/CC"; time="DD:EE:FF"; document address="1234"><user's operation history: maximum summary size="100"><selection: number of elements="10">PictureTel</selection></user's operation history><summary>Primary Minister X did not tell a specific amount of tax reduction, in a press conference.</summary><word: word sense="0003"; central activation value="140.6">not tell</word><word: word sense="0105"; identifier "X"; central activation value="67.2">Prime Minister</word><person name: identifier "X"; word: word sense="6103"; central activation value="150.2">Prime Minister X</word></word /person name><word: word sense="5301"; central activation value="120.6">ask</word><word: word sense="2350"; identifier "X"; central activation value="31.4">Prime Minister</word><word: word sense="9582"; central activation value="182.3">emphasize</word><word: word sense="2595"; central activation value="93.6">tell</word><word: word sense="9582"; central activation value="182.3">emphasize</word><word: word sense="4934"; central activation value="46.7">did not tell</word><word: word sense="4934"; central activation value="46.7">excuse</word><word: word sense="7248"; identifier "X"; central activation value="130.6">I</word><word: word sense="3684"; identifier "X"; central activation value="121.9">Prime Minister</word>

<word: word sense="1824"; central activation value="144.4">appeal</word><word: word sense="7289"; central activation value="176.8">show</word></index>

In the above example, <index> and </index> indicate the start and end positions, respectively, of the index. <date> and <time> indicate the date and the time, respectively, at which the index was generated. <summary> and </summary> indicate the start and the end, respectively, of the summary.

<word> and </word> indicate the start and end of a word.

word sense="0003" indicates the third word sense of a word. The other tags are used in a similar manner. As described earlier, in order to distinguish a plurality of word senses of a word, numbers are assigned in advance to the respective word senses, and a particular word sense is specified by the number assigned to that word sense.

<user's operation history> and </user's operation history> indicate the start and end of a user's operation history. <selection> and </selection> indicate the start and end of a selected element. maximum summary size="100" indicates that the maximum summary size is set to 100 characters. number of elements="10" indicates that the number of selected elements is 10.

As can be seen from the above example, the index of a document includes one or more proper nouns and/or word senses that characterize the document.

Figure 5:
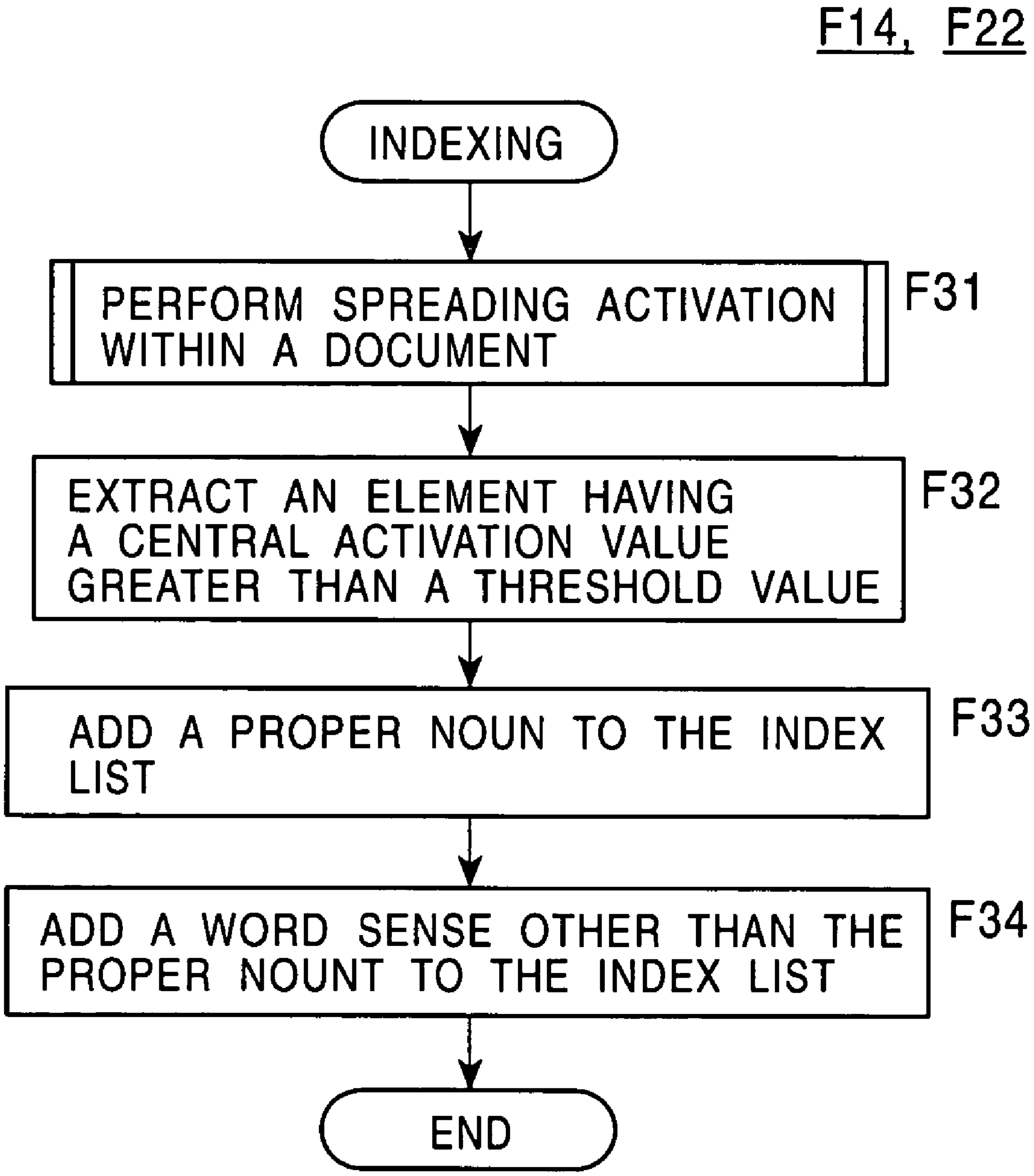
FIG. 5 is a flow chart illustrating an indexing process according to the embodiment of the invention.

The indexing process in step F12 is described in further detail below with reference to FIGS. 5 to 8. Note that FIG. 5 illustrates the indexing process for one document data. When indexing is performed for a plurality of document data, it is required to perform the process shown in FIG. 5 for each document data.

Figure 7:
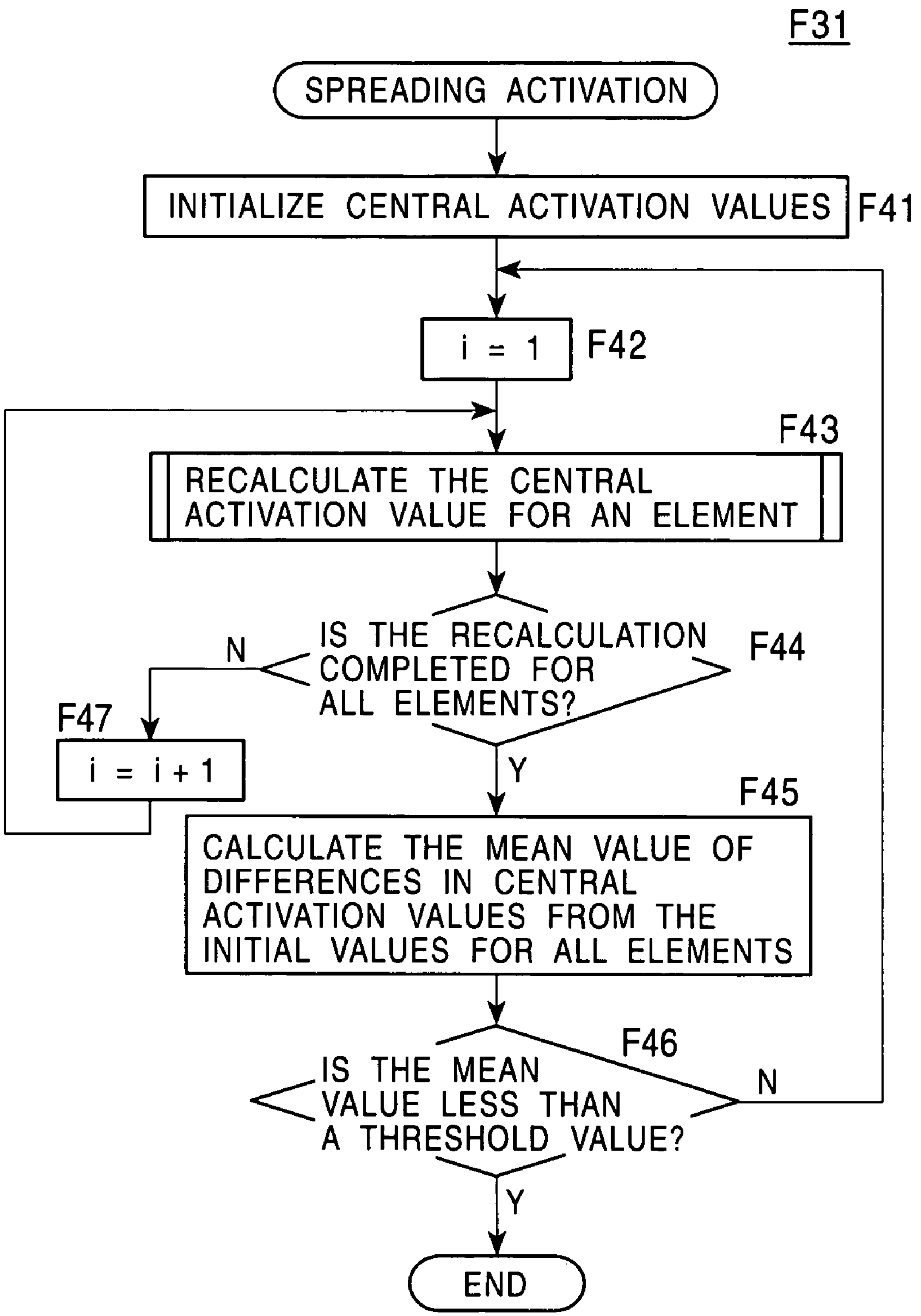
FIG. 7 is a flow chart illustrating an activation value spreading process according to the embodiment of the invention.
Figure 8:
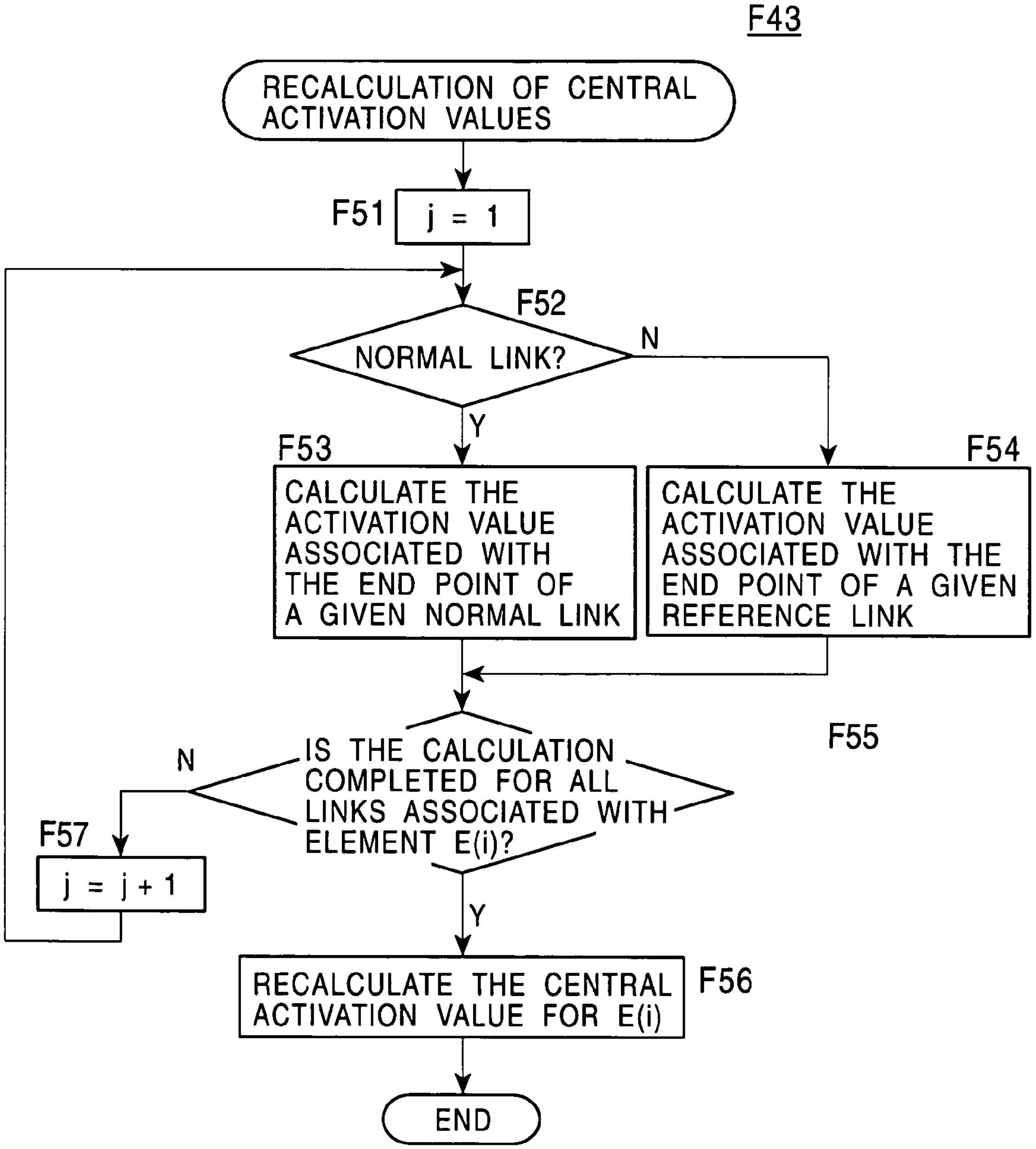
FIG. 8 is a flow chart illustrating a process of updating an activation value according to the embodiment of the invention.

FIG. 7 illustrates the details of step F31 shown in FIG. 5, and the details of step F43 are shown in FIG. 8.

In the indexing process shown in FIG. 4, spreading activation is first performed in step F31 in FIG. 5.

The spreading activation is a process in which the central activation values associated with elements in document data are spread depending on the internal structure of a document such that high central activation values are given to elements having significant relations with elements having high central activation values.

More specifically, initial central activation values are first given to the respective elements of a document, the central activation values are then spread depending upon the internal structure, that is, the link structure, of the document.

The central activation values are determined depending upon the internal structure represented by tags, and they can be used to extract distinctive words characterizing the document.

The controller 11 performs the spreading of activation values in step F31 and stores the resultant central activation values associated with the respective elements into the RAM 14.

The spreading of activation values in step F31 is described in further detail below with reference to FIGS. 6 to 8.

Figure 6:
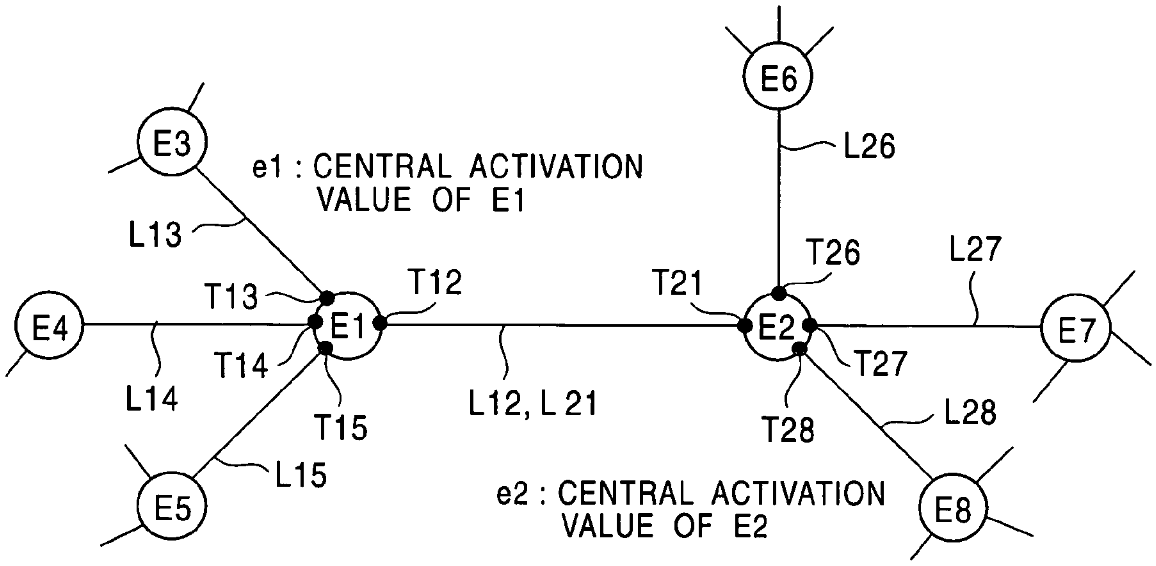
FIG. 6 is a schematic diagram illustrating activation values of elements used in the embodiment of the invention.

FIG. 6 illustrates an example of a link structure associated with some elements.

Note that FIG. 6 does not illustrate all elements of a document and the entire link structure associated therewith but illustrates a part of the link structure in the vicinity of elements E1 and E2. Of elements E1-E8 shown in FIG. 6, E1 and E2 are taken as examples in the following description.

Herein, we assume that the element E1 has a central activation value equal to e1 and the element E2 has a central activation value equal to e2.

These two elements E1 and E2 are connected to each other by a link L12 (normal link or reference link).

The link L12 has an end point T12 connected with the element E1 and also has an end point T21 connected with the element E2.

The element E1 is also connected with elements E3, E4, and E5, via links L13, L14, and L15, respectively. The links L13, L14, and L15 have end points T13, T14, and T15, respectively, connected with the element E1.

Similarly, the element E2 is also connected with elements E6, E7, and E8, via links L26, L27, and L28, respectively. The links L26, L27, and L28 have end points T26, T27, and T28, respectively, connected with the element E2.

The spreading of activation values over such a link structure is described below with reference to FIGS. 7 and 8.

In step F41 in FIG. 7, before starting the spreading of activation values associated with the document data an index of which is to be produced, initial central activation values are defined for all elements included in the document.

The initial central activation values are determined such that, for example, a proper noun and other elements selected by a user have high values.

The controller 11 sets to zero the end-point activation values of end points T(xx) of reference links and normal links via which elements are connected to one another. The controller 11 stores the resultant initial end-point activation values in the RAM 14.

In step F42, the controller 11 initializes a counter for counting the number of elements Ei of the document. More specifically, the controller 11 sets the counter value i of the element counter to 1. When i=1, the counter points to a first element (for example, element E1 in FIG. 6).

In step F43, the controller 11 recalculates the central activation value for an element pointed to by the counter.

By way of example, the recalculation of the central activation value for the element E1 is described in detail with reference to FIG. 8.

In the recalculation of the central activation value, end-point activation values of the element are first recalculated, and a new central activation value is determined using the current central activation value and the recalculated end-point activation values.

In step F51 in FIG. 8, the controller 11 initializes the counter for counting the number of links connected at one end thereof with an element Ei (E1 in this specific example) of a document. More specifically, the controller 11 sets the counter value j of the link counter to 1. When j=1, the link counter points to a first link (Lyy) connected with an element Ei. In the specific example shown in FIG. 6, a link L12 is pointed to as a first link associated with the element E1.

In step F52, the controller 11 determines, by referring to a relational attribute tag, whether or not the link pointed to by the link counter, that is, the link L12 between elements E1 and E2, is a normal link. If the link L12 is a normal link, the controller 11 advances the process to step F53. However, the controller 11 advances the process to step F54 if the link L12 is a reference link.

In the case where the link L12 is a normal link and thus the process goes to step F53, the controller 11 calculates a new end-point activation value for the end point T12 at which the element E1 is connected to the normal link L12.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12 and then dividing the resultant sum by the total number of elements included in the document.

The controller 11 determines the new end-point activation value of the end point connected the normal link by performing the above-described calculation using end-point activation values and the central activation value read from the RAM 14. The determined end-point activation value is stored in the RAM 14. Thus, the end-point activation value t12 for the end point T12 is updated.

On the other hand, in the case where it is determined in step F52 that the link L12 is a reference link and thus the process goes to step F54, the controller 11 calculates a new end-point activation value of the end point T12 at which the element E1 is connected to the link L12. In this case, the calculation is performed as follows.

The end-point activation value t12 of the end point T12 is obtained by adding the central activation value e2 of the element E2 and the end-point activation values (t26, t27, t28) of all end points (T26, T27, T28) of the element E2 linked to the element E1 except for the end point connected to the link L12. (In this case, unlike the calculation for normal links, the resultant sum is not divided.)

The controller 11 determines the new end-point activation value of the end point connected the reference link by performing the above-described calculation using end-point activation values and the central activation value read from the RAM 14. The determined end-point activation value is stored in the RAM 14. Thus, the end-point activation value t12 for the end point T12 is updated.

After performing step F53 or F54, the controller 11 determines, in step F55, whether to go to step F57. That is, the process goes to step F57 if it is determined in step F55 that the calculation is not completed for all links. In step F55, the counter value j is incremented, and the process returns to step F52.

Thus, the counter value becomes j=2, and the counter points to the second link (for example, L13) connected to the element E1. The end-point activation value t13 of the end point T13 at which the element E1 is connected to the link L13 is calculated, in a similar manner as described above, by performing step F52 and the following steps.

In step F55, the controller 11 determines whether the new end-point activation value has been calculated for all links connected to an element Ei (E1 in this specific example) pointed to by the current counter value i, and the controller 11 performs the calculation until the new end-point activation value has been determined for all end points of the current element Ei.

That is, the above-process is performed repeatedly while incrementing the counter value j in step F57 thereby determining new end-point activation values t12, t13, t14, and t15 of end points T12, T13, T14, and T15 of the element E1. When all end-point activation values have been determined, the process goes from step F55 to F56.

In step F56, the new central activation value ei for the element Ei is determined using the new end-point activation values determined in the above process.

The new central activation value is determined by adding the sum of new end-point activation values of the element Ei to the current central activation value of the element Ei. For example, in the case of the element E1 shown in FIG. 6, the new central activation value e1(new) is given by $$e1(\text{new})=e1+t12+t13+t14+t15$$

After determining the central activation value ei of the element Ei pointed to by the current counter value i, the controller 11 stores the resultant central activation value ei in the RAM 14. Thus, the central activation value ei of the element Ei is updated. (The old central activation value is further held for use in step F45 that will be described later.)

After updating the central activation values in step F43 shown in FIG. 7 in the manner described above with reference to FIG. 8, the controller 11 advances the process to step F44 shown in FIG. 7. In step F44, the controller 11 determines whether the central activation values have been updated for all elements of the document. More specifically, the controller 11 determines whether the counter value i has become equal to the total number of elements included in the document.

If the updating of the central activation value is not completed for all elements, the controller 11 advances the process to step F47. In step F47, the controller 11 increments the counter value i and returns the process to step F43.

For example, at the time when the process for the element E1 is completed, the counter value i is incremented to i=2 so as to point to the element E2.

Thus, step F43 is repeated to calculation of the central activation value for the element E2.

Although a further detailed description is not given herein because step F43 is performed in a similar manner, the end-point activation values t21, t26, t27, and t28 of the end points T21, T26, T27, and T28 of the element E2 are updated, and then the new central activation value e2(new) is determined in accordance with the following equation:

$$e2(\text{new})=e2+t21+t26+t27+t28$$

In the process shown in FIG. 7, step F43 is performed repeatedly to calculate the central activation value while incrementing the counter value i in step F47 so as to change the element pointed to by the counter value, until the central activation value has been updated for all elements included in the document.

When the updating of the central activation value is completed for all elements included in the document, the process goes from step F44 to F45.

In step F45, the controller 11 calculates the mean value of variations in the central activation value of all elements contained in the document. That is, the mean value of differences between the new and old central activation values of all elements is calculated.

More specifically, the controller 11 reads from the RAM 14 the old central activation values and the updated new central activation values for all elements. The controller 11 then calculates the differences between the new and old central activation values and divides the sum of differences by the total number of elements thereby determining the mean value of variations in central activation values of all elements.

The controller 11 then stores into the RAM 14 the mean value of the variations in the central activation values of all elements.

In the following step F46, the controller 11 determines whether the mean value calculated in step F45 is less than a predetermined threshold value.

If the mean value is less than the threshold value, the controller 11 terminates the process of spreading activation values. However, the mean value is not less than the threshold value, the process returns to step F42 to repeat the above-described process.

As a result of spreading activation values, the central activation values of elements related to elements having high central activation values become high.

However, if the spreading of activation values is performed only once, there is a possibility that the central activation value of an element, which should be increased to achieve the purpose of the indexing process, is not increased to a sufficiently high level. More specifically, although the central activation values of elements directly linked to an element having a high initial central activation value are increased to sufficiently high levels by one execution of the activation spreading process, the central activation values of elements that are not directly linked to an element having a high initial value are not increased to sufficiently high levels even when those elements are important to create the index.

To avoid the above problem, the spreading of activation values is performed as many times as required to satisfy the condition in step F46. That is, the spreading of activation values is performed repeatedly until the central activation values for all elements have substantially converged, thereby ensuring that the central activation values of all important elements are increased.

The central activation values of all elements can converge via the iterations of spreading activation values, because the central activation values of the respective elements are updated using central activation values calculated in the previous iteration. However, if the number of iterations is too great, the calculations are continued uselessly after the central activation values for all elements have converged.

To avoid the above problem, the mean value of variations in the central activation values between two successive iterations is calculated in step F45, and it is determined in step F46 whether the mean value have fallen within a predetermined small range. Thus, the calculation is terminated when the central activation values have substantially converged.

After completion of the spreading of activation values in FIGS. 7 and 8 (step F31 in FIG. 5), the controller 11 advances the process to step F32 shown in FIG. 5.

In step F32, the controller 11 evaluates the central activation values determined in step F31 for the respective elements and extracts elements having central activation values greater than a predetermined threshold value. The controller 11 stores the extracted elements in the RAM 14.

In the next step F33, the controller 11 reads the extracted elements from the RAM 14. The controller 11 then extracts all proper nouns included in the extracted elements and adds the extracted proper nouns to the index. Proper nouns have no word sense and they are not described in a dictionary. Thus, proper nouns are handled separately from the other words. Herein, as described earlier, a "word sense" refers to a particular meaning of a word having a plurality of meanings.

It is possible to determine whether each element is a proper noun, by checking an associated tag described in a document. For example, in the internal structure represented by tags as shown in FIG. 3, relational attributes represented by tags indicate that "A氏", "B会" and "C市" are "person name", "organization name", and "place name", respectively, and thus they are proper nouns. The controller 11 adds the extracted proper nouns to the index and stores the result in RAM 14.

In the next step F34, the controller 11 extracts, from the elements extracted in step F32, word senses other than the proper nouns and adds the extracted word senses to the index. The result is stored in the RAM 14.

By performing the above process, an index such as that described above in the specific example is obtained. That is, words characterizing a document including tags are detected, and an index is generated by listing the detected words. The significance of words included in a document is evaluated on the basis of the central activation values determined by means of spreading activation values depending upon the internal structure of the document.

Because indexes generated in the above-described manner include word senses and proper nouns that characterize documents, indexes can be used to retrieve a desired document.

In addition to the word senses and the proper nouns that characterize the document, the index also includes the document address representing the storage location of the RAM 14 (or the HDD 34) where the document is stored.

3.3 Browsing, Generation of Categories, and Categorization

The process of generating the index described above with reference to FIGS. 5 to 8 is performed in step F12 shown in FIG. 4. When the manual categorization process shown in FIG. 4 is performed, after the completion of generating the index, a user reads a document and manually categorizing the document, in steps F13 and F14.

In step F13 in FIG. 4, as described earlier, the user can read a document displayed on the display 30.

In step F14, the user generates categories and categorizes document data into categories generated.

The operations in steps F13 and F14 and other related operations performed by the controller 11 are described below with reference to specific examples.

Figure 9:
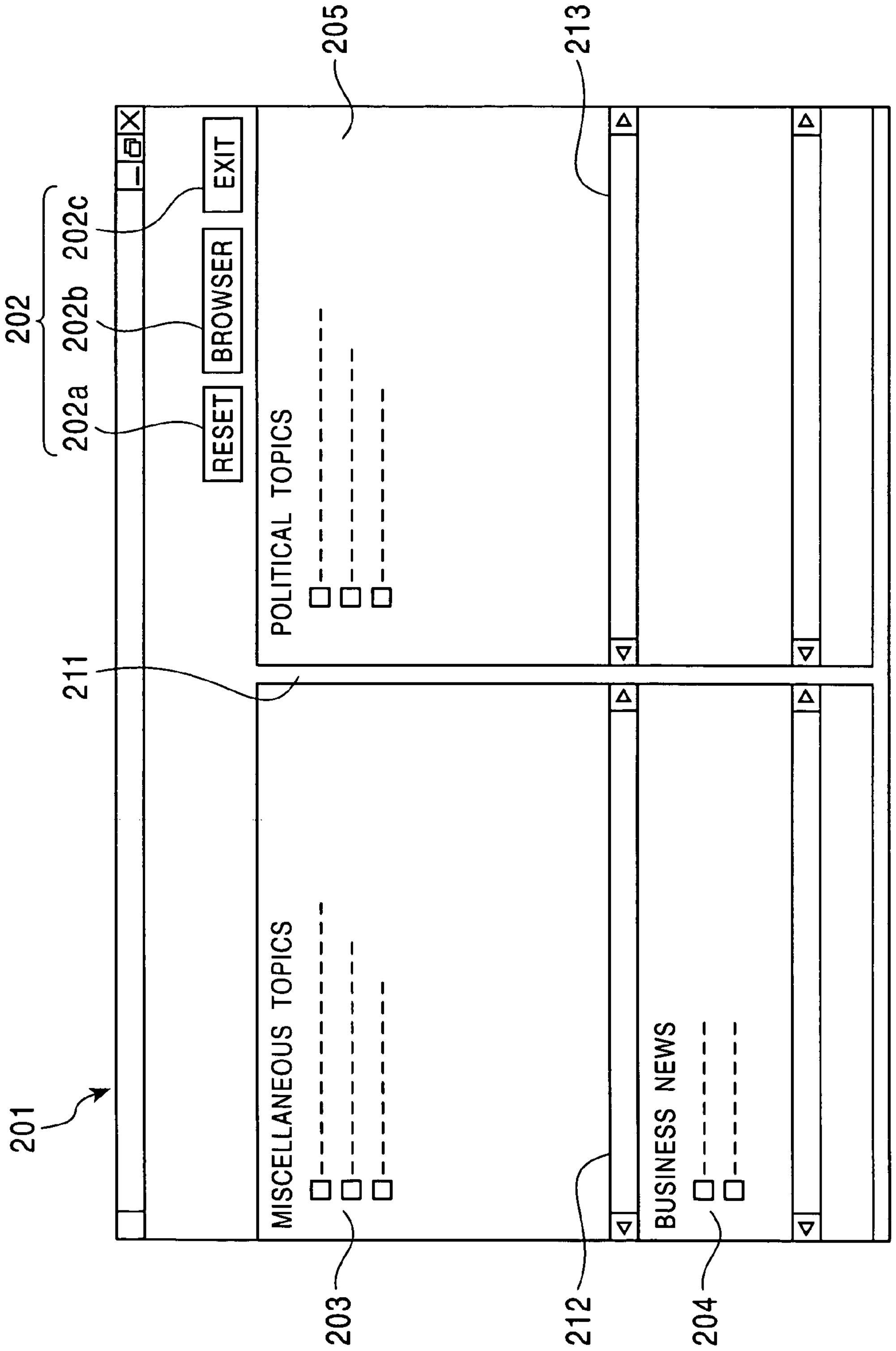
FIG. 9 is a schematic diagram illustrating a categorization window according to the embodiment of the invention.
Figure 10:
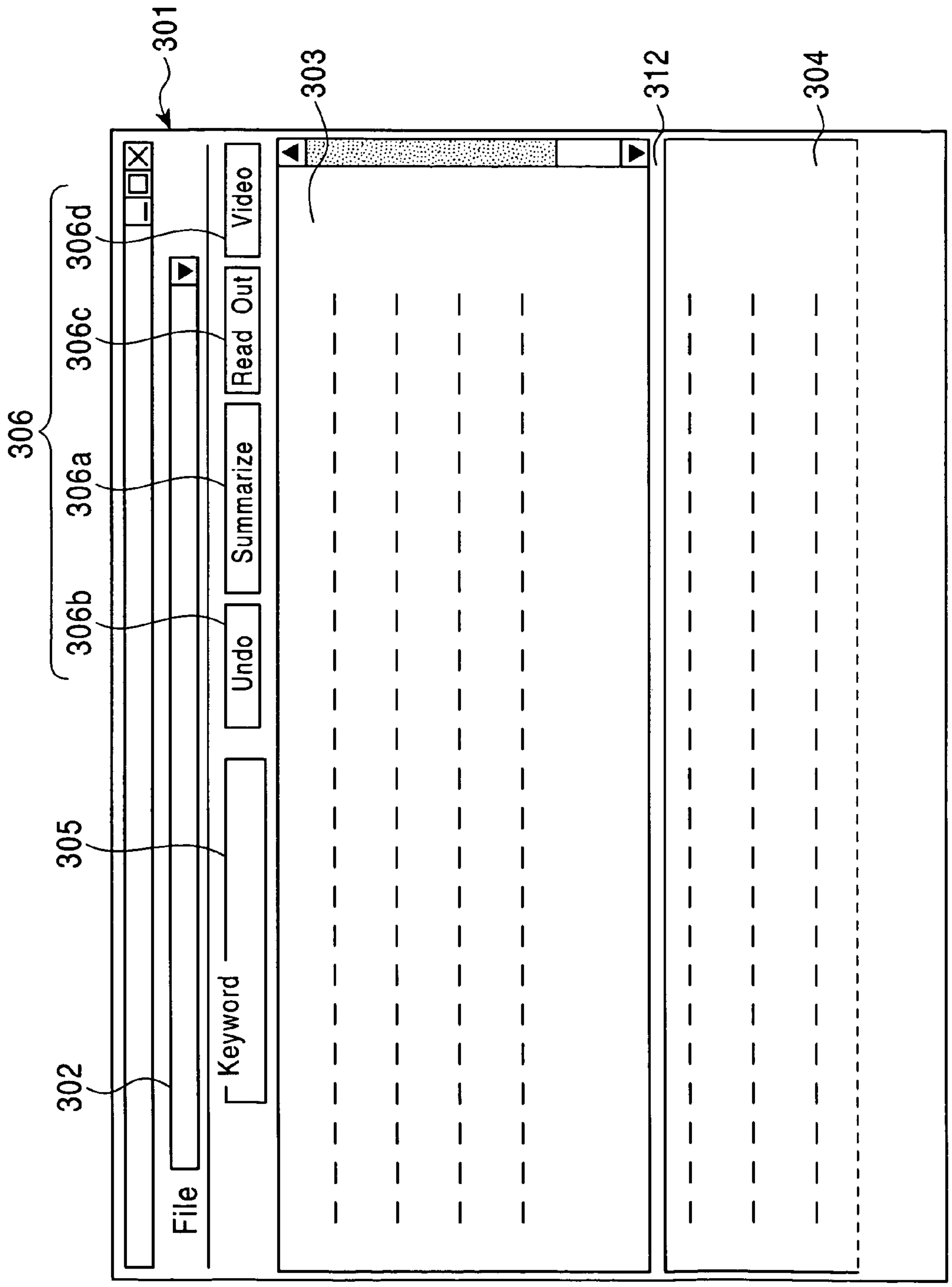
FIG. 10 is a schematic diagram illustrating a browser window according to the embodiment of the invention.

FIGS. 9 and 10 illustrate specific examples of documents displayed on the display 30.

FIG. 9 shows a document categorization window 201 used to categorize documents in accordance with a categorization model that will be described in detail later. In this specific example, the document categorization window 201 serves as a graphic user interface (GUI) for categorization of documents.

The document categorization window 201 includes operation control buttons 202 such as a position reset button 202*a* used to reset the window into an initial state, a browser button 202*b* used to browse documents, and an exit button 202*c* used to exit from the window 201.

The document categorization window 201 includes subwindows serving as document category displaying areas 203, 204, 205, etc., corresponding to categories based on the categorization model.

The document category displaying area 203 is used to display miscellaneous topics. That is, documents that have not been categorized yet are indicated in the document category displaying area 203. For example, documents that are received in step F11 in FIG. 4 (and that are to be categorized) are indicated in the document category displaying area 203 entitled "Miscellaneous Topics".

On the other hand, the document category displaying area 204 is used to indicate documents categorized in, for example, "business news".

The document category displaying area 205 is used to indicate documents categorized in, for example, "political news".

The other document category displaying areas having no reference numerals in FIG. 9 may also be used to indicate documents categorized in particular categories.

When documents are categorized in particular categories, document icons and document titles of documents are displayed in corresponding document category displaying areas 203, 204, etc. When a document has no title, a sentence representing the summary of the document is displayed.

The size of each document category displaying area 203, 204, etc., is not fixed. That is, the size of each document category display area can be changed to a desired size by moving the subwindow frames 211, 212, 213, etc., by means of dragging or the like. The number of document category displaying areas can be changed by a user to an arbitrary value.

The title (such as "Political News") of each document category displaying area 203, 204, etc., may be arbitrarily set and changed by a user.

The number of document category displaying areas and the titles thereof correspond to the number of categories and categories, respectively, defined in the categorization model that will be descried later. That is, the number of categories and the titles of the categories of the categorization model are set when a user sets the document category displaying areas or the title thereof in the categorization window 201 by using the mouse or the keyboard of the input unit 20.

FIG. 10 illustrates an example of a browser window 301 used by a user to browse documents.

For example, if a user clicks the browser button 202*b* in the categorization window 201 after selecting a document by clicking the corresponding icon or the like in the categorization window 201 shown in FIG. 9, then the controller 11 opens the browser window 301 as shown in FIG. 10 and displays the selected document therein.

The browser window 301 includes a file name displaying area 302 for displaying the file name of a selected document data file, a document displaying area 303 for displaying document data corresponding to the file name displayed in the file name displaying area 302, a summary displaying area 304 for displaying a summary of the document displayed in the document displaying area 303, and a keyword displaying area 305 used to input and display a keyword. Furthermore, the browser window 301 includes operation control buttons 306 such as a summarization button 306*a* used to start summarization, an undo button 306*b* used to cancel an operation, a read-out button 306*c* used to execute a read-aloud operation, and a video button 306*d* used to display video data.

In the browser window 301, a user can read a document displayed in the document displaying area 303. When the entire document is not displayed at a time in the document displaying area 303, a part of the document is displayed. In this case, the use can read the entire document by scrolling the document.

If the user clicks the summarization button 306*a*, a summary of the document displayed in the document displaying area 303 is generated and displayed in the summary displaying area 304.

On the other hand, if the user clicks the read-out button 306*c*, the document displayed in the document displaying area 303 or the summary thereof is read aloud.

If the user clicks the video button 306*d*, video data is displayed which is linked to the document displayed in the document displaying area 303 or the summary thereof displayed in the summary displaying area 304.

The details of the summarization process, the read-aloud process, and the video data outputting process performed by the controller 11 will be described later.

The categorization window 201 and the browser window 301 are displayed on the display 30 not only during the manual categorization process shown in FIG. 4 but also during other processes in response to a request issued by the user. For example, in the manual categorization process shown in FIG. 4, information about the types and the contents of received documents are displayed in the categorization window 201 or the browser window 301, and thus the user can acquire such information via the categorization window 201 or the browser window 301.

More specifically, if one or more documents are received in step F11 shown in FIG. 4, an index is generated in step F12 for the received documents. After that, the titles of the received documents are displayed in the document category displaying area 203 entitled "Miscellaneous Topics" in the categorization window 201 shown in FIG. 9.

Using the categorization window 201, the user manually categorizes the documents displayed in the document category displaying area 203. If the user cannot guess the content of a document from the title thereof, the user may display the document in the browser window 301 shown in FIG. 10 and read the content thereof. That is, in step F13 shown in FIG. 4, the user reads a document if reading is required for the above purpose.

In step F14, using the categorization window 201, the user may add, update, and delete a category, as required. In response to an operation performed by the user, the controller 11 changes the manner in which the document category displaying areas 203, 204, etc., are displayed (that is, the number, the size, and the title of document category displaying areas are modified).

If the user creates or modifies a category (the title of a document category displaying area), the creation or modification is reflected in the categorization model that will be described later.

After creating a category as required, the user categorize the respective documents displayed in the document category displaying area 203 into proper categories corresponding to document category displaying areas. Thus, documents are manually categorized by the user.

More specifically, the user drags, using the mouse of the input unit 20, the icons of documents displayed in the document category displaying area 203 entitled "Miscellaneous Topics" into document category displaying areas corresponding to desired categories.

For example, the user may create a document category displaying area entitled "Sports" and may drag the icon of a document on a sport displayed in the document category displaying area 203 entitled "Miscellaneous Topics" into the document category displaying area entitled "Sports".

After being dragged, the icons and the titles of the respective documents are displayed in document category displaying areas into which the documents have been dragged.

3.4 Creation/Registration of the Categorization Model

In step F15 shown in FIG. 4, after completion of the manual categorization, the controller 11 creates a categorization model including a plurality of categories on the basis of the categorization that has been manually performed by the user. More specifically, the controller 11 creates a categorization model by gathering indexes of a plurality of documents categorized in categories. After that, the controller 11 categorizes the plurality of documents into corresponding categories defined in the categorization model.

The categorization model consists of a plurality of categories in which documents are categorized, and the categorization model represents the correspondence between each category and documents.

As described above, an index is generated for each document in step F12. The categorization model has a data structure in which the indexes of the respective documents are related to the corresponding categories in which the documents are categorized. An example of such a categorization model is shown in FIG. 11A.

In the example shown in FIG. 11A, the categorization model includes categories "sport", "company", "computer", etc., which have been created by the user using the categorization window 201. Note that the categorization model may include a category that is not given by a user but that has been predefined. A document category displaying area corresponding to such a predefined category may also be displayed in the categorization window.

In the categorization model, correspondence between each category and indexes IDX1, IDX2, . . . is described. That is, the indexes of the respective documents are related to the corresponding categories in which the documents are categorized.

The indexes related to the respective categories are the same as those of documents displayed in the document category displaying areas corresponding to the respective categories in the categorization window 201.

For example, index IDX1 is related to category "sport" because a user has created a document category displaying area entitled "sport" in the categorization window 201 and dragged the icons of a document having index IDX1 into the document category displaying area entitled "sport".

As described earlier, each index includes one or more proper noun and word senses other than the proper nouns, and also includes a document address.

As shown in FIG. 11A, one or more indexes are related to each category. Because each index includes one or more proper noun and word senses other than the proper nouns and also includes a document address, the categorization model may also be represented as shown in FIG. 11B.

In the example shown in FIG. 11B, the categorization model has index fields for describing proper nouns, word senses other than proper nouns, and document addresses.

In this categorization model, proper nouns "Mr. A", etc., are related to category "sport", "Mr. B", etc., to "company", C Company", "G Company", etc., to "computer", "D species", etc., to "plant", "Mr. E", etc., to "art", and "Mr. F", etc., to "event".

Similarly, word senses such as "base ball (4546)", "grand (2343)", "labor (3112)", "employment (9821)", "mobile (2102)", "cherry-1 (11111)", "orange-1 (9911)", "cherry-2 (11112)", "orange-2 (9912)", and "cherry-3 (11113)" are related to the corresponding categories.

Furthermore, document addresses such as "SP1", "SP2", "SP3,", . . . , "S01", "S02", "S03", . . . , "C01", "C02", "C03", . . . , "PL1", "PL2", "PL3", . . . , "AR1", "AR2", "AR3", . . . , and "EV1", EV2", "EV3", . . . are also related to the corresponding categories.

Herein, "cherry-1", "cherry-2", and "cherry-3" represent the first word sense (11111), the second word sense (11112), and the third second word sense (11113), respectively, of "cherry". Similarly, "orange-1", and "orange-2" represent the first word sense (9911) and the second word sense (9912), respectively, of "orange". More specifically, for example, "orange-1" represents an orange that is one of plants, and "orange-2" represents an orange color.

For general nouns other than proper nouns, not words but word senses are used because a word can have a plurality of meanings.

In step F15 shown in FIG. 4, a categorization model is generated in the above-described manner on the basis of manual categorization performed by a user. In the next step F16, the generated categorization model is registered, that is, stored in the RAM 14 (or the HDD 34).

Thus, by generating and registering the categorization model, documents are categorized.

After generating and registering the categorization model steps F15 and F16 shown in FIG. 4, the categorization model is updated via an automatic categorization process that will be described later, or via a modification of a category or a further manual categorization process performed by a user.

If the categorization model is updated, the date and time of update is written in the categorization model. In the example shown in FIG. 11, the date and time of update is written as "1998:12:10:19:56:10".

4. Automatic Categorization of Document Data 4.1 Procedure

In the document processing apparatus 1 according to the present embodiment, once a categorization model is generated, it becomes possible to perform an automatic categorization process to automatically categorize document data input from the outside via the communication device 21 or the like.

That is, when the document processing apparatus 1 receives document data from the outside, the automatic categorization process is performed to categorize the received document data, as is described in detail below.

In the following description, it is assumed that the automatic categorization process is performed each time one document is received. However, the automatic categorization process may be performed each time a predetermined number of documents have been received. Alternatively, the automatic categorization process may be performed when the window shown in FIG. 9 is opened. In this case, the automatic categorization process may be performed for all documents that have been received at that time.

Figure 12:
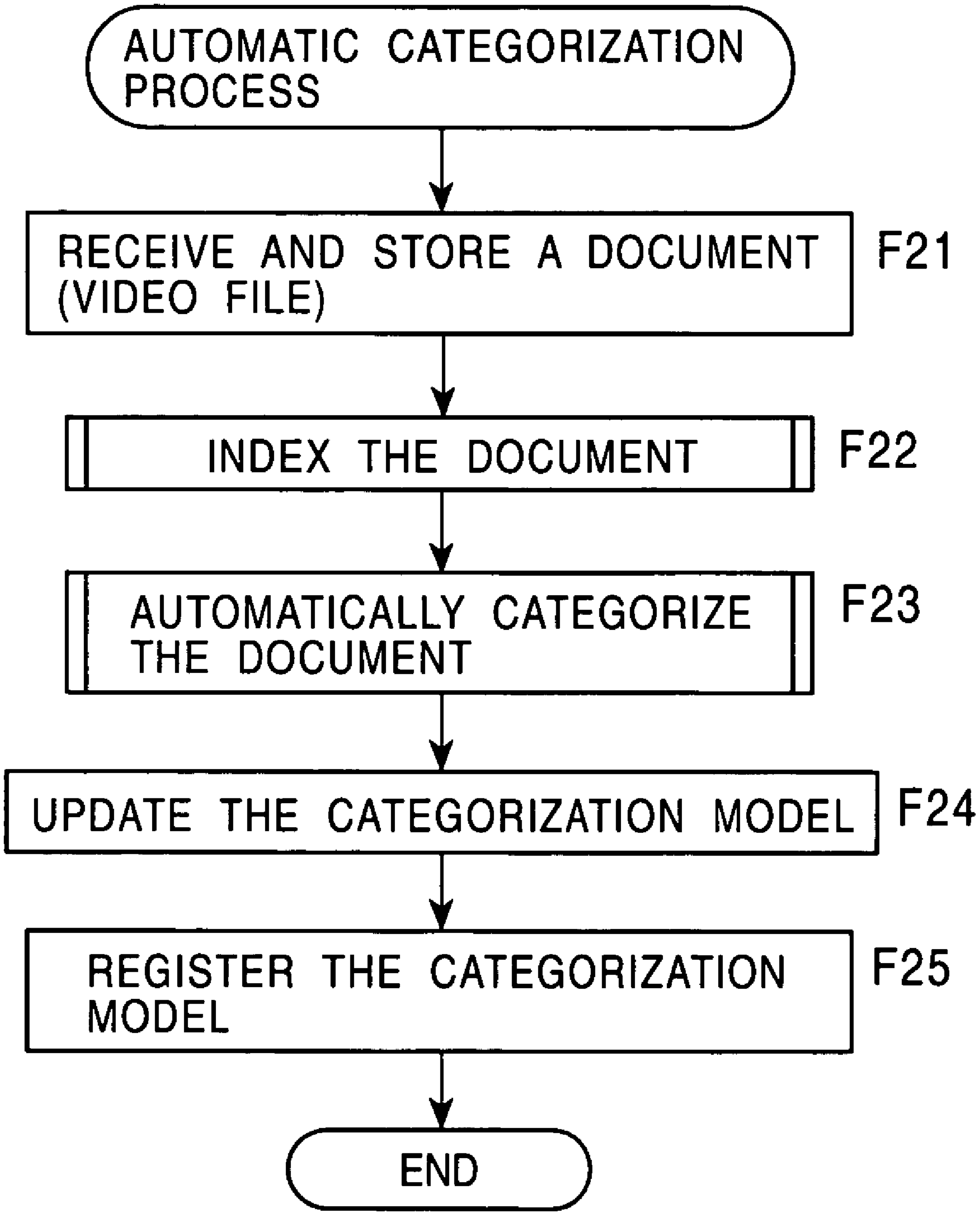
FIG. 12 is a flow chart illustrating an automatic categorization process according to the embodiment of the invention.

The outline of the automatic categorization process is shown in FIG. 12.

In step F21 in FIG. 12, the receiver 21 of the document processing apparatus 1 receives a document. In this step F21, the receiver 21 receives one or more documents via, for example, a communication line. The received one or more documents are transferred to the main unit 10 of the document processing apparatus 1. The controller 11 stores the one or more documents into RAM 14 or the HDD 34.

In the case where one or more video files are received together with document data (or independently of document data), the controller 11 also stores the video files in the RAM 14 or the HDD 34.

In the next step F22, the controller 11 generates an index for each document data received in step F21.

In step F23, the controller 11 automatically categorizes each document with an index into one of categories of the categorization model. The controller 11 stores the categorization result in the RAM 14. Each step in the automatic categorization process will be described in further detail later.

In step F24, the controller 11 updates the categorization model on the basis of the result of automatic categorization performed upon the new document in step F23.

In step F25, the controller 11 registers the resultant categorization model updated in step F24, by storing it in the RAM 14.

Thus, by performing the process shown in FIG. 12 in the above-described manner, the document data input to the document processing apparatus 1 is automatically categorized in accordance with the categorization model.

That is, in the automatic categorization process, an index is first generated for a received document, and then the document is automatically categorized. Furthermore, proper nouns, word senses, and the document address described in the index are related to a category on the categorization model as shown in FIG. 11 (thereby updating the categorization model).

Steps F21 and F22 are performed in a similar manner to steps F11 and F12 in the manual categorization process described above. That is, the indexing process in step F22 is performed in a similar manner as described above with reference to FIGS. 5 to 8, and thus it is not described in further detail herein.

In step F24, the categorization model is updated on the basis of the result of the automatic categorization performed in step F23.

The automatic categorization in step F23 is performed in a different manner from the manual categorization process, as will be described below.

4.2 Automatic Categorization

Figure 13:
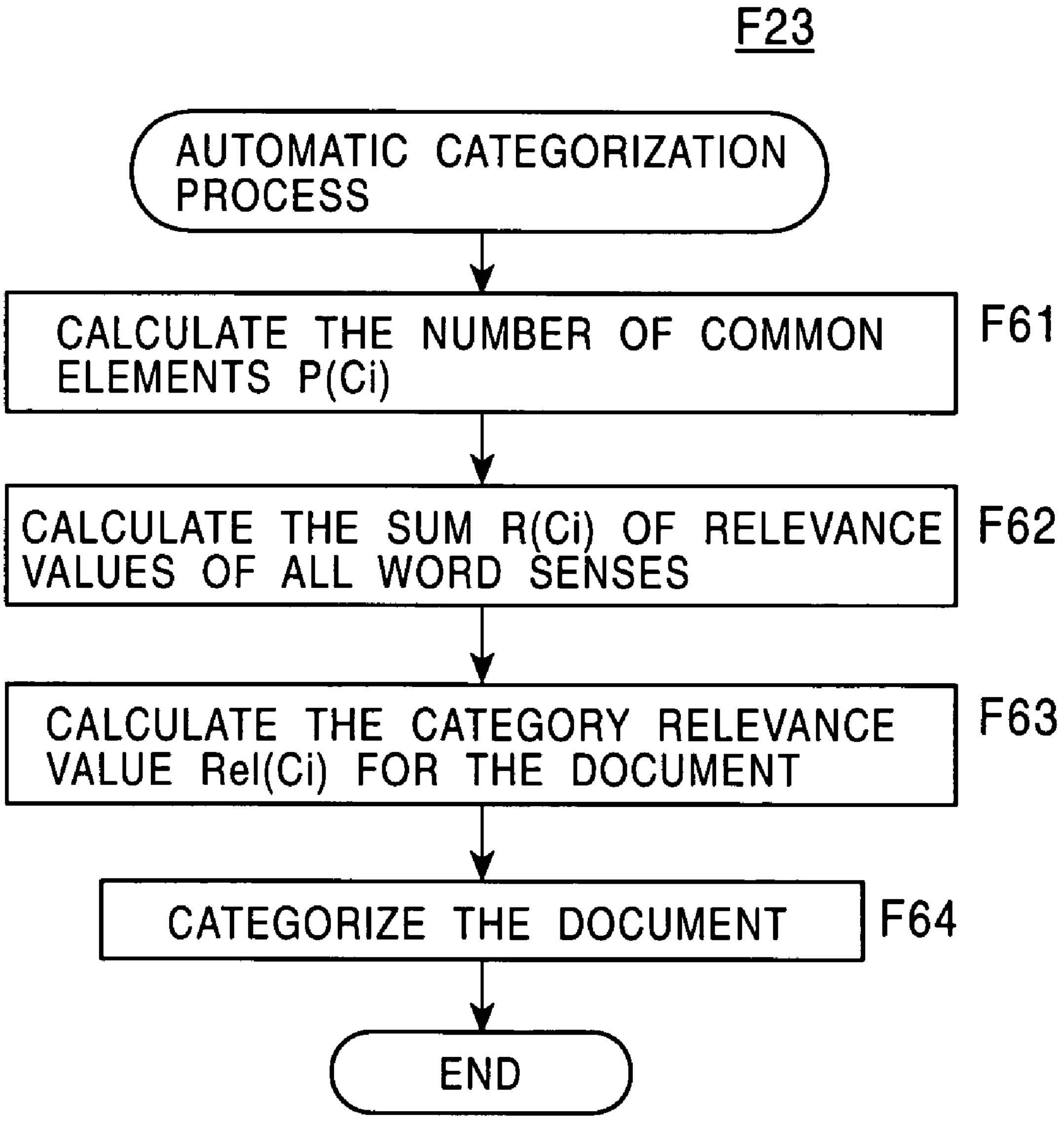
FIG. 13 is a flow chart illustrating an automatic categorization step according to the embodiment of the invention.

FIG. 13 illustrates details of the automatic categorization process in step F23 shown in FIG. 12.

In step F61 in FIG. 13, the controller 11 determines the number P(Ci) of proper nouns that are included in both the set of proper nouns belonging to the category Ci defined in the categorization model and the set of words extracted from the document received in step F21 and employed as elements of the index of the document. The controller 11 stores the calculated number P(Ci) into the RAM 14.

In step F62, the controller 11 determines the word sense relevance values between all word senses included in the index of the document and all word senses included in reach category Ci by referring to a word sense relevance table in FIG. 15 that will be described later. The controller 11 then calculates the sum R(Ci) of the word sense relevance values.

That is, the controller calculates the sum R(Ci) of word sense relevance values for words on the categorization model other than proper nouns. The controller 11 stores the calculated sum R(Ci) of word sense relevance values into the RAM 14.

The word sense relevance value is described below.

Figures 15, 16:
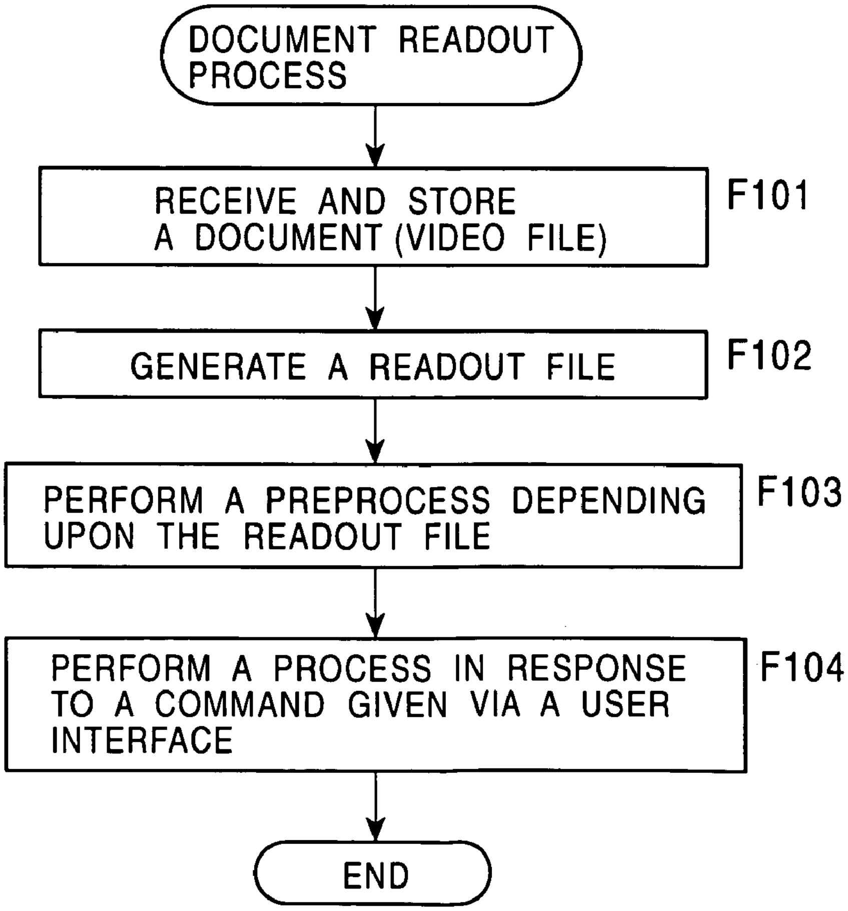
FIG. 15 is a table illustrating word sense relevance values according to the embodiment of the invention.
FIG. 16 is a flow chart of a process of reading aloud a document according to the embodiment of the invention.

The word sense relevance value is calculated in advance for each word sense contained in an electronic dictionary provided in the document processing apparatus 1, and the calculated word sense relevance values are stored as shown in FIG. 15.

Figure 14:
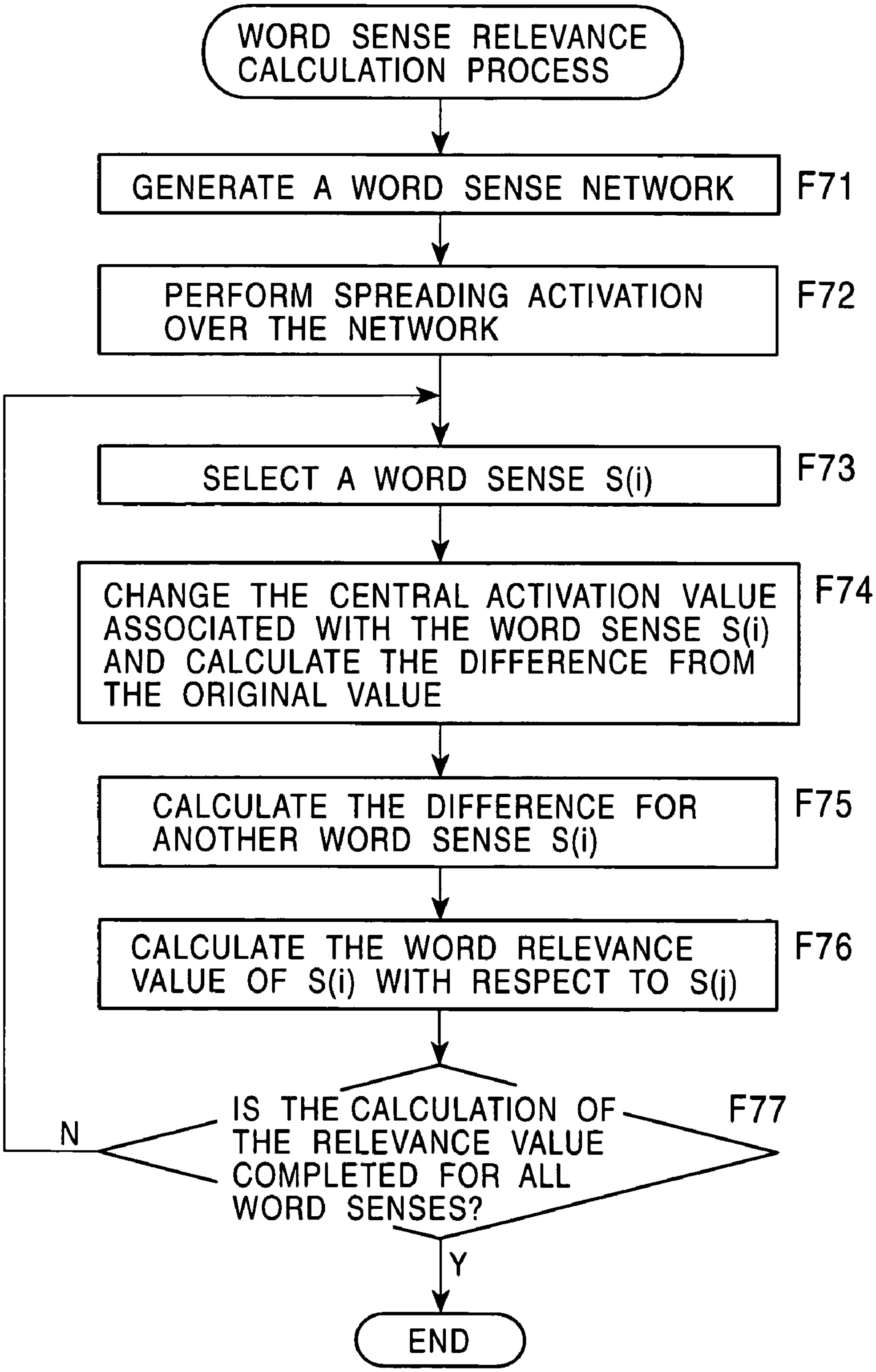
FIG. 14 is a flow chart illustrating a process of calculating a word sense relevance values according to the embodiment of the invention.

That is, if the controller 11 performs the process shown in FIG. 14 once, the obtained relevance values can be used in the automatic categorization process shown in FIG. 13.

More specifically, the process shown in FIG. 15 is performed by the controller 11 as described below.

First, in step F71, the controller 11 generates a word sense network in accordance with explanations of word senses described in the electronic dictionary.

More specifically, the word sense network is generated in accordance with the explanations of the respective word senses described in the dictionary and the referential relations of word senses appearing in the explanations.

The internal structure of the network is described by tags such as those described above. The controller 11 of the document processing apparatus 1 sequentially reads word senses and explanations thereof described in the electronic dictionary stored in the RAM 14 and generates a network.

The controller 14 stores the generated word sense network in the RAM 14.

Instead of generating a network by the controller 11 of the document processing apparatus 1 using the dictionary, a network may also be obtained by receiving from the outside via the receiver 21 or by installing from the storage medium 32 via the write/read unit 31.

Similarly, the electronic dictionary may also be obtained by receiving from the outside via the receiver 21 or by installing from the storage medium 32 via the write/read unit 31.

In step F72, spreading of central activation values of elements of the respective word senses is performed over the word sense network generated in step F71. In this activation spreading process, the central activation values associated with the respective word senses are given in accordance with the internal structure described by tags using the dictionary. The process of spreading activation values is performed in the manner described above with reference to FIG. 7.

In step F73, one word sense Si is selected from elements constituting the word sense network generated in step F71. In the next step F74, the initial central activation value ei of the element Ei corresponding to the word sense Si is changed, and the change Δei in the central activation value from the initial value is calculated.

In the next step F75, the change Δej in the central activation value ej of an element Ej corresponding to another word sense Sj in response to the change Δei in the central activation value of the element Ei is determined.

In step F76, the difference Δej obtained in step F75 is divided by Δei obtained in step F74. The resultant ratio Δej/Δei is employed as the word sense relevance value of the word sense Si with respect to the word sense Sj.

In step F77, it is determined whether the word sense relevance values have been calculated for all possible combinations between one word sense Si and all other word senses Sj.

If word sense relevance values have not been calculated for all possible combinations, the process returns to step F73 to calculate the word sense relevance value for a remaining combination.

In the loop from step F73 to F77, the controller 11 sequentially reads values required for the calculation from the RAM 14 and calculates the word sense relevance values in the above-described manner. The controller 11 sequentially stores the calculated word sense relevance values into the RAM 14.

If it is determined in step F77 that the word sense relevance values have been calculated for all possible combinations of two word senses, the process is terminated.

In the calculation of word sense relevance values, as can be seen from the above description, when the central activation value of a certain word sense is changed, if the central activation value of some other word sense changes to a great degree, then that word sense is regarded as having a high relevance.

That is, if the central activation value of a certain word sense is changed in step F74, this change results in changes in the central activation values of word senses related (linked) to that word sense. Therefore, the relevance of word senses with respect to a certain word sense can be determined from the relative changes. (As described earlier, the central activation value of an element Ei is given by the sum of the current central activation value and the end-point activation values associated with that element Ei. Herein, the end-point activation values of the element Ei depend upon the central activation value and end-point activation values of elements linked to the element Ei. Therefore, if an element Ej has a high degree of relevance to the element Ei, a change in the central activation value of the element Ei generates a large change in the central activation value of the element Ej.)

By performing the above-described process for all possible combinations of two word senses, the relevance values are obtained for all possible combinations of two word senses.

A word sense relevance value is defined between each word sense and another word sense, as shown in FIG. 15. In the example of the word sense relevance table shown in FIG. 15, word sense relevance values are normalized such that they take a value within the range from 0 to 1. In the example shown in FIG. 15, the word sense relevance values among “computer”, “television”, and “VTR” are described in the table. Herein, the relevance value between “computer” and “television” is 0.55, and that between “computer” and “VTR” is 0.25. The relevance value between “television” and “VTR” is 0.60.

Referring again to FIG. 13, after performing step F62 using the word sense relevance values which have been calculated in advance in the above-described manner, the controller 11 performs step F63 to calculate the document category relevance value Rel(Ci) of a document with respect to category Ci according to the following equation:

$$Rel(Ci)=mlP(Ci)+nlR(Ci)$$

where coefficients ml and nl are constants representing the degrees of contributions of the respective values to the document category relevance.

In the above process, the controller 11 calculates, according to the above equation, the document category relevance value Rel(Ci) using the number P(Ci) of common elements calculated in step F61 and the sum R(Ci) of word sense relevance values calculated in step F62.

The controller 11 stores the calculated document category relevance value Rel(Ci) into the RAM 14.

The coefficients ml and nl may be set to, for example, 10 and 1, respectively.

The values of coefficients ml and nl may also be determined statistically. In this case, the controller 11 calculates the document category relevance value Rel(Ci) using various values of ml and nl, and employs optimum values.

In step F64, the controller 11 categorizes the document into category Ci if the document category relevance value Rel(Ci)

of the document becomes highest for category Ci and if the document category relevance value Rel(Ci) is greater than a threshold value.

That is, the controller 11 calculates document category relevance values with respect to a plurality of categories, and selects a category corresponding to the highest document category relevance value. If the document category relevance value corresponding to the selected category is greater than the threshold value, the controller 11 categorizes the document into the selected category. Thus, the document is automatically categorized into a correct category.

If the highest document category relevance value is not greater than the threshold value, the document is not categorized into any category.

After performing the automatic categorization in step F23 in FIG. 12, which is described in further detail in FIG. 13, the categorization model is updated and registered in steps F24 and F25, respectively, in accordance with the result of the automatic categorization. Thus, the entire process associated with the automatic categorization is completed.

In this way, the document data input to the document processing apparatus 1 is automatically categorized, and displayed in a corresponding document category displaying area in the document categorization window 201 shown in FIG. 9, thereby informing the user of the reception of the document.

5. Reading Aloud Document

Now, the process of reading aloud document data is described.

As described earlier, a user can select a document and read the selected document displayed in the browser window 301 shown in FIG. 10. The browser window 301 can be opened from the categorization window 201 shown in FIG. 9 when the above-described manual categorization process is performed in step F13 or at any other time.

For example, if the user clicks the browser button 202*b* in the categorization window 201 after selecting a document, the browser window 301 is opened and the selected document is displayed in the document displaying area 303 as will be described later with reference to FIG. 26.

When the entire document is not displayed at a time in the document displaying area 303, a part of the document is displayed.

Figure 26A:
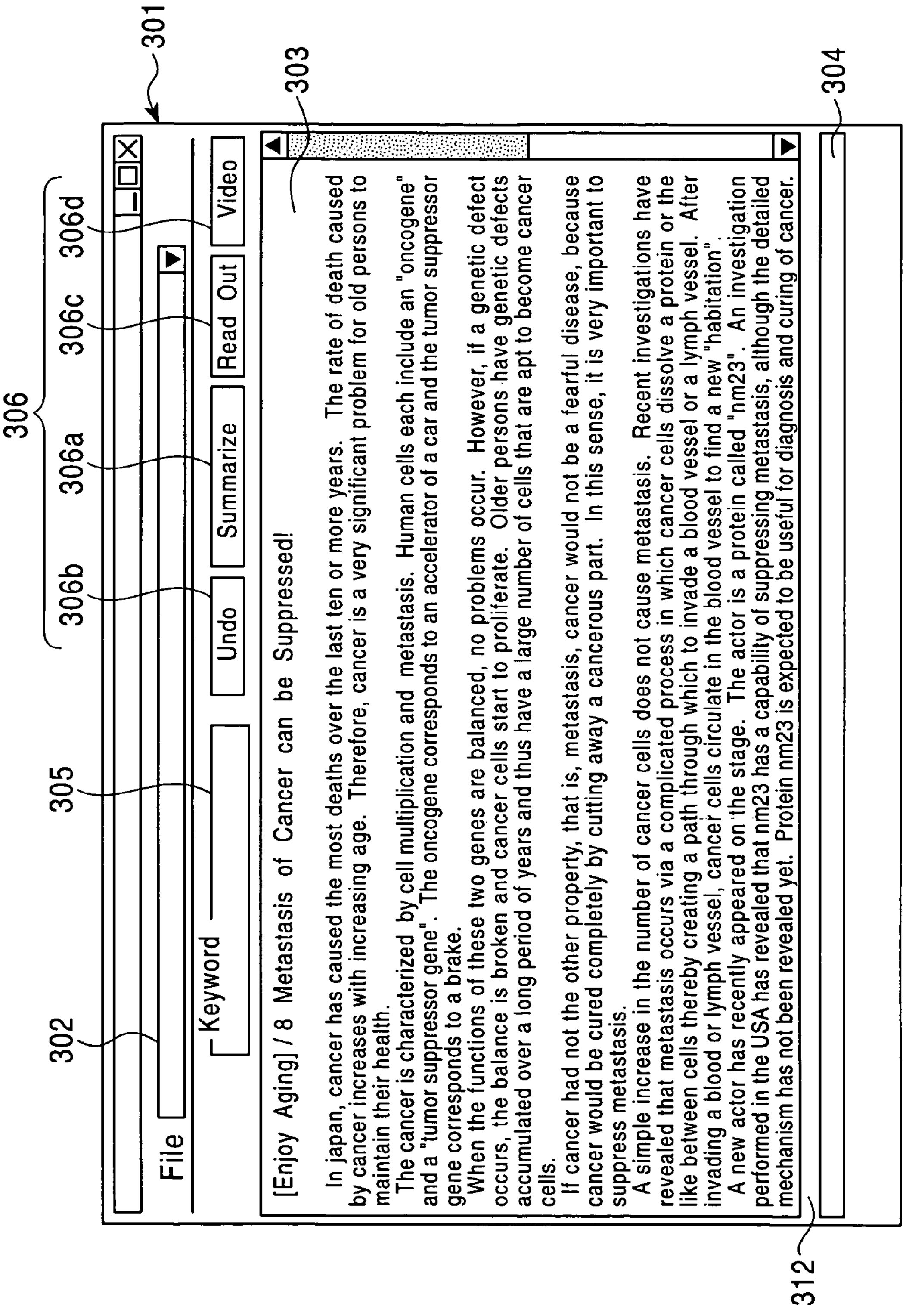
FIGS. 26A and 26B are schematic diagrams illustrating an example of a browser window according to the embodiment of the invention.
Figure 26B:
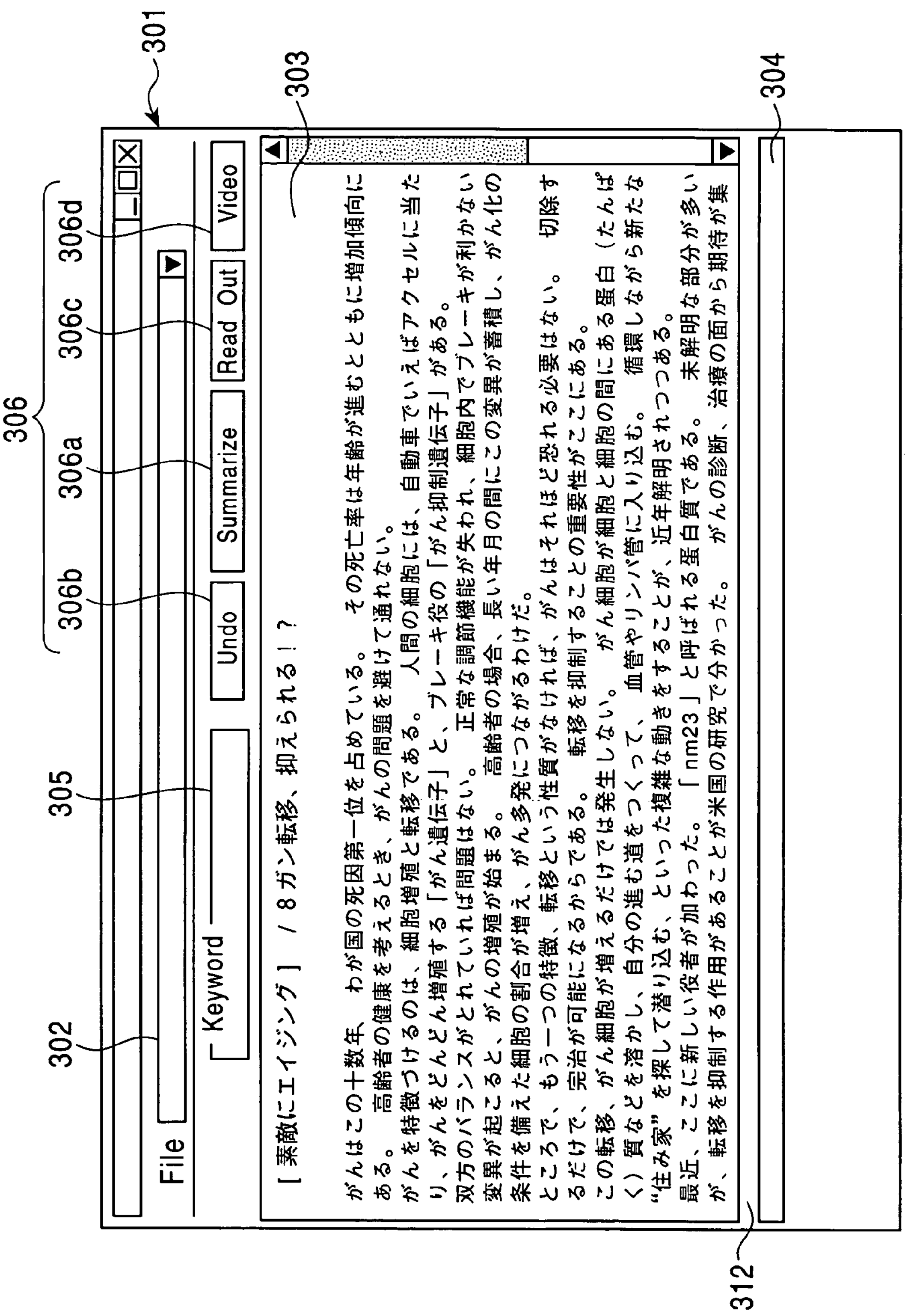

When a summary has not been generated yet, nothing is displayed in the summary displaying area 304 as shown in FIG. 26. The process of summarizing a document and displaying the resultant summary will be described later.

As described above, when the document processing apparatus 1 receives a document including a tag, the document or a summary thereof is displayed so that a user can read it. Furthermore, the document processing apparatus 1 is capable of outputting a voice that reads aloud the received document.

In this case, a read-aloud program stored in the ROM 15 or the HDD 34, in which other various electronic document processing programs are also stored, is started to perform the process shown in FIG. 16 thereby reading aloud a document.

The outline of the read-aloud process is descried first, and then various steps of the read-aloud process are described in detail with reference to specific examples of documents.

In step F101 shown in FIG. 16, the controller 11 performs reception and storage of a document in a similar manner to step F11 shown in FIG. 4 (or step F21 in FIG. 12). As described earlier, when a document (including a tag) is received, the document is categorized manually or automatically. After that, read-aloud processing is performed. Note that the read-aloud processing may be performed after or before step F101.

In order to perform the read-aloud processing, the document has to include a tag required to control voice synthesizing operation. Note that after receiving a document including a tag, the document processing apparatus 1 may attach to the document an additional tag for controlling the voice synthesizing operation. Hereinafter, a document including a tag will be referred to as a tag file regardless of whether the tag is added after receiving the document or the tag is included in the original document.

In the next step F102 in the read-aloud processing, the document processing apparatus 1 generates a read-out file on the basis of the tag file, under the control of the CPU 13. The read-out file is generated by extracting read-aloud attribute information from a tag described in the tag file and embedding attribute information, as will be described in detail later.

In the next step F103, under the control of the CPU 13, the document processing apparatus 1 performs optimization associated with the voice synthesis engine using the read-out file.

The voice synthesis engine may be implemented with hardware or software. When the voice synthesis engine is implemented with software, the voice synthesis engine program is stored in advance in the ROM 15 or the HDD 34.

Various functional blocks of the document processing apparatus 1 for performing the reading-aloud process, the process of generating and displaying a document, the process of outputting video data, and other processes will be described later with reference to FIG. 47. The above-described voice synthesis engine corresponds to a voice synthesis engine 601 shown in FIG. 47.

In the next step F104, the document processing apparatus 1 performs various processes in response to a command issued by a user via the user interface that will be described later.

One of such processes performed by the document processing apparatus 1 is to read aloud a document. Each step of the reading-aloud process is described in detail below.

First, reception and/or generation of a document in step F101 is described.

The document processing apparatus 1 receives a document (including a tag required to control the voice synthesis operation) via, for example, the communication device 21.

Alternatively, the document processing apparatus 1 may generate a document by inserting an additional tag for controlling voice synthesis into the received document.

By way of example, we assume herein that the document processing apparatus 1 has received or generated a document written in Japanese and also a document written in English, wherein both documents include a tag.

The content of the Japanese document is shown below.

素敵にエイジング/8　ガン転移、抑えられ　る！？がんはこの十数年、
わが国の死因第一位を占めている。その死亡率　は年齢が進む
とともに増加傾向にある。高齢者　の健康を考えるときがんの問題
を避けて通れ　ない。がんを特徴　づけるのは細胞増殖と
転移である。人間の細　胞には自動車　でいえばアクセルに当
たり、がんをどんどん増殖する「がん遺伝　子」と、ブレーキ役の
「がん抑制遺伝子」がある。双方のバランスが取れていれば　問題はない。
正常な調節機能が失われ、細胞内でブレーキが利　かない変異が起こると、
がんの増殖が始まる。高齢者の場合、長い年月　の間にこの変異が
蓄積し、がん化の条件を備えた細胞の割合が増え、　がん多発につながる
わけだ。ところで、　もう一つの特徴、　転移という性質がなければ、
がんはそれほど恐れる必要はない。切除するだけで、完治が可能　になるか
らである。転移を抑制することの重要性がここにある。この転移、がん細胞が
増えるだけでは発生　しない。がん細胞　が細胞と細胞の　間にある蛋
白(たんぱく)質などを溶かし、自分の進む　道をつくって、　血管やリン
パ管に入り込む。循環しながら新たな"住み家"を探して潜探して潜といっ
た複雑な動きをすることが、近年解明されつつある。

A translation of the above document into English is shown below.

[Enjoy Aging]/8 Metastasis of Cancer can be Suppressed! In Japan, cancer has caused the most deaths over the last ten or more years. The rate of death caused by cancer increases with increasing age. Therefore, cancer is a very significant problem for old persons to maintain their health. The cancer is characterized by cell multiplication and metastasis. Human cells each include an "oncogene" and a "tumor suppressor gene". The oncogene corresponds to an accelerator of a car and the tumor suppressor gene corresponds to a brake. When the functions of these two genes are balanced, no problems occur. However, if a genetic defect occurs, the balance is broken and cancer cells start to proliferate. Older persons have genetic defects accumulated over a long period of years and thus have a large number of cells that are apt to become cancer cells. If cancer had not the other property, that is, metastasis, cancer would not be a fearful disease, because cancer would be cured completely by cutting away a cancerous part. In this sense, it is very important to suppress metastasis. A simple increase in the number of cancer cells does not cause metastasis. Recent investigations have revealed that metastasis occurs via a complicated process in which cancer cells dissolve a protein or the like between cells thereby creating a path through which to invade a blood vessel or a lymph vessel. After invading a blood or lymph vessel, cancer cells circulate in the blood vessel to find a new "habitation". A new actor has recently appeared on the stage. The actor is a protein called "nm23". An investigation performed in the USA has revealed that nm23 has a capability of suppressing metastasis, although the detailed mechanism has not been revealed yet. Protein nm23 is expected to be useful for diagnosis and curing of cancer.

The content of the English document is shown below.

"During its centennial year, The Wall Street Journal will report events of the past century that stand as milestones of American business history. THREE COMPUTERS THAT CHANGED the face of personal computing were launched in 1977. That year the Apple II, Commodore Pet and Tandy TRS came to market. The computers were crude by today's standards. Apple II owners, for example, had to use their television sets as screens and store data on audio cassettes."

Figure 27A:
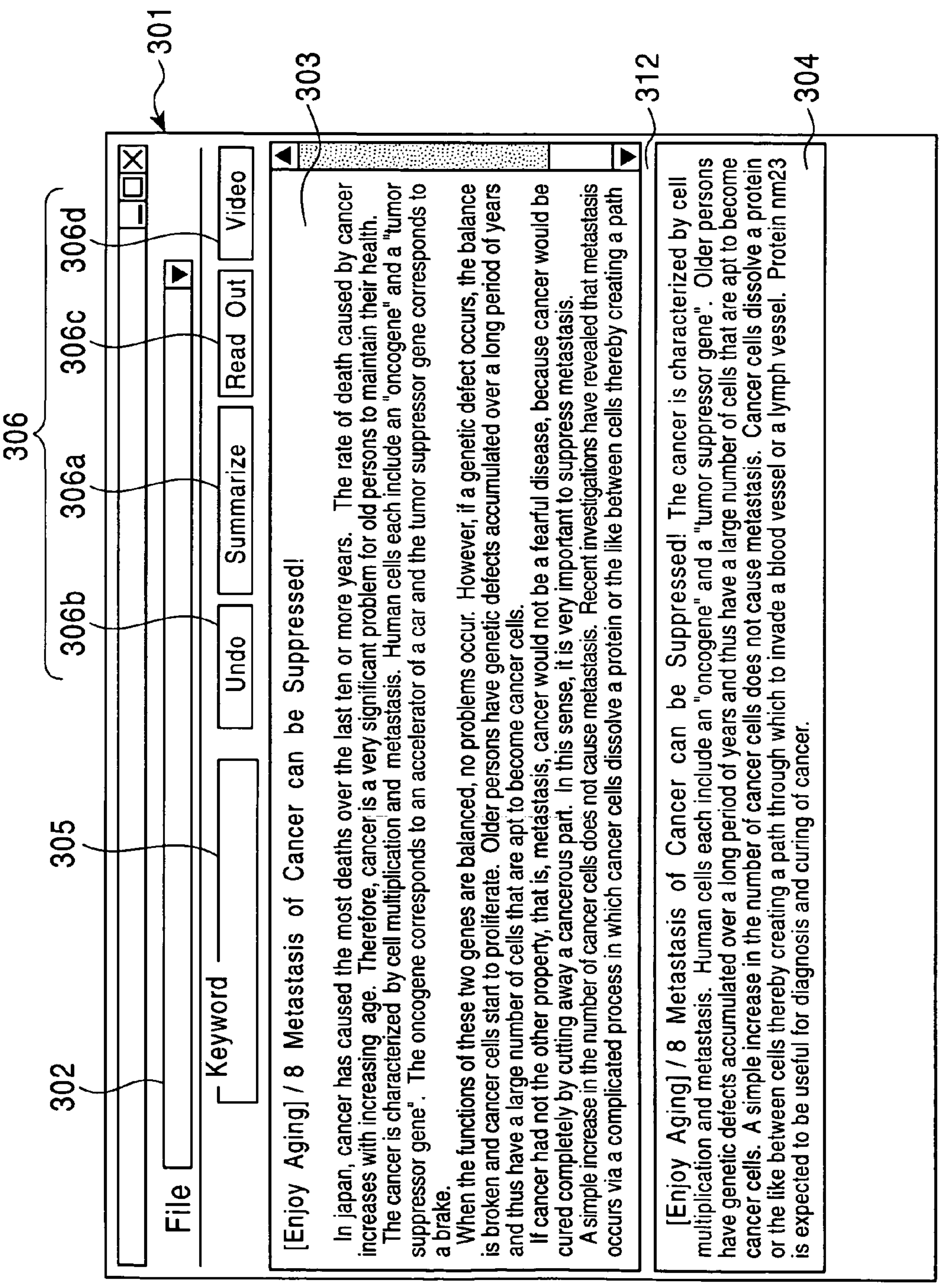
FIGS. 27A and 27B are schematic diagrams illustrating an example of a browser window in which a summary is displayed, according to the embodiment of the invention.
Figure 27B:
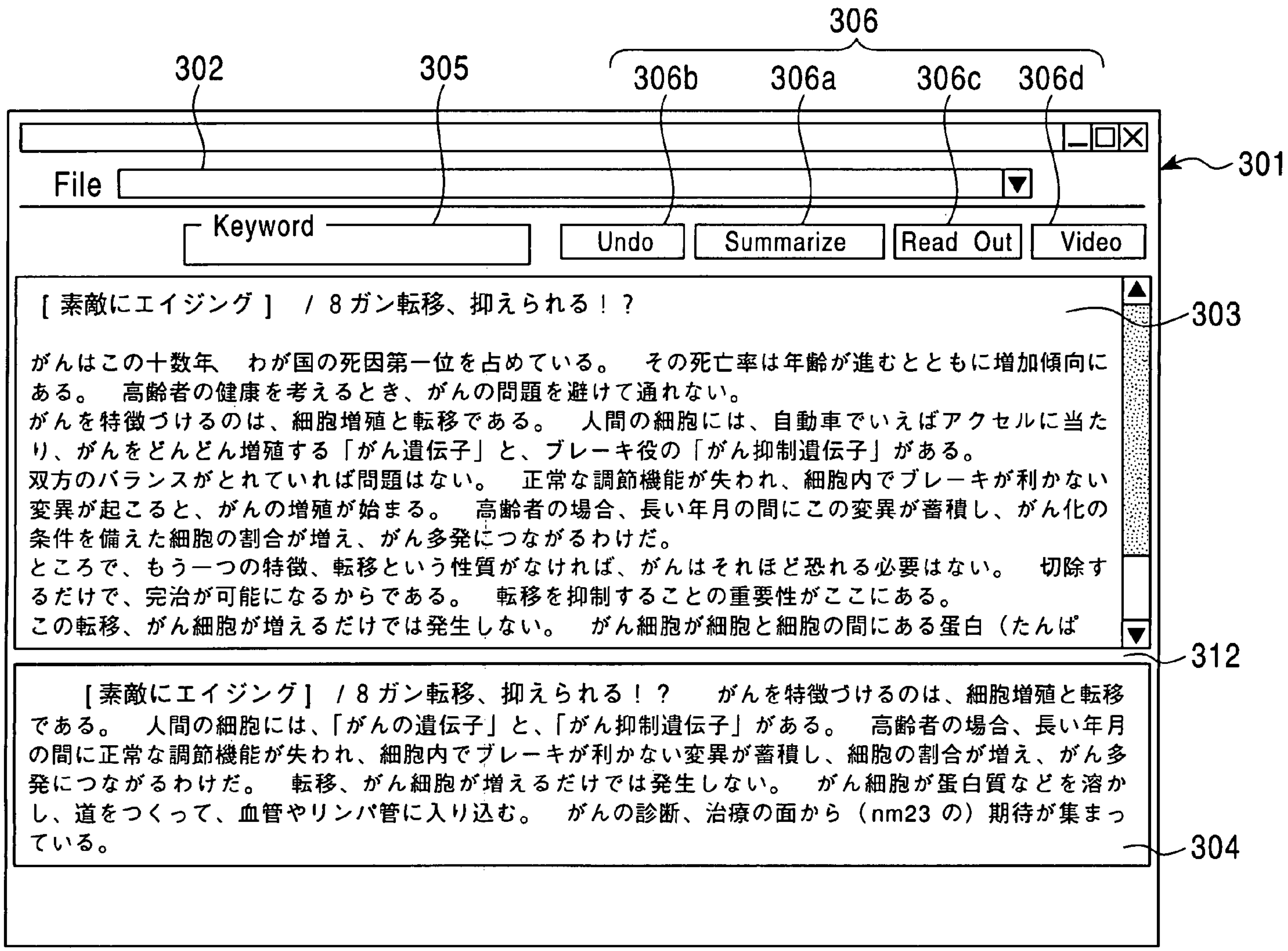

When the document processing apparatus 1 receives such a document written in Japanese or English and including tags, the document processing apparatus 1 may categorize it and display the content of the document or a summary thereof, as shown in FIG. 26 or 27.

The above documents written in Japanese and English are described in the form of tag files as shown in FIGS. 18 and 19, respectively.

FIG. 18A illustrates a part of the tag file corresponding to the title. FIG. 18B illustrates a part of the last paragraph of the tag file.

Note that the tag file actually includes the entire part from the title to the end of the last paragraph.

In FIG. 18A, a tag <title> is used to indicate that the part following this tag is the title.

In the tag file shown in FIGS. 18A and 18B, tags are inserted in a similar manner to tags used to describe the document data structure as described earlier with reference to FIG. 2. Although all tags are not described here, a plurality of tags for controlling voice synthesis are put at various locations.

An example of a voice synthesis control tag is that which is attached when a document includes information representing the pronunciation of a word, as is the case with Example 1 shown in FIG. 18B. In this example, pronunciation="null" is described as attribute information in a tag to prevent pronunciation characters "(たんぱく)" representing the pronunciation of a word "蛋白" located before the pronunciation characters from being read aloud. Herein, "蛋白" is a Japanese word corresponding to "protein" and "たんぱく" represents its pronunciation. If pronunciation="null" is not specified, the Japanese word "蛋白" corresponding to "protein" will be pronounced twice because of the presence of the pronunciation characters.

Another tag for controlling voice synthesis is that used to represent the pronunciation of a word which is difficult to pronounce. In Examples 2 in FIG. 18B, attribute information, pronunciation="りんぱかん", is described in a tag to indicate the correct pronunciation of a word "りんぱ管". Similarly, in Example 3 in FIG. 18B, attribute information pronunciation="すみか" is described in a tag to indicate the correct pronunciation of a word "住み家". Herein, "りんぱ管" is a Japanese word corresponding to "lymph vessel", and "住み家" corresponds to "habitation".

In the example shown in FIG. 19, the tag file also includes tags for controlling voice synthesis. In Example 4 in FIG. 19, pronunciation="two" is described in a tag to indicate the correct pronunciation of "II". This ensures that "II" is correctly pronounced as "two".

In the case where a document includes a quotation, a tag is put in the document to indicate that a sentence is a quotation. Similarly, a tag for indicating an interrogative sentence may be inserted in a document.

In step F101 described above with reference to FIG. 16, the document processing apparatus 1 receives or generates a document including a tag for controlling voice synthesis, wherein the tag may be described in various manners as explained above.

Now, the process of generating a read-out file in step F102 shown in FIG. 16 is described.

The document processing apparatus 1 analyzes attribute information described in tags in a tag file and detects attributes required for the reading-aloud operation. The document processing apparatus 1 then generates a read-out file by embedding attribute information in the tag file.

More specifically, the document processing apparatus 1 detects tags that indicate start positions of paragraphs, sentences, and phrases in the document and embeds attribute information corresponding to these tags into the tag file so as to represent reading-aloud attributes. When there is a summary generated from a document, the document processing apparatus 1 detects the start position of a part corresponding to the summary from the document and embeds attribute information indicating that the specified part of the document includes the same expression as that included in the summary and that the specified part should be read aloud with a greater output level.

For example, the document processing apparatus 1 generates read-out files shown in FIGS. 20 and 21 from the tag files shown in FIGS. 18 and 19, respectively. Herein, FIGS. 20A and 20B correspond to FIGS. 18A and 18B. Note that in actual read-out files, each file includes the entire expression starting from the title and the end of the last paragraph.

In the example shown in FIG. 20, the read-out file includes attribute information, Com=Lang*, embedded at the beginning of the document. This attribute information indicates the language in which the document is written. In this specific example, Com=Lang=JPN is used to indicate that the document is written in Japanese. The document processing apparatus 1** analyzes this attribute information and selects a suitable voice synthesis engine depending upon the language.

The read-out file also includes attribute information, Com=begin_p, Com=begin_s, and Com=begin_ph, embedded at various locations to indicate the start positions of paragraphs, sentences, and phrases, respectively, in the document. The document processing apparatus 1 detects the start positions of phrases, sentences, and phrases by analyzing tags described in the tag files.

In the case where a plurality of tags such as <adjective verb phrase><noun phrase> representing syntactic structures in the same level appear successively in a tag file, only a single attribute data Com=begin_ph is embedded in a read-out file instead of embedding as many attribute data as there are successive tags in the same level.

In the read-out file, attribute information Pau=500, Pau=100, and Pau 50 are embedded at locations corresponding to Com=begin_p, Com=begin_s, and Com=begin_ph, respectively, to indicate that pauses with periods of 500 msec, 100 msec, and 50 msec, respectively, should be inserted in the read-aloud operation.

More specifically, in accordance with these attribute codes, the document processing apparatus 1 inserts pauses with periods of 500 msec, 100 msec, and 50 msec, at the starts of paragraphs, sentences, and phrases, respectively, when the document is read aloud using the voice synthesis engine.

These attribute codes are embedded at locations corresponding to attribute codes Com=begin_p, Com=begin_s, and Com=begin_ph, respectively. Therefore, when a plurality of tags representing syntactic structures in the same level appear successively in a tag file, such as <adverb phrase><noun phrase>, these tags can be regarded as being associated with a single phrase, and only one attribute code Pau=50 is embedded for each phrase without embedding as many attribute codes as there are tags associated with one phrase.

On the other hand, when a plurality of tags representing syntactic structures in different levels appear successively in a tag file, as is the case with <phrase><sentence><noun phrase>, attribute codes Pau=* are embedded in correspondence with the respective tags. As a result, when the document processing apparatus 1** reads aloud such a part, a pause with a period equal to the sum of pause periods for a phrase, a sentence, and a phrase, that is, a pause with a period of 650 msec is made.

By making pauses for paragraphs, sentences, and phrases, the document processing apparatus 1 can read aloud a document in a natural manner. The lengths of pauses at the starts of paragraphs, sentences, and phrases are not limited to 600 msec, 100 msec, and 50 msec, but they may be set to arbitrary desired values.

In the present example, in response to pronunciation attribute information, pronunciation="null", attached to "(たんぱく)" in the tag file, "(たんぱく)" is omitted from the read-out file generated from the tag file. On the other hand, in response to attribute information, pronunciation="りんぱかん" and pronunciation="すみか" described in the tag file, "リンパ管" and "住み家" are replaced with "りんぱかん" and "すみか", respectively. By embedding such pronunciation attribute information, the document processing apparatus 1 can prevent a word from being pronounced incorrectly due to an incorrect description in the dictionary which is referred to by the voice synthesis engine.

When a tag file includes a tag indicating a quotation, attribute information may be embedded to a corresponding read-out file to indicate that a voice synthesis engine different from the current voice synthesis engine should be used for the quotation.

When a tag indicating an interrogative sentence is included in a tag file, attribute information may be embedded to indicate that the end of the interrogative sentence should be read aloud with a rising intonation.

Furthermore, attribute information may be embedded to indicate that a literary expression should be converted to a colloquial expression. This type of attribute information is useful particularly for a document written in Japanese. In this case, instead of embedding such attribute information in a read-out file, the document processing apparatus 1 may convert a literary expression to a colloquial expression in a tag file.

The read-out file shown in FIG. 21 includes attribute information, Com=Lang=ENG, described at the start of the document to indicate that the document is written in English.

Furthermore, in the read-out file, attribute information, Com=Vol=* is embedded to specify the volume level of the voice that reads aloud the document. For example, Com=Vol=0 indicates that the document should be read aloud at a default volume level. Com=Vol=80 indicates that the document should be read aloud at a volume level greater than the default level by 80%. Attribute information Com=Vol=* is effective until another attribute information Com=Vol=*** appears.

In response to the attribute information, pronunciation="two", described in the tag file, "II" in the tag file is converted to "two" in the read-out file".

Figure 17:
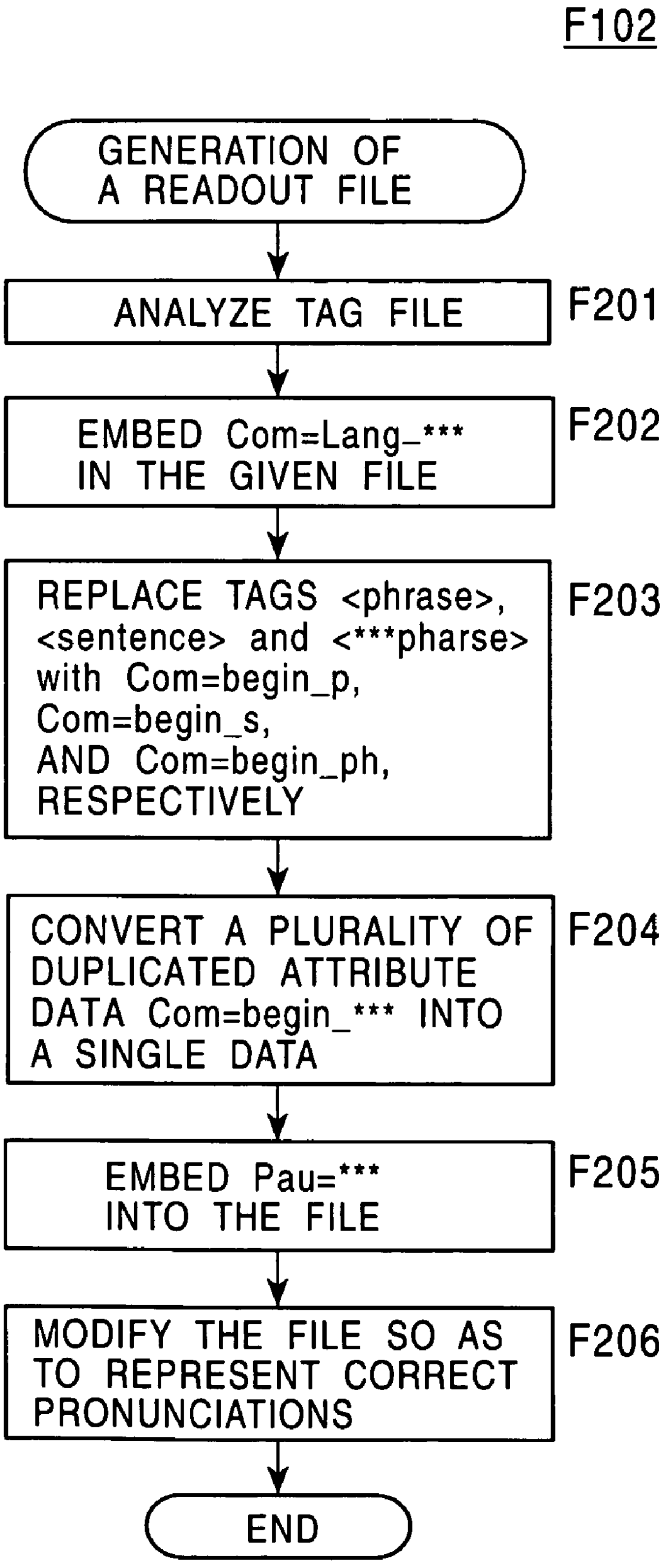
FIG. 17 is a flow chart illustrating a process of generating a read-out file according to the embodiment of the invention.

The document processing apparatus 1 generates a read-out file by performing the process shown in FIG. 17.

That is, in step F201, the document processing apparatus 1 analyzes, using the CPU 13, a tag file received from the outside or generated by the document processing apparatus 1. In this step, the document processing apparatus 1 detects the language in which the document is written and also detects the start positions of paragraphs, sentences, and phrases, and pronunciation attribute information by analyzing tags.

Subsequently, in step F202, the document processing apparatus embeds, using the CPU 13, attribute information Com=Lang=*** at the start of the document, depending upon the language in which the document is written.

In the next step F203, the document processing apparatus 1 replaces, using the CPU 13, tags indicating the starts of paragraphs, sentences, and phrases of the document with corresponding attribute information in the read-out file. More specifically, tags <paragraph>, <sentence>, and <***phrase> in the tag file are replaced with Com=begin_p, Com=begin_s, and Com=begin_ph.

In the next step F204, the document processing apparatus 1 simplifies duplicated expressions, Com=begin_*, corresponding to a plurality of tags representing syntactic structures in the same level, into a single expression of Com=begin_*.

In the next step F205, the document processing apparatus 1 embeds, using the CPU 13, Pau=* at locations before respective attribute information Com=being_*. More specifically, the document processing apparatus embeds Pau=500 before Com=begin_p, Pau=100 before Com=begin_s, and Pau=50 before Com=begin_ph.

Subsequently, in step F206, the document processing apparatus modifies, using the CPU 13, the content of the document so that the document will be read aloud with correct pronunciations. More specifically, in response to the pronunciation attribute information, pronunciation="null", "(たんぱく)" is removed. On the other hand, in response to pronunciation attribute information, pronunciation="りんぱかん" and pronunciation="すみか", "リンパ管" and "住み家" are replaced with "りんぱかん" and pronunciation="すみか" respectively.

In step F102 shown in FIG. 16, the document processing apparatus 1 automatically generates a read-out file by performing the process shown in FIG. 17. The controller 11 stores the extracted elements in the RAM 14.

In step F103 shown in FIG. 103, a process is performed using the read-out file as described below.

Using the read-out file, the document processing apparatus performs optimization process associated with the voice synthesis engine.

More specifically, the document processing apparatus 1 selects a voice synthesis engine to be used, in accordance with attribute information Com=Lang=*** embedded in the read-out file.

Each voice synthesis engine has an identifier determined depending upon the language and also depending upon whether to select a male or female voice, and such information is described in an initial setting file and stored on the HDD 34. The document processing apparatus 1 examines the initial setting file and selects a voice synthesis engine having an identifier matching the language of the document.

Furthermore, the document processing apparatus 1 converts expressions Com=begin_**** embedded in the read-out file to expressions in a form suited for the selected voice synthesis engine.

For example, the document processing apparatus 1 marks each expression Com=begin_ph with a number in the range from 10000 to 99999. More specifically, an expression, Com=begin_ph, may be marked such as Mark=10000. On the other hand, each expression, Com=begin_s, is marked with a number with the range from 1000 to 9999, such as Mark=1000. Each expression, Com=begin_p, is marked with a number with the range from 100 to 999, such as Mark=100.

Thus, the start positions of phrases, sentences, and paragraphs are indicated by numbers in the ranges from 10000 to 99999, from 1000 to 9999, and 100 to 999, respectively. Therefore, it is possible to detect the start positions of phrases, sentences, and paragraphs using these marks.

As described above, volume attribute information, Vol=***, representing the volume level by a percentage as compared with the default volume level, and the document processing apparatus 1 determines the absolute volume level from the value described by the percentage.

The document processing apparatus 1 performs the above-described process in step F103 shown in FIG. 16 using the read-out file thereby converting the read-out file into a form which can be read aloud by the voice synthesis engine.

In step F104 shown in FIG. 16, an operation is performed in response to a command issued by a user via the user interface as described below.

If a user clicks the read-out button 306*c* shown in FIG. 10 using the mouse or the like of the input unit 20, the document processing apparatus 1 activates the voice synthesis engine.

Figure 22:
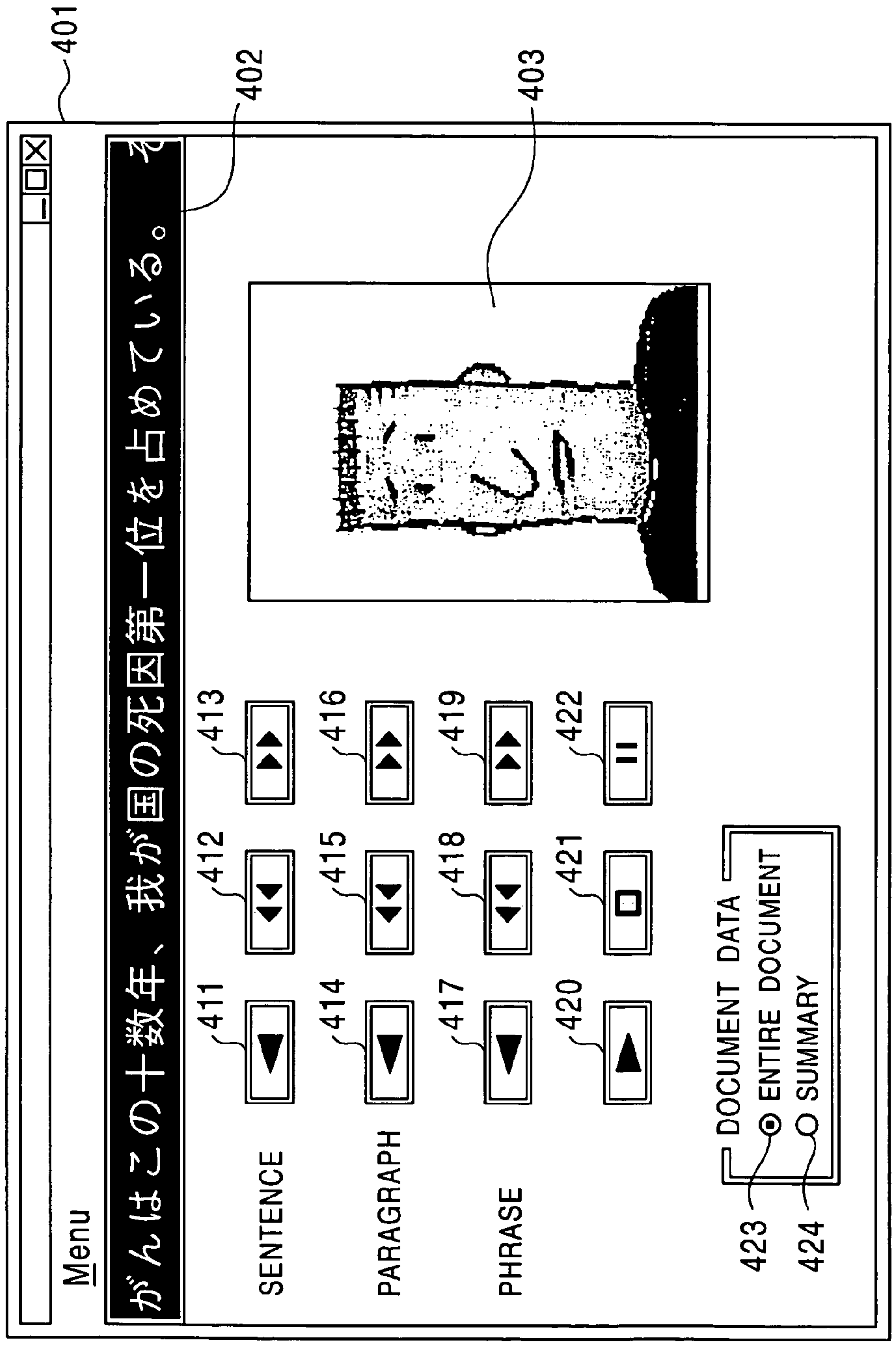
FIG. 22 is a schematic diagram illustrating a read-out window according to the embodiment of the invention.

Furthermore, the document processing apparatus 1 displays the read-out window 401 serving as the user interface such as that shown in FIG. 22 on the display 30.

As shown in FIG. 22, the read-out window 401 includes a play button 420 used to start the read-out operation, a stop button 421 used to stop the read-out operation, and the pause button 422 used to temporarily stop the read-out operation.

The read-out window 401 further includes a search button 411, a fast reverse button 412, and a fast forward button 413, for controlling the read-aloud position in units of sentences. Similarly, a search button 414, a fast reverse button 415, and a fast forward button 416 are provided for controlling the read-aloud position in units of paragraphs. Furthermore, a search button 417, a fast reverse button 418, and a fast forward button 419 are provided for controlling the read-aloud position in units of phrases, The read-out window 401 also includes selection switches 423 and 423 for selecting the entire document or a summary generated from the document, as a text to be read aloud.

Furthermore, the read-out window 401 includes an image displaying area 403 for displaying, for example, a human image reading aloud the text. Furthermore, there is provided a telop displaying area 402 for displaying the text in the form of a telop in synchronization with the operation of reading aloud the text.

Although not shown in FIG. 22, the read-out window 401 may include a volume control button for controlling the output level of the voice, a speed control button for controlling the speed at which the text is read aloud, and a selection button for selecting a male or female voice.

If a user issues a command by clicking or selecting one of these buttons/switches using the mouse of the input unit 20, the document processing apparatus 1 performs a read-aloud operation using the voice synthesis engine in accordance with the command.

For example, when the user clicks the play but ton 420, the document processing apparatus 1 starts reading aloud the text. More specifically, the controller 11 supplies a voice signal generated by means of voice synthesis to the audio output unit 22. The audio output unit 22 outputs a voice in accordance with the received voice signal.

On the other hand, if the stop button 421 or the pause button 422 is clicked. the document processing apparatus 1 terminates the reading-aloud operation or temporarily stops the operation.

If the user presses the search button 411 when the text is being read aloud, the reading-aloud operation jumps to the beginning of the current sentence being read aloud, and the reading-aloud operation is restarted from the beginning of that sentence. Similarly, if the search button 414 or 416 is pressed, the reading-aloud operation jumps to the beginning of the current paragraph or phrase being read aloud, and the reading-aloud operation is restarted from the beginning of that paragraph or phrase.

In the operations performed in response of the search buttons 411, 414, or 417 being clicked, the controller 11 detects the jumping destination on the basis of the marks described above. More specifically, when the sentence search button 411 is clicked, the controller 11 searches the current sentence backward for a first mark having a number in the range from 1000 to 9999. If a mark having such a number is detected, the reading-aloud operation is restarted from the position where the mark has been detected. In the case of the paragraph searching or the phrase searching, a mark having a number in the range from 100 to 999 or the range from 10000 to 99999 is searched for, and the reading-aloud operation is restarted from the position where the mark is detected.

The above-described capability is useful when a desired part of a document is reproduced in response to a request issued by the user.

In step F104 shown in FIG. 16, as described above, the document processing apparatus 1 reads aloud a document using the voice synthesis engine in response to a command issued by a user via the user interface.

Thus, the document processing apparatus 1 has the capability of reading aloud a desired document in a natural fashion using the voice synthesis engine.

The text to be read aloud may be a document or a summary generated from the original document as will be described later. By clicking the selection switch 423 or 424, it is possible to select a document or a summary as a text to be read aloud.

In any case, a selected document or summary is read aloud via the voice synthesis engine by performing steps F102 and F103 shown in FIG. 16 in accordance with a tag file associated with the selected document or summary.

Although in the present embodiment, a read-out file is generated from a tag file that has been internally generated or received from the outside, it is also possible to directly read aloud a tag file without generating a read-out file.

In this case, after receiving or generating a tag file, the document processing apparatus 1 detects the start positions of paragraphs, sentences, and phrases from tags attached to the tag file and reads aloud the tag file using the voice synthesis engine such that pauses are inserted at detected start positions. This allows the document processing apparatus to directly read aloud a tag file without having to generate a read-out file.

6. Generating and Displaying Summary

Now, the process of generating a summary of document data is described.

As described earlier, a user can select a document and read the selected document displayed in the browser window 301 shown in FIG. 10.

The original document and a summary of thereof are displayed in the browser window 301.

However, when a summary has not been generated yet, nothing is displayed in the summary displaying area 304 as shown in FIG. 26.

If the summarization button 306*a* in the browser window 301 is clicked, a summary of the document displayed in the document displaying area 303 is generated and displayed in the summary displaying area 304.

That is, in response to a summarization command issued by a user, the controller 11 activates the summary generator engine (that will be described later with reference to FIG. 47) implemented with software or hardware to generate and display a summary.

The process of generating a summary from a given document is performed on the basis of the internal structure, represented by tags, of the document.

The summary is generated depending on the size of the summary displaying area 304. The sizes of the document displaying area 303 and the summary displaying area 304 can be changed by moving the boundary 312.

That is, the summary is generated such that the resultant summary has a size (document length) corresponding to the size of the summary displaying area 304 at the time when a summarization command is issued.

In the specific example shown in FIG. 26, the summary displaying area 304 has a very small size. However, a user can expand the summary displaying area 304 by moving the boundary 312 as shown in FIG. 27. After expanding the summary displaying area 304, if the user issues a summarization command, a summary having a document length corresponding to the size of the expanded summary displaying area 304 is generated and displayed therein.

When the summary displaying area 304 is set to have a very small size as is the case in FIG. 26, if a summary having a length corresponding to the size of the summary displaying area 304, the summary is likely to have an insufficient content. In other words, the summary becomes too short to provide meaningful information.

In the present embodiment, to avoid the above problem, when the size of the summary displaying area 304 (the length of a text that can be displayed at a time in the summary displaying area 304) is smaller than a predetermined value such as one or two lines, a summary having a length greater than the size of the summary displaying area 304 and displayed in the form of a telop using a telop generator engine (that will bed described later with reference to FIG. 47) implemented with software or hardware.

The operation of generating and displaying a summary is described below, for various cases including a case where a summary is displayed in the form of a telop.

Figure 23:
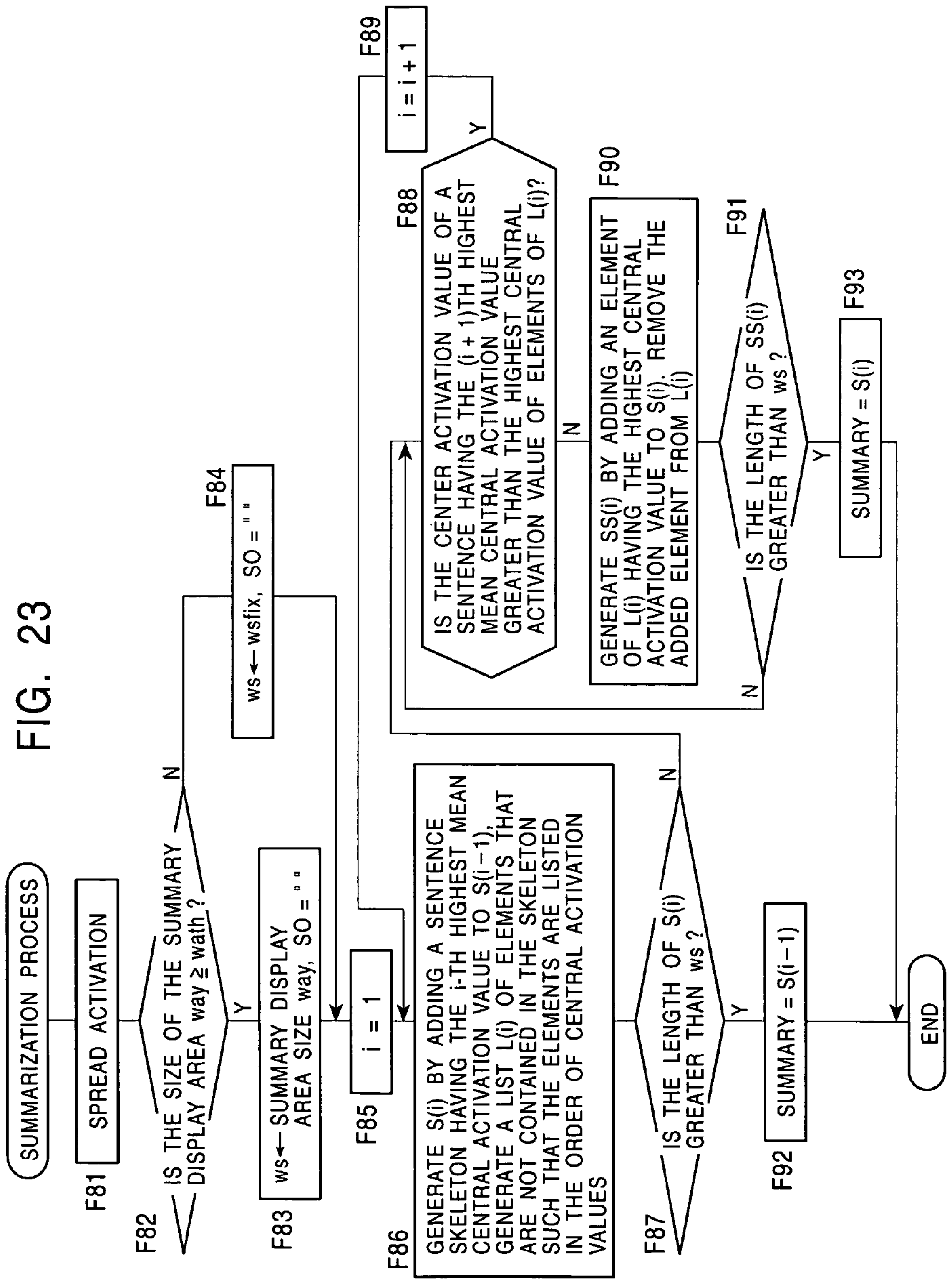
FIG. 23 is a flow chart illustrating a process of generating a summary according to the embodiment of the invention.
Figure 24:
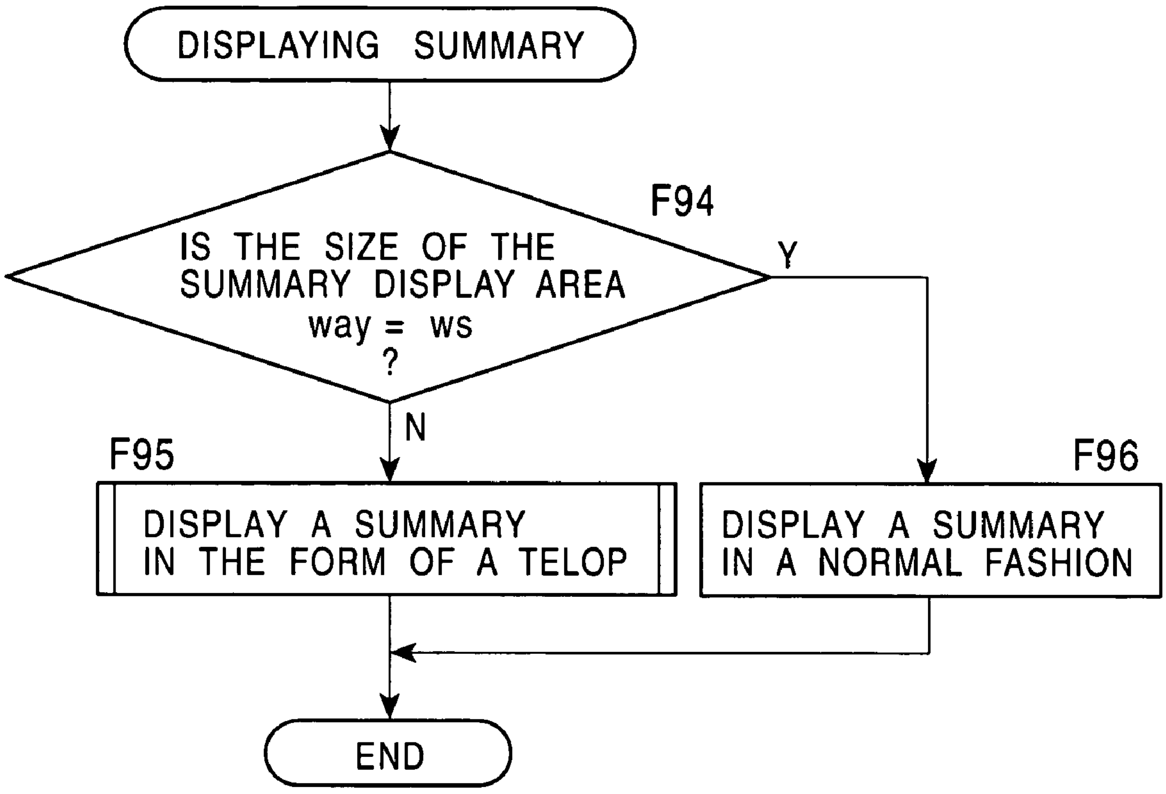
FIG. 24 is a flow chart illustrating a process of displaying a summary according to the embodiment of the invention.
Figure 25:
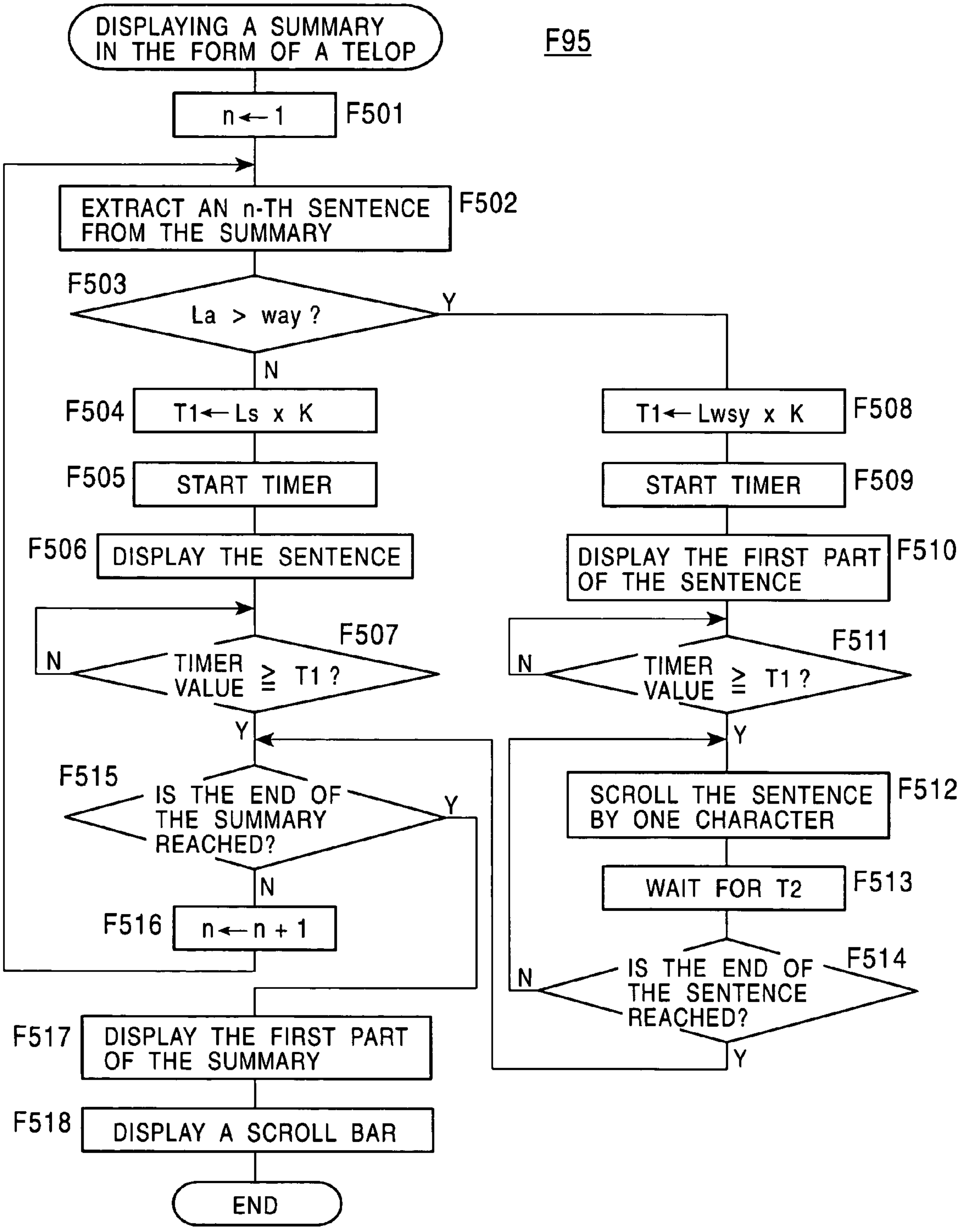
FIG. 25 is a flow chart illustrating a process of displaying a telop according to the embodiment of the invention.

If the summarization button 306*a* in the browser window 301 is clicked, the controller 11 (summarization engine) starts the summarization process shown in FIG. 23. After completion of the summarization process shown in FIG. 23, the summary displaying process shown in FIG. 24 is performed. In the summary displaying process, the telop displaying process shown in FIG. 25 is performed, if necessary.

In the first step F81 in the summarization process shown in FIG. 23, the controller 11 performs spreading of activation values. In the present embodiment, a summary is generated by employing elements having high degrees of significance represented by the central activation values obtained by means of spreading activation. When a given document includes tags representing the internal structure, central activation values determined by means of spreading activation in accordance with the internal structure described by tags can be assigned to the respective elements.

The process of spreading activation in step F81 is performed in a similar manner to the process described earlier with reference to FIGS. 6-8. As described earlier, the spreading activation is a process in which the central activation values associated with elements are spread such that if an element has significant relation with an element having a high central activation value, then a high central activation value is given to the former element. The activation spreading process causes both an anaphoric (coreferential) expression and an antecedent thereof to have the same central activation value. On the other hand, the central activation values of the other elements decrease. The central activation values are determined in accordance with the internal structure represented by tags, and they are used to extract keywords characterizing the document.

In step F82, the controller 11 detects the current size wsy of the summary displaying area 304 and determines whether the size wsy of the summary displaying area 304 is equal to or greater than a particular value wsth.

The value wsth is predetermined to be large enough to display a summary. The specific value of wsth may be determined depending on the system design.

In the following description, it is assumed that the current size wsy of the summary displaying area is equal to or greater than the predetermined size wsth. In this case, a summary is generated such that the resultant summary has a size corresponding to the current size wsy of the summary displaying area.

In this case, the controller 11 advances the process to step F83 and sets a variable ws (maximum allowable number of characters) to be equal to the current size (the number of characters that can be displayed in the summary displaying window) wsy of the summary displaying area 304 in the browser window 301 being displayed on the display 30.

The controller 11 then initializes a summary string s (stored in an internal register) such that s(0)=" ". The controller 11 stores the maximum allowable number ws of characters and the initial value s(0) of the string s into the RAM 14.

In the next step F85, the controller sets the counter value i of a counter for counting the number of iterations.

Then in step F86, the controller 11 extracts a skeleton of a sentence having an ith greatest mean central activation value from the document.

Herein, the mean central activation value refers to the mean value of central activation values of elements included in a sentence.

The controller 11 reads a string s(i−1) from the RAM 14 and adds the string of the extracted sentence skeleton to the string s(i−1) thereby generating a string s(i). The controller 11 stores the resultant string s(i) into the RAM 14.

In the first iteration, because the string s(i−1) has an initial value s(0), the sentence skeleton extracted in this first operation is employed as the string s(i) and stored into the RAM 14.

When step F84 is performed in the following iterations, a newly extracted sentence skeleton is added to the current string s(i) (that is, string s(i−1) at that time).

Furthermore, in step F84, the controller 11 generates a list L(i) of elements that are not included in the sentence skeleton, wherein elements are listed in the order of descending central activation values. The controller 11 stores the resultant list L(i) into the RAM 14.

The summarization algorithm employed in step F86 is to select sentences in the order of central activation values from the highest value to the lowest value on the basis of the result of spreading of activation values and extract sentence skeletons of selected sentences. The skeleton of a sentence is made up of essential elements extracted from the sentence. Elements that can be essential include a head, a subject, an object, an indirect object, and an element having a relational attribute as to possessor, cause, condition, or comparison. When a coordination structure is essential, elements included directly in the coordination structure are employed as essential elements. The controller 11 generates a sentence skeleton by joining essential elements of a selected sentence and adds it to the summary.

In step F87, the controller 11 determines whether the length of the string s(i) is greater than the maximum allowable number ws of characters that can be displayed in the summary displaying area 304 of the browser window 301.

This step F87 is necessary to generate the summary such that the summary has a size corresponding to the size of the summary displaying area 304.

If the length of the string s(i) is less than the maximum allowable number ws of characters, the controller 11 advances the process to step F88.

In step F88, the controller 11 compares the central activation values of elements of a sentence having an (i+1)th highest mean central activation value of sentences included in the document with the highest central activation value among those of elements included in the list L(i) generated in step F86.

That is, a sentence (a candidate having highest priority among the remaining sentences) whose mean central activation value is next in magnitude to that of a sentence that has been employed in step F86 as a part of the summary is compared with the central activation values of elements that have been regarded as being not essential and omitted from the skeletons of sentences employed in step F86 to generate the summary.

Thus, in step F88, it is determined whether an element omitted from the sentence skeleton employed in the previous step F86 should be now added to the summary or an element of another sentence should be added.

If the highest central activation value among those of elements in the list L(i) is higher than those of elements of the sentence having the (i+1)th highest mean central activation value, an element is selected from the elements that were not employed in the sentence skeleton in the previous step F86 and the selected element is added to the summary string.

In this case, the controller 11 advance the process to step F90 and selects an element having the highest central activation value from the list L(i) and adds the selected element to the current string s(i) thereby generating a string ss(i).

The controller 11 then removes the selected element from the list L(i).

In step F91, the controller 11 determines whether the length of the string ss(i) is greater than the maximum allowable value ws. If not, the process returns to step F88.

On the other hand, if it is determined in step F88 that the sentence having the (i+1)th highest mean central activation value includes an element having a higher central activation value than the highest central activation value among those of elements in the list L(i), it is determined that an element to be further added to the summary string should be selected from a sentence other than the sentence employed in the previous step F86. In this case, the process goes to step F89, and the counter value i is incremented. Then, the process returns to step F86.

That is, a skeleton is extracted from the sentence that have been determined, in step F88, to have the (i+1)th highest mean central activation value, and the extracted skeleton is added to the string s(i).

Thus, elements having high central activation values are selected in step F86 or F90, and the selected elements are added to the summary string. On the other hand, in step F87 or F91, the length of the string s(i) or ss(i) is compared with the maximum allowable number ws of characters, thereby ensuring that the number of characters included in the string becomes closest to but not greater than the maximum allowable number ws.

If it is determined in step F87 that the length of the string s(i) is greater than the maximum allowable value ws, then the controller 11 advances the process to step F92 and employs the previous string s(i−1) instead of the new string s(i) that includes a skeleton selected and added in the previous step F86.

That is, when a sentence skeleton is added to the summary string in step F86, if the resultant summary string includes a greater number of characters than the maximum allowable number ws, it is determined that the previous string s(i−1), which does not include the sentence skeleton employed in the immediately previous step F86 to form the current string s(i), includes as many characters as possible below the limit ws. Thus, the previous string s(i−1) is employed as a final summary string.

When the string s(i) is generated for the first time in step F86 (i=1, in this case), if it is determined in step F87 that the number of characters included in the string s(i) is greater than the maximum allowable number ws, the string s(i−1) becomes identical to the initial string s(0) (null string) given in step F83, and thus no summary string is generated.

This can occur when the size of the summary displaying area 304 is too small. In this case, the user may expand the size of the summary displaying area 304 on the screen and click the summarization button **306*a* to start the process shown in FIG. 23**.

However, in the present embodiment, when it is determined in step F82 that the size of the summary displaying area 304 is too small, a summary having a greater length than can be displayed at a time in the summary displaying area 304. Therefore, there is substantially no possibility that a summary cannot be generated.

If it is determined in step F87 that the number of characters included in the string s(i) is not greater than the maximum allowable number ws, the controller 11 advances the process to step F88 as described above and selects an element to be further added to the summary string.

In step F91, it is determined whether the number of characters included in the string ss(i) is greater than the maximum allowable number ws.

If yes, the controller 11 advances the process to step F93 and employs, as the summary string, the previous string s(i) that does not include an element added in the immediately previous step F90 to form the current string.

That is, when an element is added to the string in step F90, if the resultant summary string includes a greater number of characters than the maximum allowable number ws, it is determined that the previous string s(i), which does not include the above-described element, includes as many characters as possible below the limit ws. Thus, the previous string s(i) is employed as a final summary string.

In the above description, it is assumed that the process is performed in the order of steps F82, F83, and F85. In this case, when the process shown in FIG. 23 is completed, a summary having a length corresponding to the size of the summary displaying area 304 is obtained. The content of the summary is made up of a skeleton of one or more sentences having high mean central activation values and one or more elements that are not included in skeletons but have high central activation values.

The resultant summary is stored in the RAM 14 and the entire summary is displayed in the summary displaying area 304 in a fixed fashion as shown in FIG. 27.

After completion of the summarization process shown in FIG. 23, the controller 11 performs the summary displaying process shown in FIG. 24. In the first step F94 in the summary displaying process, it is determined whether the size wsy of the summary displaying area 304 is equal to the current value of the maximum allowable number ws of characters. That is, it is determined whether the size wsy of the summary displaying area 304 has been employed, in step F83, as the maximum allowable number ws of characters and whether the summarization process has been performed in accordance with this maximum allowable number ws.

If wsy=ws, it is determined that a summary has been generated in the summarization process such that the length of the summary matches the size of the summary displaying area 304. In this case, the process goes to step F96, and the generated summary is displayed in the summary displaying area 304.

Thus, the entire summary is displayed in a fixed fashion as shown in FIG. 27. That is, if the user issues a summarization command after setting the summary displaying area 304 to have a desired size, a summary having a length matching the size of the summary displaying area 304 is generated and displayed in a fixed fashion (without being moved or scrolled).

When the user reads the summary displayed in the summary displaying area 304, if the user wants a longer or shorter summary, the user may click the summarization button 306*a* after increasing or decreasing the size of the summary displaying area 304 in the browser window 301.

In response, the process shown in FIG. 23 is performed, a summary having a length matching the specified size of the summary displaying area 304 is generated and displayed, as long as the size wsy of the summary displaying area wsy is greater than the predetermined value wsth.

In the case where a user clicks the summarization button 306*a* when the summary displaying area 304 has a very small size as shown in FIG. 26, if it is determined, in step F82 in the summarization process shown in FIG. 23, that the size wsy of the summary displaying area 304 is smaller than the predetermined value wsth, the following process is performed.

That is, in step F84, the controller 11 sets the maximum allowable number ws of characters to a predetermined fixed value wsfix. The constant wsfix is predetermined to have a value minimally required for a meaningful summary. The constant wsfix depends on the system design. For example, wsfix may be set such that wsfix=wsth.

Alternatively, wsfix may be given by wsfix=(wsfix_i)×V. In this case, the fixed initial value wsfix_i is held, and wsfix is varied in accordance with V specified by a user. Alternatively, the constant wsfix may be set arbitrarily by a user.

The controller 11 initializes the summary string s (internal register for storing a summary). That is, the initial value of the summary string s is set such that s(0)=" ". The controller 11 stores the maximum allowable number ws of characters and the initial value s(0) of the string s into the RAM 14.

In the next step F85, the controller 11 sets a variable i such that i=1. After that, the controller 11 performs step F86 and steps following that. However, details thereof are not described herein because they are performed in a similar manner as described above.

Also in this case, a summary is generated such that the summary includes as many characters as possible below the maximum allowable number ws of characters. However, in this case, the maximum allowable number ws of characters is set such that ws=wsfix, the number of characters included in the summary does not match the current size of the summary displaying area 304, and the summary includes a greater number of characters than can be displayed in the summary displaying area 304.

After generating the summary via steps F86 to F93, the controller 11 performs the summary displaying process shown in FIG. 24.

In step F94, it is determined, in this case, that the maximum allowable number ws of characters is not equal to the size wsy of the summary displaying area, and thus the process goes to step F95. In step F95, the generated summary is displayed in the form of a telop using a telop generation engine.

The telop displaying process in step F95 is described in further detail with reference to FIG. 25.

First, in step F501, the controller 11 (telop generation engine) sets a variable n such that n=1. In step F502, an nth sentence is extracted from the generated summary. Because the current value of n is equal to 1, the first sentence is extracted from the summary.

In the next step 503, it is determined whether the length (the number of characters) Ls of the extracted sentence is greater than the size wsy of the summary displaying area.

If the first sentence extracted from the summary including one or more sentences includes a smaller number of characters than the maximum number of characters which can be displayed in the summary displaying area having the size wsy, then the controller 11 advances the process to step F504. In step F504, the length Ls of the sentence is multiplied by a predetermined factor k, and the result is employed as the telop displaying time T1.

Then in step F505, the controller 11 starts an internal timer. In step F506, the first sentence is displayed in the summary displaying area 304. In this specific case, the length Ls of the sentence is smaller than the size wsy of the summary displaying area, and thus the entire first sentence is displayed in the form of a telop in the summary displaying area 304.

During the displaying operation, the controller 11 monitors the counter value of the timer, in step F507. If the timer indicates that a period of time T1 has elapsed, the process goes to step F515. In step F515, it is determined whether the last sentence in the summary has been displayed. If not, the process goes to step F516 in which the variable n is incremented. After that, the process returns to step F502 to extract the second sentence from the summary.

In step F503, the controller 11 judges the length of the second sentence. If it is determined in step F503 that the length of the second sentence is greater than the size wsy of the summary displaying area (the entire sentence cannot be displayed at a time, in this case), the controller 11 advances the process to step F508. In step F508, the sentence length Lwsy that can be displayed at a time in the summary displaying area is multiplied by the predetermined factor k, and the result is employed as the telop displaying time T1.

Then in step F509, the controller 11 starts the internal timer. In the next step F510, the second sentence is displayed in the form of a telop in the summary displaying area 304. In this case, however, the length Ls of the second sentence is greater than the size wsy of the summary displaying area, only a first part of the sentence is displayed. More specifically, first Lwsy characters of the second sentence are displayed.

During the displaying operation, the controller 11 monitors the counter value of the timer in step F511. If the timer indicates that a period of time T1 has elapsed, the process goes to step F512.

In step F512, the controller 11 scrolls the sentence being displayed by one character. Then the controller 11 waits for a period of time T2 in step F313. In step F514, the controller 11 determines whether the last character of the second sentence has been displayed. If the last character has not been reached, the controller 11 returns the process to step F512 and scrolls the sentence by one character.

The waiting time T2 determines the scroll timing. The waiting time T2 is selected depending on the system design. If the waiting time T2 is set within the range from 0.5 to 1 sec, the sentence is scrolled at a proper speed.

When a sentence cannot be displayed entirely at a time in the summary displaying area 304 by the process from step F508 to F514, a leading end part of the sentence is first displayed for a period of time T1, and then the displayed sentence is scrolled by one character every period of time T2 until the last character of the sentence is displayed.

If the last character of the sentence is reached as a result of the scrolling, the controller 11 advances the process from F514 to F515. In step F515, the controller 11 determines whether displaying is completed for the last sentence. If not, the process goes to step F516. After the variable n is incremented in step F516, the process returns to step F502 to extract the third sentence from the summary.

The third sentence is displayed in the form of a telop by the process from step F504 to F507 or from 508 to F514.

If it is determined in step F515 that all sentences of the summary have been displayed, the process goes to step F517, and a leading end part of the summary is displayed. That is, the leading end part is displayed which can be displayed at a time in the summary displaying area with the size of wsy. Then in step F518, a scroll bar 307 that will be described later is displayed. Thus, the telop displaying process is completed.

The operation of displaying a text in the form of a telop is described in further detail below.

Let us assume that the summarization button 306*a* is clicked when the summary displaying area 304 in the browser window 301 has a very small size.

In response to the clicking of the summarization button 306*a*, the process shown in FIG. 23 generates a summary having a greater length than can be displayed at a time in the summary displaying area 304.

Let us assume that a summary has been generated as shown below for the original document displayed in the document displaying area 303 shown in FIG. 26A.

"[Enjoy Aging]/8 Metastasis of Cancer can be Suppressed! The cancer is characterized by cell multiplication and metastasis. Human cells each include an "oncogene" and a "tumor suppressor gene". Older persons have genetic defects accumulated over a long period of years and thus have a large number of cells that are apt to become cancer cells. A simple increase in the number of cancer cells does not cause metastasis. Cancer cells dissolve a protein or the like between cells thereby creating a path through which to invade a blood vessel or a lymph vessel. Protein nm23 is expected to be useful for diagnosis and curing of cancer."

This summary is made up of seven sentences described below, which will be displayed on a sentence-by-sentence basis by the telop displaying process described above.

Sentence 1: [Enjoy Aging]/8 Metastasis of Cancer can be Suppressed!

Sentence 2: The cancer is characterized by cell multiplication and metastasis.

Sentence 3: Human cells each include an "oncogene" and a "tumor suppressor gene".

Sentence 4: Older persons have genetic defects accumulated over a long period of years and thus have a large number of cells that are apt to become cancer cells.

Sentence 5: A simple increase in the number of cancer cells does not cause metastasis.

Sentence 6: Cancer cells dissolve a protein or the like between cells thereby creating a path through which to invade a blood vessel or a lymph vessel.

Sentence 7: Protein nm23 is expected to be useful for diagnosis and curing of cancer."

Figure 28A:
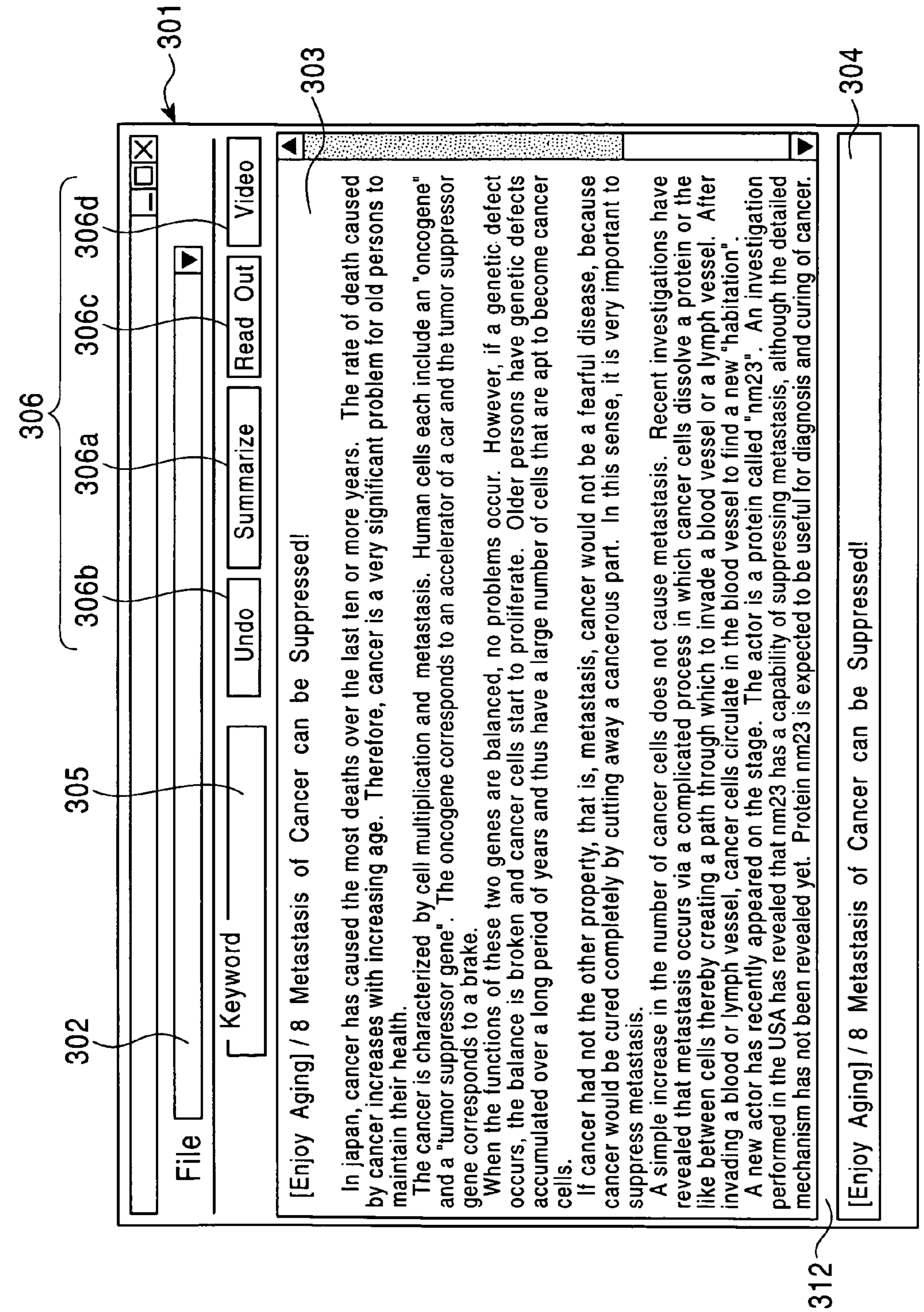
FIGS. 28A and 28B are schematic diagrams illustrating an example of a browser window in which a summary is displayed in the form of a telop, according to the embodiment of the invention.
Figure 28B:
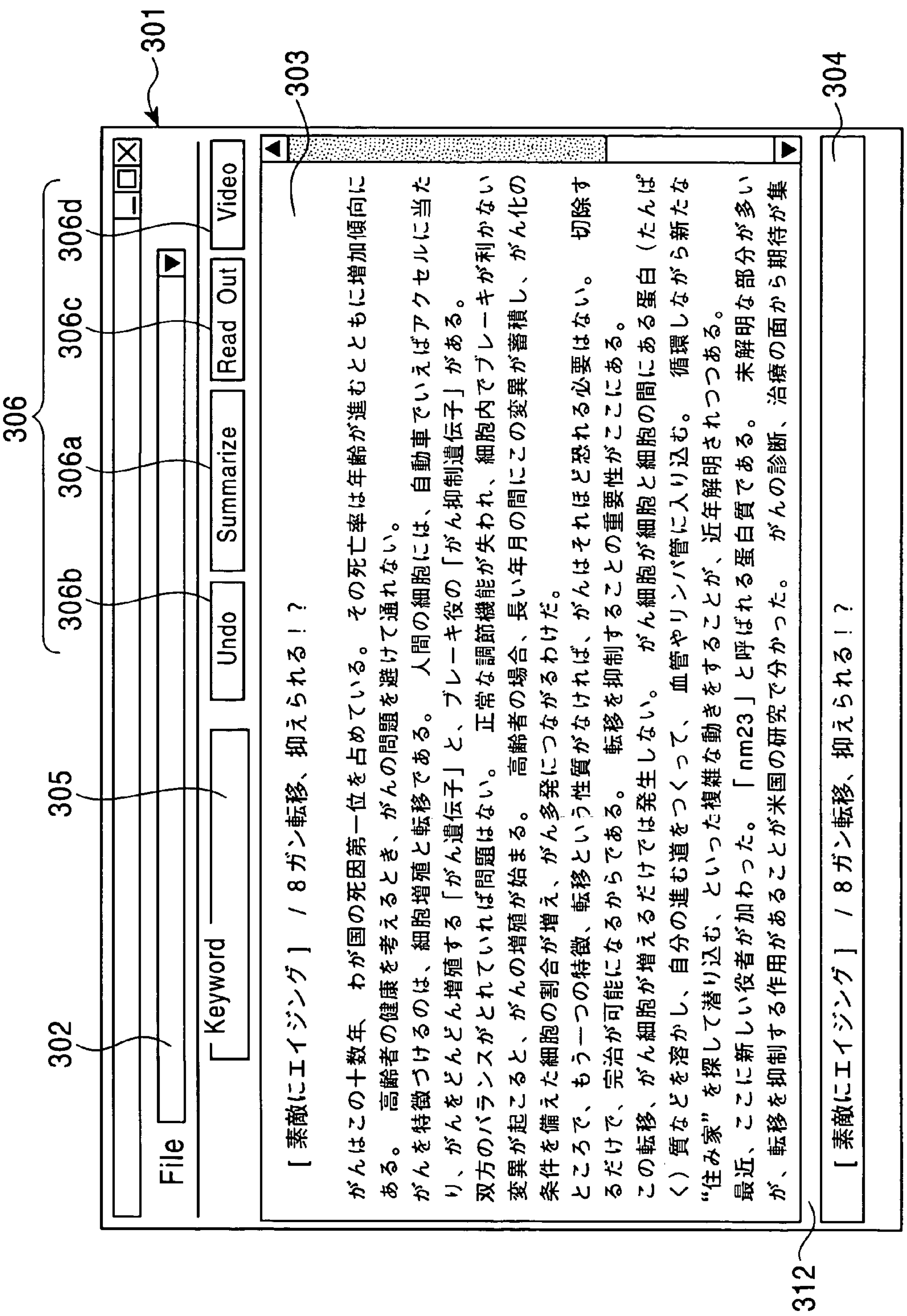

In the process shown in FIG. 25, the first sentence (Sentence 1) is first extracted and displayed in the summary displaying area 304 as shown in FIG. 28A (a Japanese version of the summary is shown in FIG. 28B).

Figure 29:
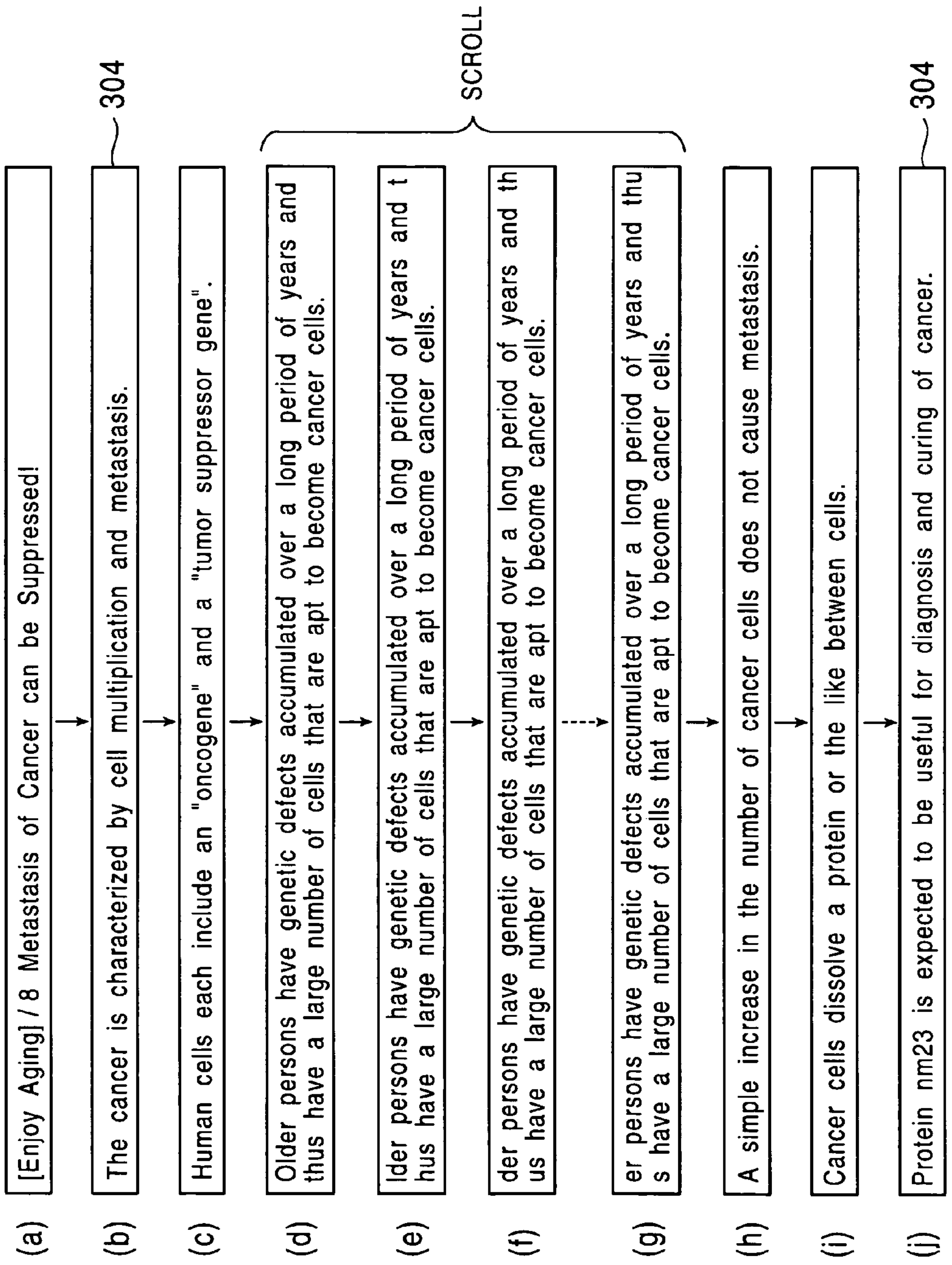
FIG. 29 is a schematic diagram illustrating a process of displaying a summary in the form of a telop according to the embodiment of the invention.

After that, the sentences are sequentially displayed in the summary displaying area 304 in the form of a telop as described below with reference to FIG. 29A ((a)-(j)).

Sentence 1 shown in FIG. 28 has a length Ls≦wsy. Therefore, Sentence 1 can be entirely displayed at a time. Thus, the process from step F504 to F507 shown in FIG. 25 displays Sentence 1 in a fixed fashion as shown in FIG. 29A(a) for a period of time T1 determined depending upon the length of the sentence.

Sentences 2 and 3 also have lengths Ls<=wsy. Therefore, the process from step F504 to F507 displays Sentence 2 and then Sentence 3 in a fixed fashion as shown in FIGS. 29A(b) and (c), respectively, for a period of time T1 determined depending upon the lengths of the respectively sentences.

The next sentence (Sentence 4) has a length Ls>wsy. Therefore, Sentence 4 cannot be entirely displayed at a time. In this case, the process from step F508 to F514 shown in FIG. 25 is performed as described below.

First, a leading end part of Sentence 4 is displayed as shown in FIG. 29A(d) for a period of time T1. After that, the displayed sentence is scrolled by one character every period of time T2 as shown in FIGS. 29A(e) and (f).

As a result of scrolling, Sentence 4 is finally displayed as shown in FIG. 29A(g).

After that, Sentences 5, 6, and 7 are extracted one by one. These sentences have lengths Ls≦wsy, and thus the process from step F504 to F507 is performed to display these sentences one by one for a period of time T1 determined depending upon the sentence lengths, as shown in FIGS. 29A(h), (i), and (j).

As described above, when sentences are displayed one by one in the form of a telop, if some sentence is too long to be entirely displayed at a time, the sentence is scrolled until the entire sentence has been displayed.

Figure 30A:
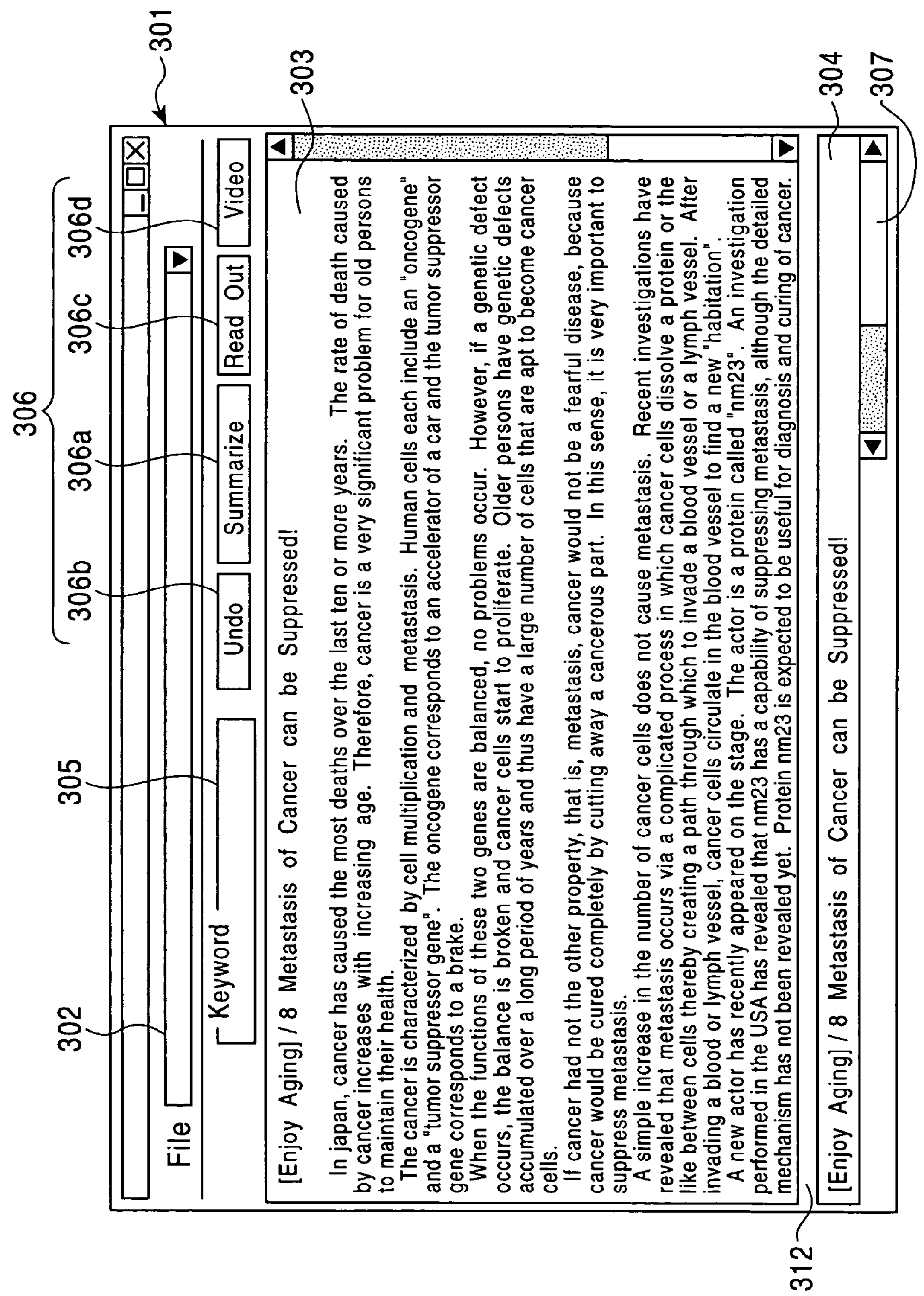
FIGS. 30A and 30B are schematic diagrams illustrating an example of a browser window in which displaying of a summary in the form of a telop is completed, according to the embodiment of the invention.
Figure 30B:
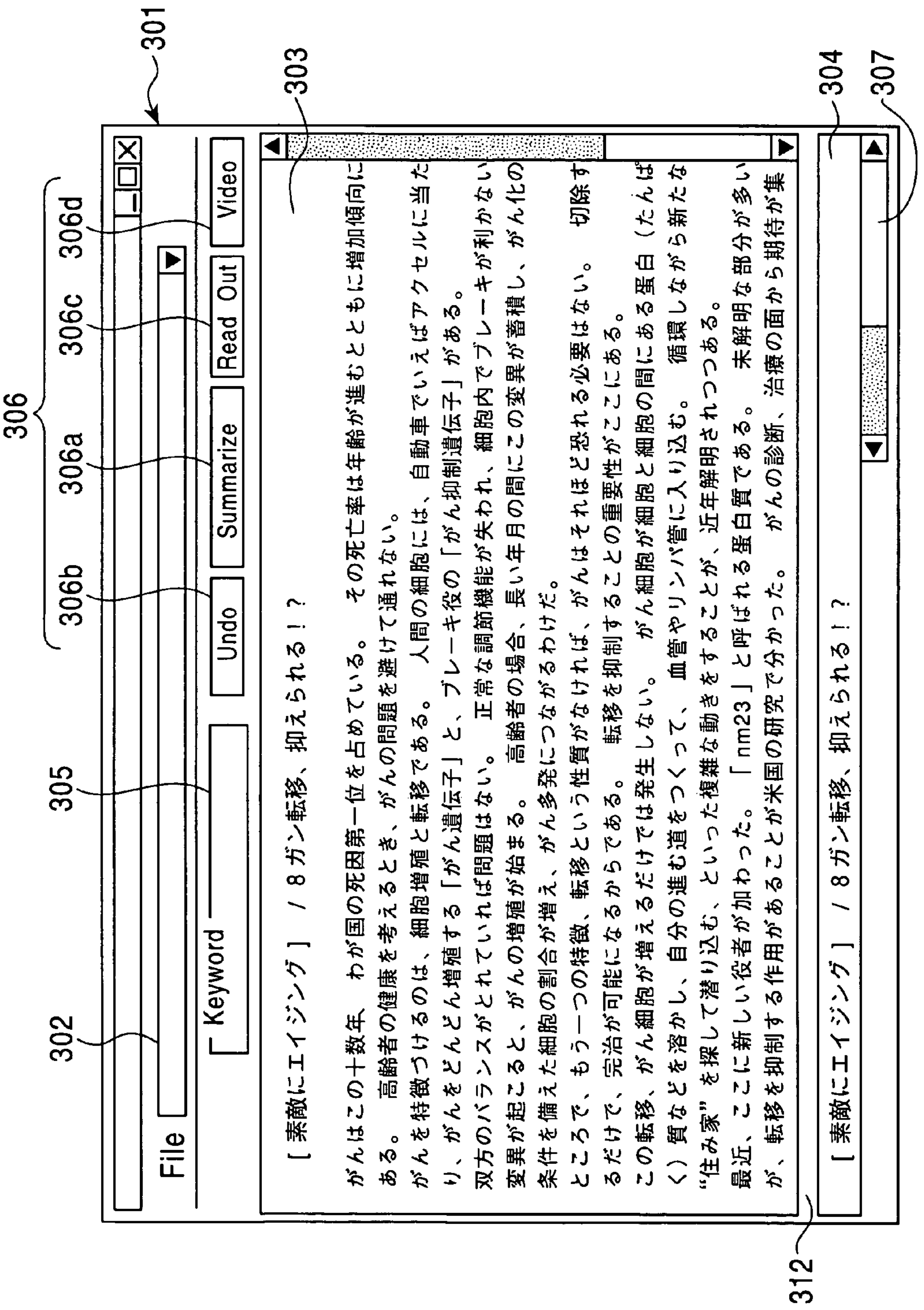

When all sentences of the summary have been displayed in the form of a telop, steps F517 and F518 shown in FIG. 25 are performed to display the leading end part of the summary and the scroll bar 307, as shown in FIG. 30.

After presenting the entire summary to the user by displaying it in the form of telop, the scroll bar 307 is displayed so that the user may view a desired part of the summary by scrolling the displayed part of the summary within the summary displaying area 304 using the scroll bar 307.

In the present embodiment, a summary is generated and displayed in the above-described manner thereby presenting the summary to the user in a desirable fashion.

The user may set the summary displaying area 304 to have an arbitrary desired size so that a summary having a desired length is generated.

When the user wants a longer summary, the user expands the summary displaying area 304 and then clicks the summarization button 306*a*. Conversely, if the user wants a shorter summary, the user reduces the size of the summary displaying area 304 and then clicks the summarization button 306*a*. In response, a summary having a length specified by the user is generated and displayed in a fixed fashion instead of the form of a telop.

If the user reduces the summary displaying area 304 to a too small size, a summary having a minimum length is generated regardless of the window size and displayed in the form of a telop.

For example, even when the user reluctantly reduces the size of the summary displaying area 304 in order to set the document displaying area 303 to have a large size, it is still possible to view a summary including a proper content. This allows the user to precisely recognize the content of the document.

In the present embodiment, a summary is displayed sentence by sentence in the form of a telop. Because the displaying period (T1) for one sentence is determined depending upon the length of the sentence, each sentence (telop) is displayed for a period of time optimum for the user to read the sentence.

When a sentence has a greater length than can be displayed at a time in the summary displaying area 304, the sentence being displayed is scrolled so that the user can read the entire sentence (because the sentence is scrolled instead of being switched, the user can easily recognize that the sentence has a further part following the part being currently displayed).

The process of displaying a summary in the form of a telop is not limited to that shown in FIG. 25.

For example, a summary may be displayed on a phrase-by-phrase or a clause-by-clause basis instead of sentence-by-sentence basis. Alternatively, the unit displayed at a time may be changed depending upon the length of sentences or phrases.

Still alternatively, the entire summary may be scrolled continuously from its beginning to its end.

What is essential is to present the entire summary to the user. As long as this can be achieved, the summary can be displayed in any fashion. That is, switching, scrolling, or a combination of switching and scrolling may be employed.

The period of displaying a telop, the switching timing, and the scrolling timing may be set in various manners.

In the present embodiment, as described earlier, it is also possible to read aloud a document or a summary thereof. When a document or a summary is read aloud, the timing of the operation of displaying a telop performed by the telop generator engine may be synchronized with the timing of the operation of reading aloud the document or summary.

In the reading-aloud operation, as described above, a read-out file is generated from a tag file, and the read-out file is converted into a form adapted to use by the voice synthesis engine. After that, the voice synthesis engine outputs a voice reading aloud the document or summary in a natural fashion similar to a speech made by a person while making a pause every paragraph, sentence, and phrase.

If the telop is displayed paragraph by paragraph, sentence by sentence, or phrase by phrase at a speed similar to the speed at which the telop will be read aloud if the reading-aloud operation is performed, it becomes possible for the user to easily read the telop.

A specific method is to perform the reading-aloud process using the voice synthesis engine without outputting the resultant voice, and determine the timing of displaying and switching a telop by referring to the timing of reading aloud the telop. For example, during a period in which the voice synthesis engine performs the reading-aloud process for a certain phrase without outputting the resultant voice, a string corresponding to that phrase is displayed in the form of a telop. When the reading-aloud operation for the next phrase is started, the string being displayed is switched to the next phrase.

The functional block configuration required to achieve such an operation of the telop generator engine linked to the operation of the voice synthesis engine will be described later with reference to FIG. 47.

7. Outputting Video File 7.1 Video File and Tags

The process performed by the document processing apparatus 1 according to the present embodiment has been described above mainly for the case where document data is processed. The document processing apparatus 1 according to the present embodiment is also capable of outputting video data related to document data in synchronization with or independently of various operations such as displaying of a document or a summary or a outputting a voice reading aloud the document or the summary. Thus, various operations of video data are described below.

First, a video data file in which video data is described (hereinafter, referred to simply as a video file) and tag structures attached to document data to relate a video file to the document data are described.

In some cases, when the document processing apparatus 1 receives document data via the communication device 21 or from the storage medium 32, a video file is input together with the document data. In another case, a video file may be input to the document processing apparatus 1 independently of document data.

As described earlier with reference to FIG. 4 or 12, the document data or video file input to the document processing apparatus 1 is stored in the RAM 14 or the HDD 34. The controller 11 reads document data from the RAM 14 or the HDD 34 as required and displays the document or a summary thereof or provides a voice output thereof. The video file related to document data may be read from the RAM 14 or the HDD 34 and displayed.

Figure 31:
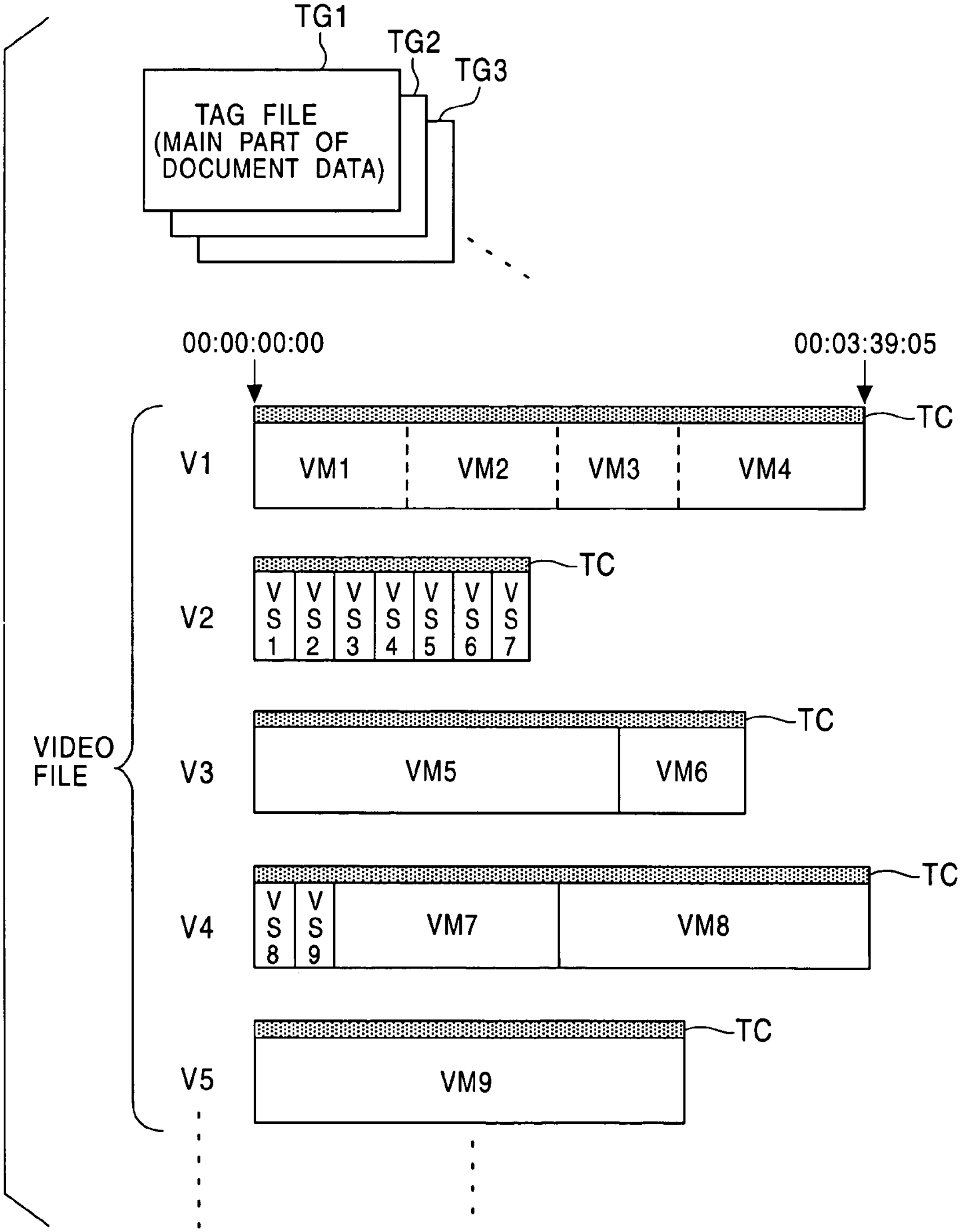
FIG. 31 is a schematic diagram illustrating a tag file and a video file according to the embodiment of the invention.

FIG. 31 conceptually illustrates document data and video files stored in the document processing apparatus 1.

In FIG. 31, document data or tag files stored in the document processing apparatus 1 include tag files TG1, TG2, TG3, etc.

Similarly, a plurality of video files V1, V2, etc., are stored.

Video files may include various types of contents produced at a server site from which document data and video data are supplied. For example, a video file V1 includes a plurality of motion image data VM1-VM4 representing different scenes. A video file V3 includes two motion image data VM5 and VM6, and video file V5 includes one motion image data VM9.

A video file V2 includes a plurality of still image data VS1-VS7.

A video file V4 includes a plurality of still image data VS8 and VS9 and a plurality of motion image data VM7 and VM8.

In addition to the above, there can be various video files.

Each video data may be formed in accordance with, for example, the MPEG standard.

Herein, it is assumed that each motion image data includes audio data. However, still image data includes no audio data in many cases, although still image data may also include audio data.

The term "audio data" refers to audio data recorded in correspondence with a motion or still image, and thus audio data used herein is not such audio data used to read aloud a document or a summary thereof (that is, audio data used herein is not an audio signal generated during the above-described voice synthesis process).

That is, audio data used herein is linked to video data, and it does not have direct correspondence with document data. Examples of such audio data include a sound recorded at the same time when an image was recorded, a sound effect, and an announcing/narrating voice, which are generally included in many video data. However, audio data having direct correspondence with document data may be included in video data linked to the document data.

Each video file includes time codes TC in the form of hour/minute/second/frame described for each frame. For example, in the video file V1, a time code TC indicating "00:00:00:00" is attached to the first frame, and a time code TC indicating "00:03:39:05" is attached to the last frame, as shown in FIG. 31. Intermediate frames each have their own time code TC.

Time codes TC point to corresponding frames in a video file. Therefore, it is possible to reproduce desired frames (in a desired period) by specifying time codes. For example, in order to reproduce the motion image data VM2 in the video file V1, time codes pointing to the first and last frames of the motion image data VM2 are specified.

As described above, each video file is made up of one or more motion image data or still image data. When a video data is linked to document data (tag file), the document data includes a tag specifying a video file name, motion image data, and/or still image data.

That is, a tag may be described in a tag file to specify video data related to the entire document or a particular phrase, sentence or a phrase. In accordance with such a tag (hereinafter, a tag specifying video data will be referred to as a video tag), the document processing apparatus 1 detects video data related to the document data and outputs it.

FIGS. 32 and 33 illustrate examples of tag files including video tags.

In the example shown in FIG. 32, video tags are added to a tag file including the same content as that shown in FIG. 18.

In the example of the tag file shown in FIG. 18, the range of a document is defined by tags <document> and </document>. In contrast, in the example shown in FIG. 32, tags indicating the range of a document includes a video tag such as <document: video file="V3"><scene="VM5"; in "00:00:00:00; out="00:00:03:12"> . . . </scene></document>

The above tags indicate that the motion image data VM5 in the video file V3 shown in FIG. 31 is related to the entire document data. Furthermore, the start time (start frame) and the end time (end frame) of a scene represented by the motion video data VM5 in the video file V3 are specified by time codes in="00:00:00:00" and out="00:00:02:12".

On the basis of the tags described above, the controller 11 detects video data related to the tag file and outputs the video data in accordance with the tags.

In the example shown in FIG. 33, video tags are added to a tag file including the same content as that shown in FIG. 19.

In this example, one still image data is linked to each sentence in the document.

Tags <document: video file="V2"> . . . </document> indicate that video data related to the document is contained in the video file V2.

The range of each sentence is indicated by tags <sentence> . . . </sentence>. As denoted by Examples 12 to 16 in FIG. 33, the respective pairs of tags indicating the corresponding sentence ranges are described as follows:

<sentence: scene="VS1"> . . . </sentence>
<sentence: scene="VS2"> . . . </sentence>
<sentence: scene="VS3"> . . . </sentence>
<sentence: scene="VS4"> . . . </sentence>
<sentence: scene="VS5"> . . . </sentence> thereby indicating that still image data VS1, VS2, VS3, VS4, and VS5 are related to the respective sentences.

In the case where the still image data VS1-VS7 in the video file V2 can be reproduced by specifying the data names "VS1", . . . , "VS7", it is possible to specify a particular scene by a video tag that simply indicates only the corresponding data name. Alternative, still data may also be specified by a time code described in a video tag as with motion video data.

Conversely, when a particular period of motion video data can be specified by only its data name, it is not necessarily required to use time codes.

As described above, on the basis of tags described in a manner as shown in FIG. 32 or 33, the controller 22 detects video data related to particular sentences in a tag file and outputs video data in accordance with the tag.

In the specific example shown in FIG. 32, one motion image data is related to the entire document. On the other hand, in the example shown in FIG. 33, one still image date is related to each sentence in the document. Note that the manner of tagging is not limited to the above examples, but video data may also be related to a tag file in various ways.

For example, video data may be related to a particular paragraph or phrase by adding video tags to <paragraph> . . . </paragraph> or <*phrase> . . . </*phrase>.

A plurality of motion image data may also be related to a single tag file. Combinations of still image data and motion mage data may be related to a tag file.

7.2 Outputting Video Data

As described above, by describing a tag file in the above-described manner, it becomes possible for the document processing apparatus 1 to output video data related to the tag file.

The operations of outputting video data in various modes (simply outputting video data, outputting video data during the operation of displaying a summary, outputting video data during the operation of reading aloud a text) are described below.

Figure 35:
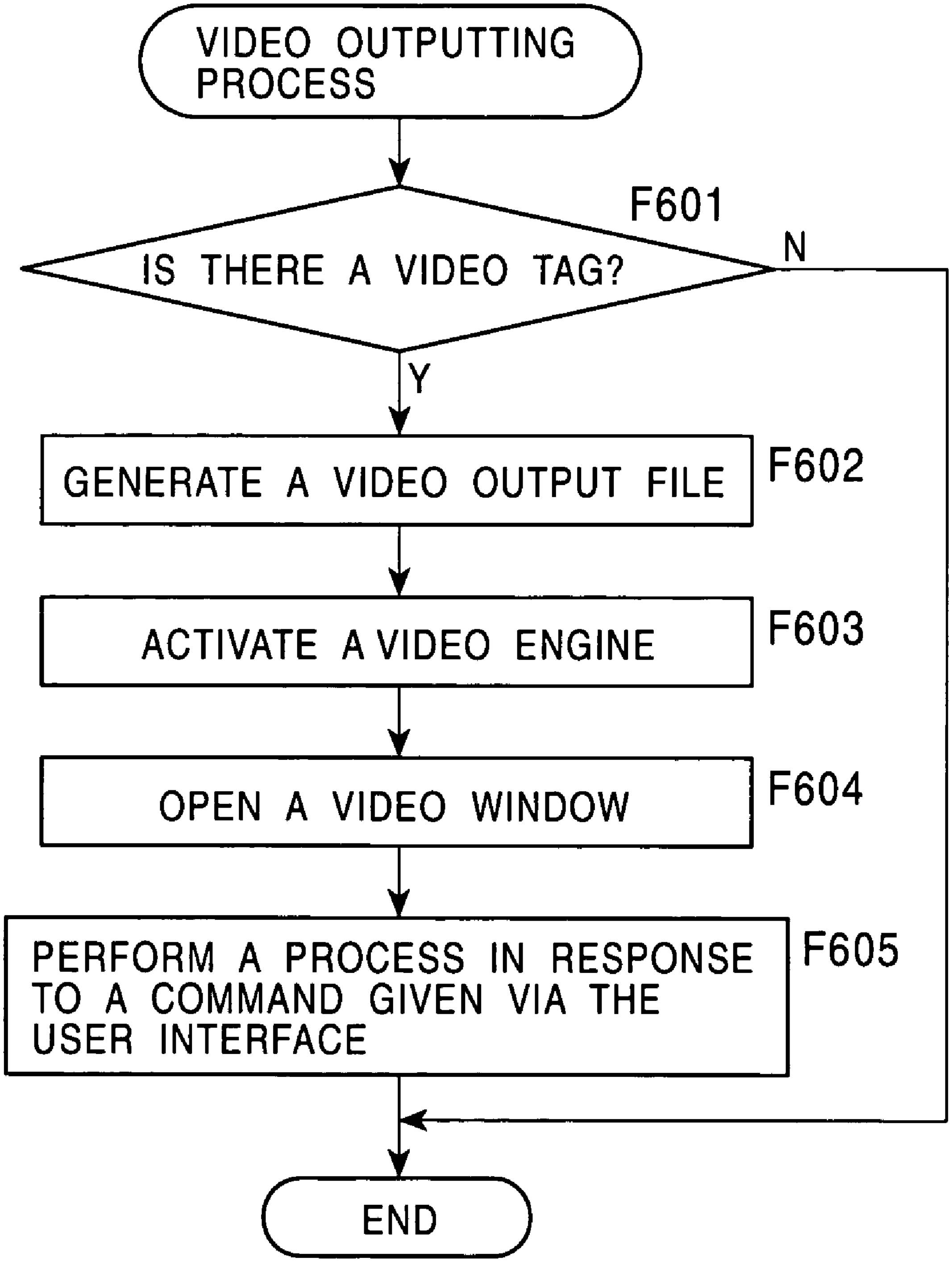
FIG. 35 is a flow chart illustrating a process of outputting video data according to the embodiment of the invention.
Figure 36:
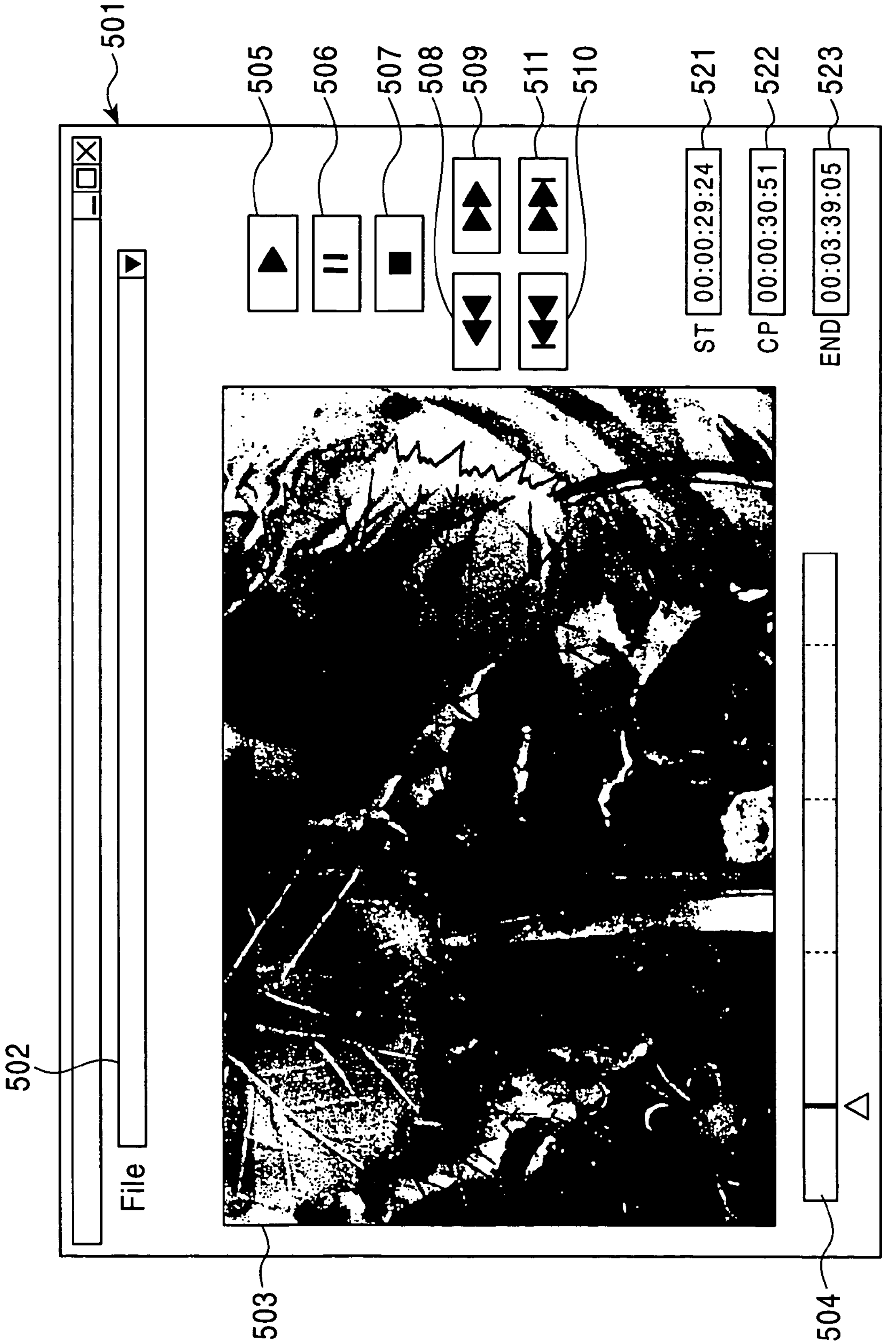
FIG. 36 is a schematic diagram illustrating a video window in which video data is output according to the embodiment of the invention.

First, with reference to FIGS. 34 to 36, the operation of simply outputting video data independently of the operation of displaying a summary or the operation of reading aloud a text is described.

The displaying parameters (such as a displaying period and timing parameter) associated with the outputting of video data such as a motion image or a still image may be set in various manners depending upon the tag file structure, the type of video data (motion image, still image), and the conditions of displaying or reading aloud a text, as will be discussed later with reference to FIG. 41.

FIG. 35 illustrates a process performed by the controller 11 to output video data. This process is started when the video button 306*d* is clicked when the browser window 301 is displayed as shown in FIG. 26. The process may also be started when the video button 306*d* is clicked when a generated summary is displayed as shown in FIG. 27.

In response to clicking the video button 306*d*, the controller 11 performs step F601 shown in FIG. 35 to detect a tag file associated with a document displayed in the browser window 301. Furthermore, the controller 11 determines whether the tag file includes a video tag as is the case with the tag files shown in FIGS. 32 and 33 or the tag file includes no video tag as is the case with the tag files shown in FIGS. 18 and 19.

In the case where the tag file associated with the document displayed in the browser window 301 includes no video tags, it is determined in step F601 that there is no video data related to the document data displayed in the browser window 301, and the video outputting process is terminated. That is, in this case, the clicking of the video button 306*d* is an invalid operation.

On the other hand, when the tag file associated with the document displayed in the browser window 301 includes a video tag, it is determined in step F601 that there is a video data related to the document data displayed in the browser window 301, and thus the controller 11 advances the process to step F602. In step F602, a video output file is generated.

Herein, the video output file is referred to a file generated by extracting video tags from a tag file.

FIG. 34A illustrates an example of a vide output file generated from the tag file shown in FIG. 32. In this example, a video tag is extracted from the tag file and a video output file is formed so as to specify the motion image data VM5 in the video file V3.

FIG. 34B illustrates an example of a vide output file generated from the tag file shown in FIG. 33. In this example, a video output file is formed so as to specify the still image data VS1-VS5 in the video file V2.

These video output files are used by a video engine in the document processing apparatus 1 to reproduce video data.

The video engine may be implemented with hardware or software. When the video engine is implemented with software, the video engine program is stored in advance in the ROM 15 or the HDD 34. The functional configuration including the video engine will be described later with reference to FIG. 47.

Note that FIG. 34 illustrate examples of video output files and a video output file may be formed in various different structures.

In the process shown in FIG. 35 or processes that will be described later with reference to FIGS. 37 and 39, it is assumed that video data is output in accordance with a video output file. However, video data may also reproduced by the video engine by directly referring to a tag file.

After step F602, the controller 11 performs step F603 to activate the video engine.

Subsequently, in step F604, the controller 11 opens a video window 501 on the display 30 as shown in FIG. 36.

The video window 501 includes a file name displaying area 502 for displaying the file name of a document data file, a video displaying area 503 for displaying video data related to the document data having the file name displayed in the file name displaying area 502, a video bar 504 for indicating the temporal position in the progress of reproduction of motion image data displayed in the video displaying area 503, a start position indicator 521 for indicating the start position, in time code, of the image displayed in the video displaying area 503, a current position indicator 522 for indicating the current position, in time code, of the reproduced image, and an end position indicator 523 for indicating the end position, in time code, of the displayed image.

The video window 501 also includes buttons used by a user to issue various command, such as a play button 505, a pause button 506, a stop button 507, a fast reverse button 508, a fast forward button 509, a reverse search button 510, and a forward search button 511.

After opening the video window 501, the controller 11 performs an operation, in step F605, in response to a command issued by the user via the user interface.

For example, in the video output file shown in FIG. 34A, reproduction of the motion image data VM5 in the video file V3 shown in FIG. 31 is specified. In this case, if the play button 505 is clicked in the video window 501, the controller 11 starts the reproduction of the motion image data VM5 using the video engine. As a result, the motion image corresponding to the motion image data VM5 is displayed in the video displaying area 503. If the motion image data VM5 includes audio data, an audio signal represented by the audio data is output via the audio output unit 33.

If the pause button 506 is clicked, the controller 11 makes the video engine temporarily stop the reproduction of the motion image data VM5.

If the stop button 507 is clicked, the controller 11 makes the video engine terminate the reproduction of the motion mage data VM5.

If the fast reverse button 508 or the fast forward button 509 is clicked, the controller 11 makes the video engine quickly reproduce the motion image data VM5 in a reverse or forward direction.

On the other hand, if the reverse search button 510 or the forward search button 511 is clicked, the controller 11 makes the video engine jump to, for example, the start position of a previous or next scene or to a particular image and restart the reproduction of the motion image data VM5.

If the user drag the current position indicator of the video bar 504 to a desired position, the controller 11 makes the video engine jump to the indicated position and restart the reproduction of the motion image data VM5.

In the case where still image data is specified as video data in the video output file such as that shown in FIG. 34B, the pause button 506, the fast reverse button 508, and the fast forward button 509 are useless. Therefore, in this case, they may be removed from the video window.

In this case, when the play button 505 is clicked, displaying still image is started. When a plurality of still image data are specified in a tag file, the still image data is switched when the reverse search button 510 or the forward search button 511 is clicked.

By issuing a command via the user interface in the above-described manner, the user can view video data in a desired manner.

By displaying, in the video window 501, video data related to document data being displayed in the browsing window 301, it becomes possible for the user to view the video data related to the document data and thus the user can understand the more detailed content of the document more precisely.

7.3 Outputting Video Data During the Operation of Displaying Summary

Figure 37:
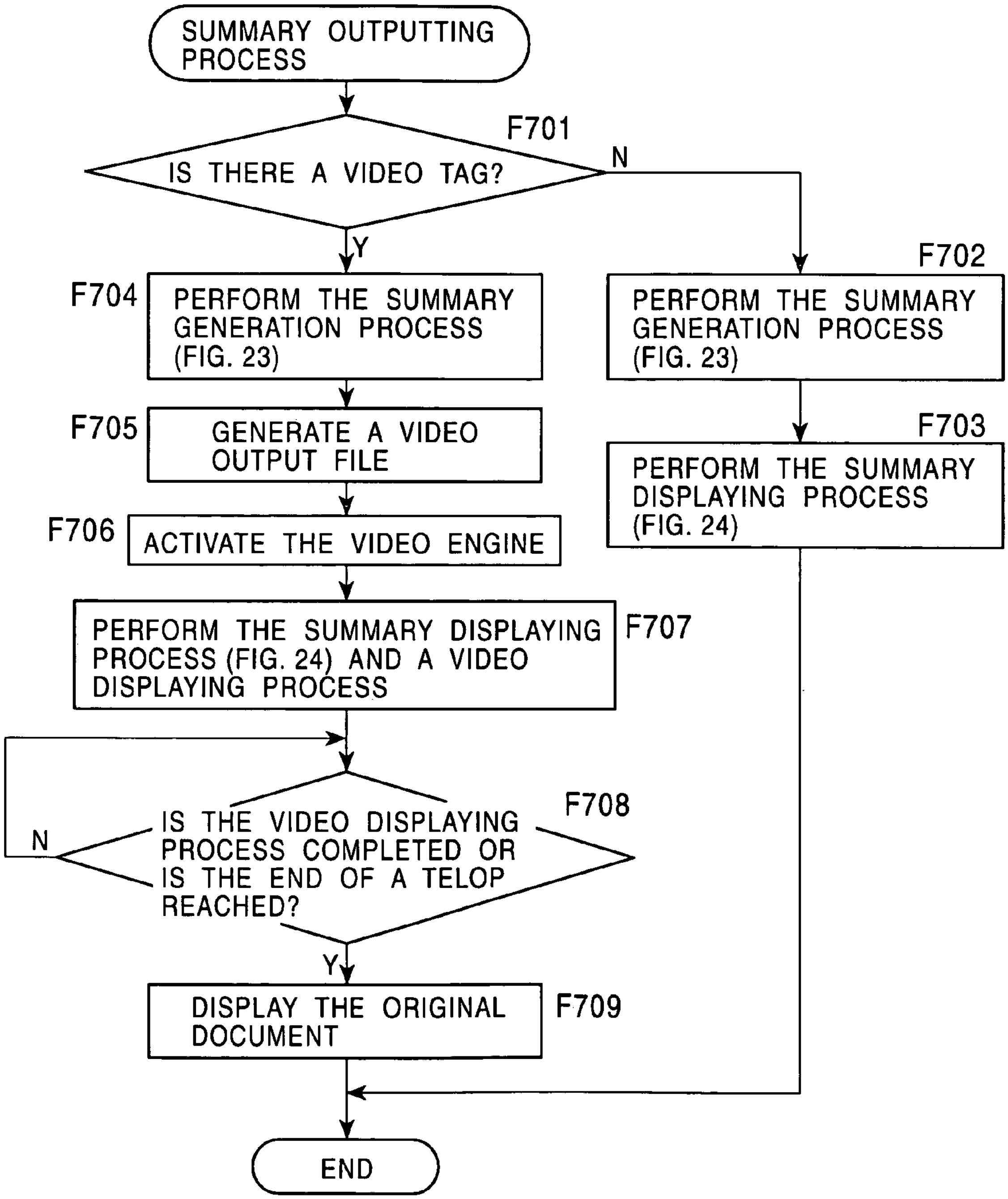
FIG. 37 is a flow chart illustrating a process of outputting a summary according to the embodiment of the invention.
Figure 38A:
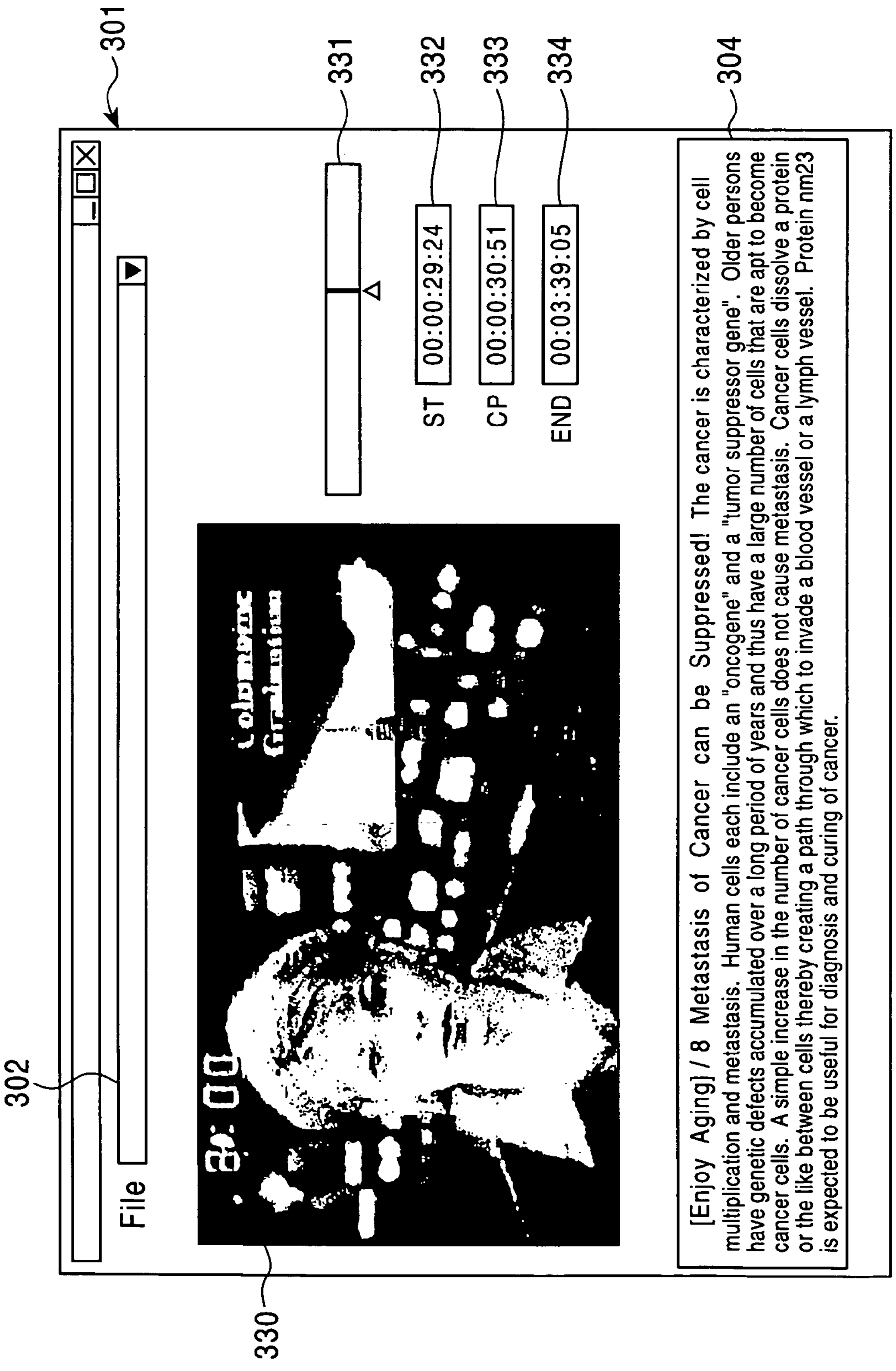
FIGS. 38A and 38B are schematic diagrams illustrating a window in which vide data and a summary are output.
Figure 38B:
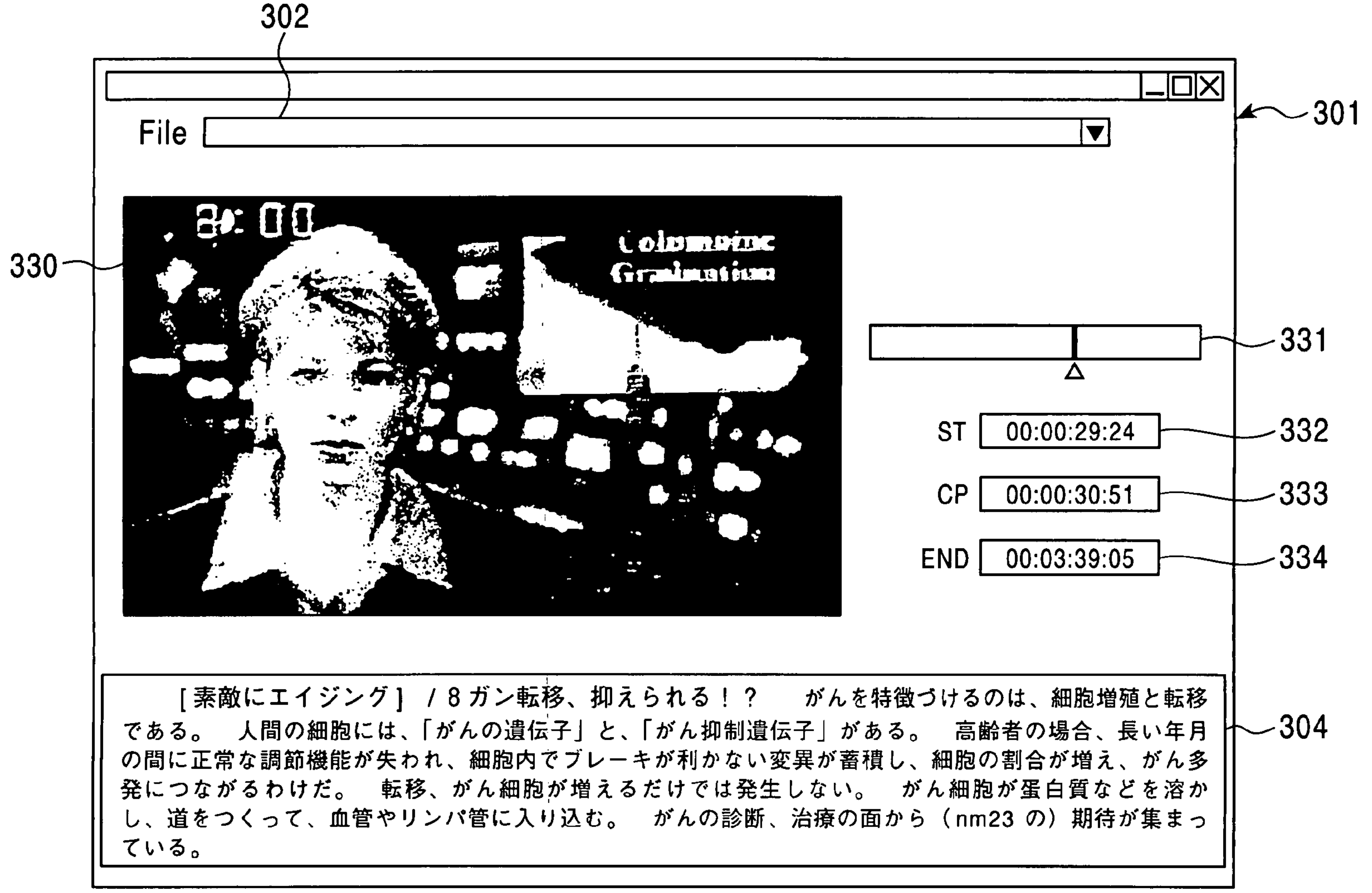

Now, referring to FIGS. 37 and 38, the operation of outputting video data during the operation of outputting a summary is described.

As described earlier, if a user clicks the summarization button 306*a* in the browser window 301 shown in for example FIG. 26, a summary having a document length corresponding to the current size of the summary displaying area 304 is generated and displayed therein in a fixed fashion. If the current size of the summary displaying area 304 is smaller than a predetermined value, a summary having a length greater than the size of the summary displaying area 304 is generated and displayed in the form of a telop in the summary displaying area 304 (such that the displayed information is scrolled).

When video tags are included in the original tag file from which the summary is generated, part of or all of the video tags may be added to the tag file associated with the summary so that video data is displayed when the summary is displayed.

FIG. 37 illustrates the outline of the process performed by the controller 11 to generate and display a summary and output video data.

If the summarization button 306*a* is clicked in the browser window 301, the controller 11 first performs step F701 shown in FIG. 37 to detect a tag file associated with document data displayed in the browser window 301. Furthermore, the controller 11 determines whether the tag file includes a video tag.

When a tag file including no video tags is displayed in the browsing window 301, it is determined in step F701 that there is no video data related to the document data being displayed. Thus, the process goes from step F701 to F702 and further to F703 to perform the summary generation process described earlier with reference to FIG. 23 and the summary displaying process described earlier with reference to FIG. 24 (and 25), respectively.

A summary is generated and displayed in a fixed fashion or in the form of a telop, as described earlier with reference to FIGS. 26-30.

On the other hand, when it is determined in F701 that a video tag is included in a tag file of document data being displayed in the browser window 301, there is video data related to the document data, and thus the controller advances the process to step F704 to start the operation of outputting video data during the summary displaying operation.

First, in step F704, the summary generation process described earlier with reference to FIG. 23 is performed. That is, a summary is generated by extracting sentences and phrases from the original document. Note that in this case, the generated tag file associated with the summary includes a video tag linked to an extracted sentence or phrase.

That is, the tag file associated with the summary includes part of or all of video tags included in the original tag file.

Only part of video tags are incorporated into the summary tag file and some video tags are not incorporated into the summary tag file, when the original tag file includes a video tag related to only a sentence or a phrase which has not been extracted into the summary. For example, if a sentence (third sentence) denoted by Example 14 in FIG. 33 is not extracted into a summary, video tag, scene="VS3", linked to only the third sentence is not incorporated into the summary tag file.

In the next step F705, the controller 11 generates a video output file such as that described above with reference to FIG. 34 in accordance with the summary tag file.

Then in step F706, the controller 11 activates the video engine.

In the next step F707, the controller 11 displays the summary (in a fixed fashion or in the form of a telop) by performing the process described above with reference to FIG. 24. At the same time, the controller 11 starts reproducing the video data using the video engine so that a motion image or a still image represented by the video data is displayed. In this process, audio data included in the video data is output via the audio output unit 33.

The generated summary is displayed in the summary displaying area 304 in the browser window 301 in a manner for example as shown in FIG. 38. The document display area 303 is replaced with a video displaying area 330, and the image output by the video engine is displayed therein.

In this case, the browsing window 301 also includes a video bar 331 for indicating the temporal position the image being displayed in the video displaying area 330, a start position indicator 332 for displaying a time code indicating the start position of the image being displayed, a current position indicator 333 for displaying a time code indicating the current position of the image being displayed, and an end position indicator 334 for displaying a time code indicating the end position of the image being displayed.

After starting the displaying of the video data together with the summary, the controller 11 monitors, in step F708, the occurrence of completion of the operation of displaying the video data or a telop of the summary. If the end of the operation of displaying the video data or the telop is detected, the process goes to step F709 to return the window to a state in which the original document is displayed as shown in FIG. 27 or 30. Thus, the entire process is completed.

As described above, in the case where video data related to a document is specified in a tag file, the specified video data related to the document is presented to a user when the summary is displayed. This allows the user to more easily understand the content of the summary (content of the document).

7.4 Outputting Video Data During the Operation of Reading Aloud Document

Figure 39:
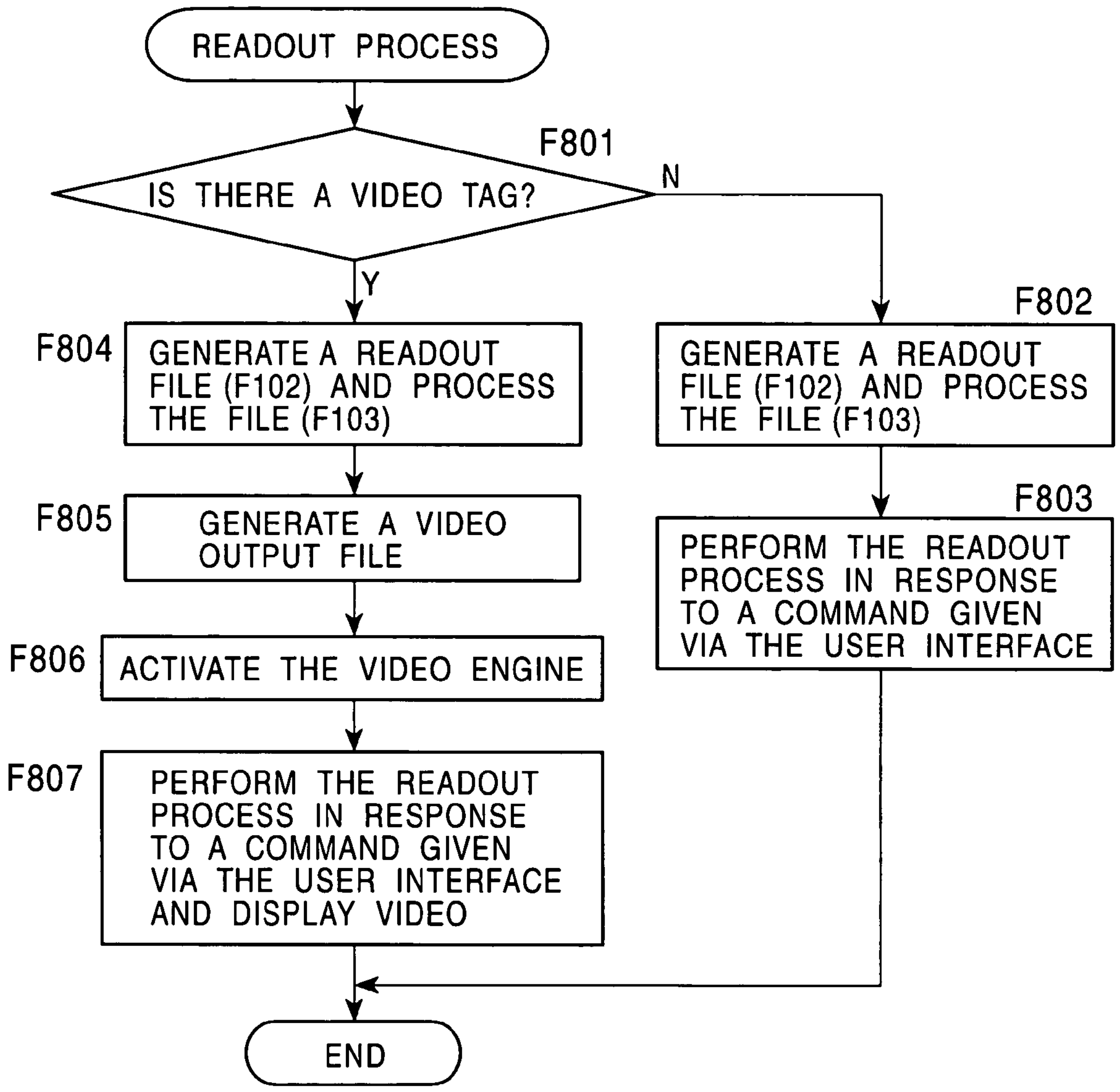
FIG. 39 is a flow chart illustrating a process of reading aloud a document according to the embodiment of the invention.
Figure 40:
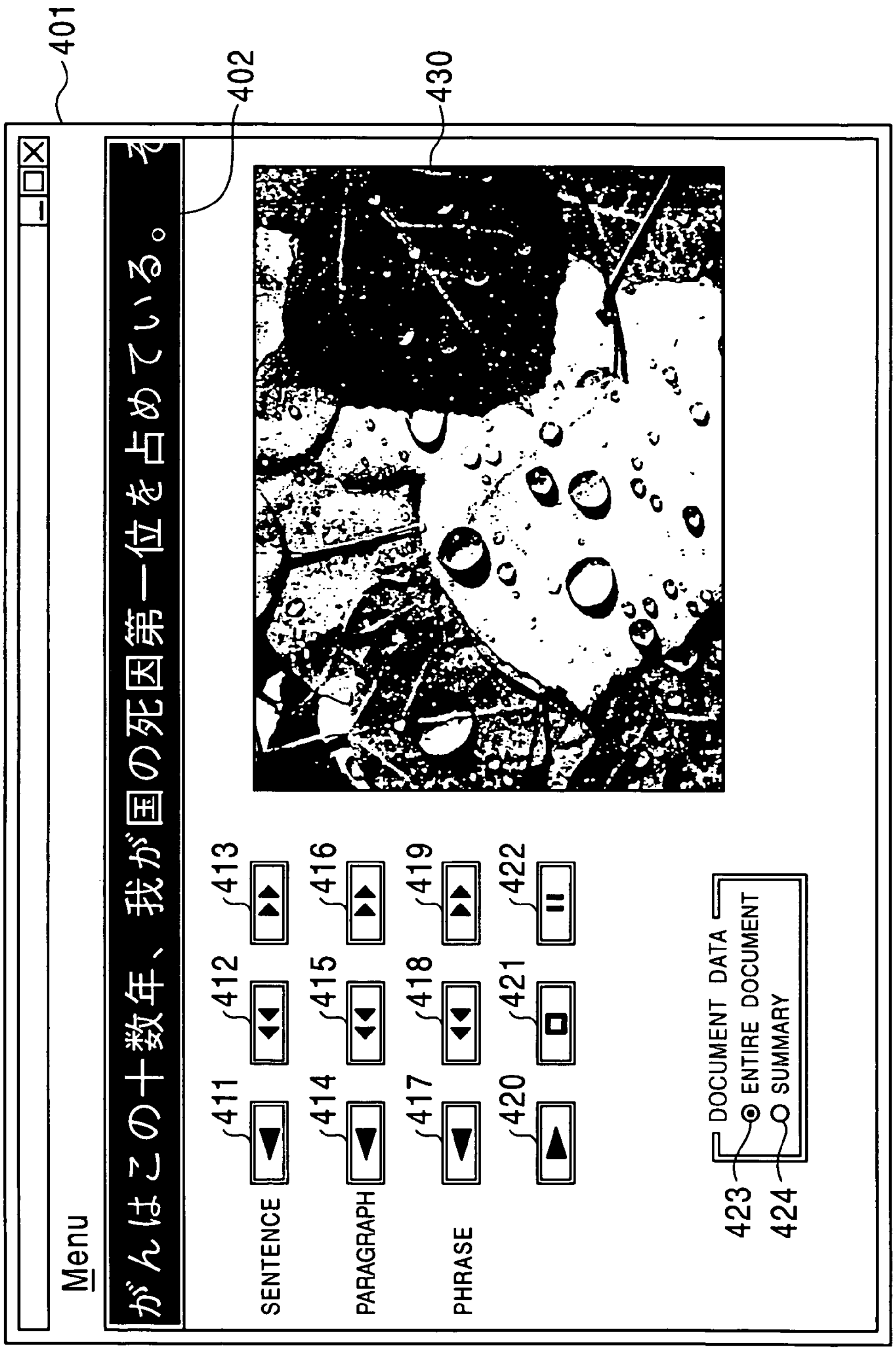
FIG. 40 is a schematic diagram illustrating a read-out window in which video data is also output.

Now, referring to FIGS. 39 and 40, the operation of outputting video data during a reading-aloud operation.

As described earlier, if the read-out button 306*c* is clicked in the browser window 301 shown in for example FIG. 26, reading-aloud of a document or a summary thereof displayed in the browser window 301 is started.

If the document tag file or the summary tag file includes a video tag, video data may be displayed when the document or the summary is read aloud.

The outline of the process performed by the controller 11 to read aloud a text and output video data is described below with reference to FIG. 39.

If the read-out button 306*c* is clicked in the browser window 301, the controller 11 first performs step F801 shown in FIG. 39 to detect a tag file associated with document data displayed in the browser window 301 (document tag file or summary tag file). Furthermore, the controller 11 determines whether the tag file includes a video tag.

In the case where the tag file associated with the document displayed in the browser window 301 includes no video tags, it is determined in step F801 that there is no video data related to the document data displayed in the browser window 301, and the controller 11 advances the process from step F801 to F802 and further to F803. In step F802, a read-out file is generated in the manner as described above with reference to FIG. 16, and a process is performed using the read-out file. That is, the process is performed in a similar manner to steps F102 and F103 shown in FIG. 16. After that, in step F803, the original document of the summary thereof is read aloud in response to a command issued by a user via the user interface.

That is, the process is performed in the manner described above with reference to step F104 in FIG. 16.

Thus, the reading-aloud operation is performed in response to a command issued by the user via the read-out window 401 shown in FIG. 22.

On the other hand, when the tag file associated with the document displayed in the browser window 301 includes a video tag, it is determined in step F801 that there is a video data related to the document data displayed in the browser window 301, and thus the controller 11 advances the process to step F804 to start the process of outputting video data while reading aloud the document.

In step F804, a read-out file is generated in a similar manner as described earlier with reference to FIG. 16 (as in step F101) and a process is performed using the read-out file (as in steps F102,F103) Subsequently, in step F805, a video output file such as that shown in FIG. 34 is generated.

After that, in step F806, the controller 11 activates the video engine.

In the next step F807, the controller 11 performs a read-aloud process in response to a command issued by the user via the user interface (as in step F104 in FIG. 16). In this step, the controller 11 also reproduces video data in synchronization with the read-aloud process, using the video engine. However, in this case, audio data contained in the video data is not output (but a reading-aloud voice is output via the audio output unit 33). However, audio data contained in the video data may also be output if desired.

In the above step F807, a video display area 430 is formed in the read-out window 401 as shown in FIG. 40, and an image output by the video engine is displayed in the video display area 430.

That is, in response to clicking the play button 420, outputting a reading-aloud voice and displaying motion image data or still image data are started.

Although not shown in FIG. 40, a video bar, a start position indicator, a current position indicator, and an end position indicator similar to those shown in FIG. 38 may be displayed in the read-out window 401.

As described above, when video data related to a document is specified in a tag file, the video data related to the document is presented when the document is read aloud thereby allowing the user to more easily understand the content of speech (content of the document).

7.5 Various Modes of Outputting Video Data

Some examples of operations performed by the document processing apparatus 1 according to the present embodiment to output video data have been described above. In practical operations, however, the reproduction period, the reproduction timing, and the part to be reproduced vary depending upon the structure of a tag file, the type of an image (motion image, still image), and the conditions of displaying or reading aloud a summary, Some examples of modes of outputting video data are described below with reference to FIGS. 41 to 46.

Figure 41:
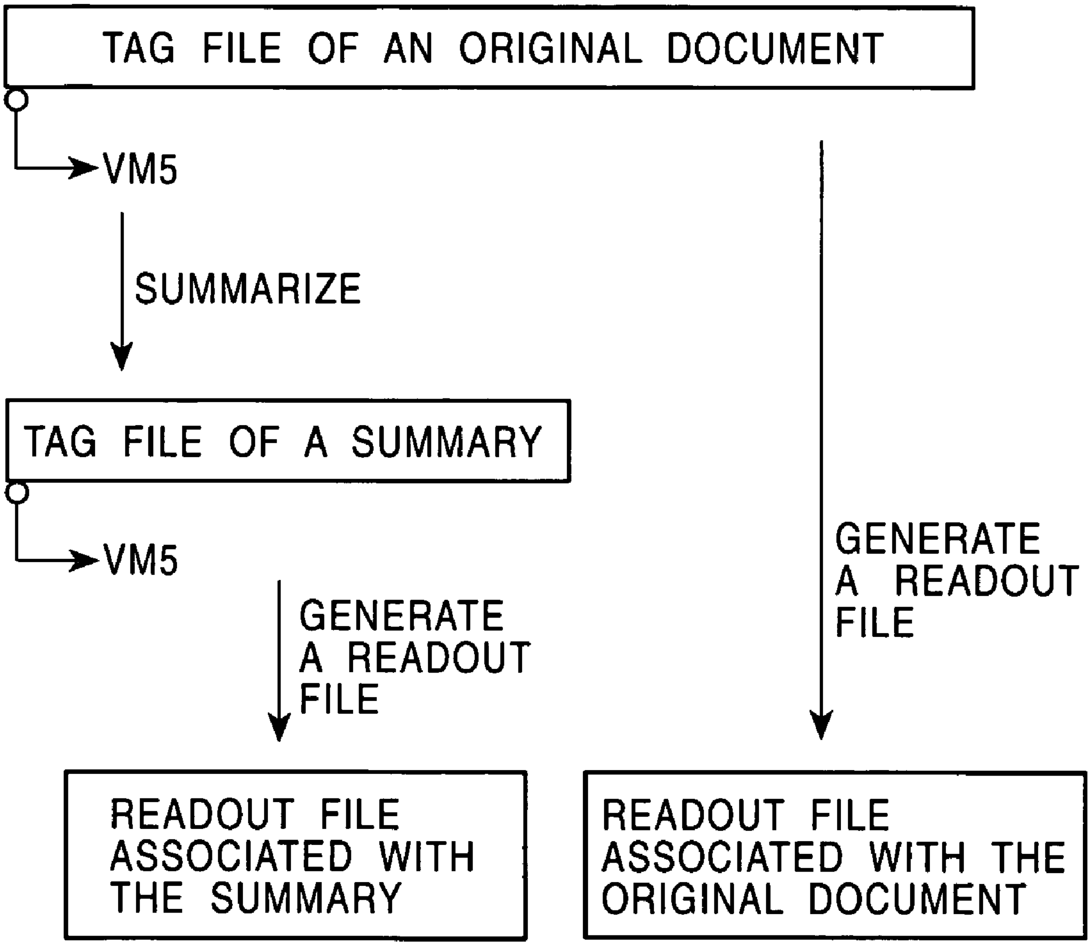
FIG. 41 is a schematic diagram illustrating an example of a tag file including a video tag according to the embodiment of the invention.
Figure 43:
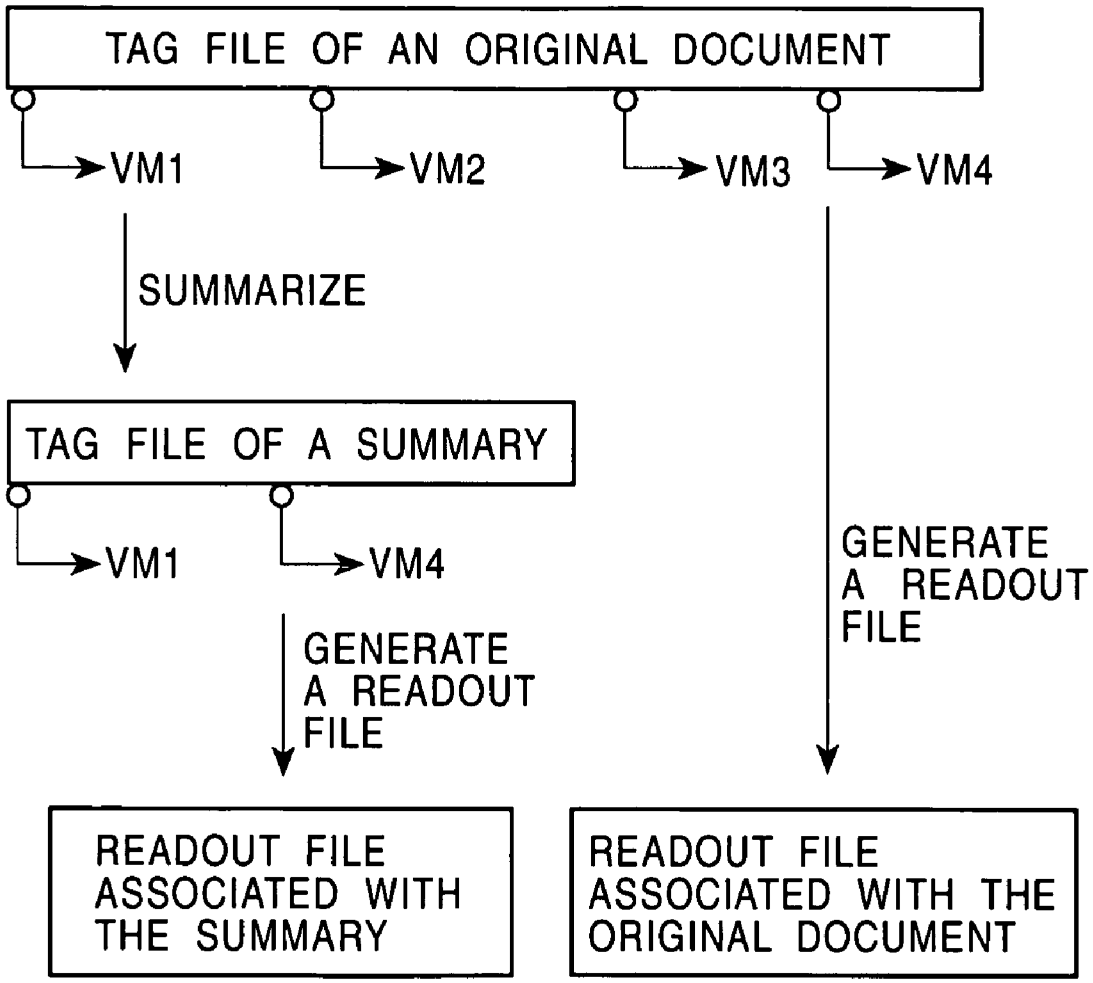
FIG. 43 is a schematic diagram illustrating another example of a tag file including a video tag according to the embodiment of the invention.
Figure 45:
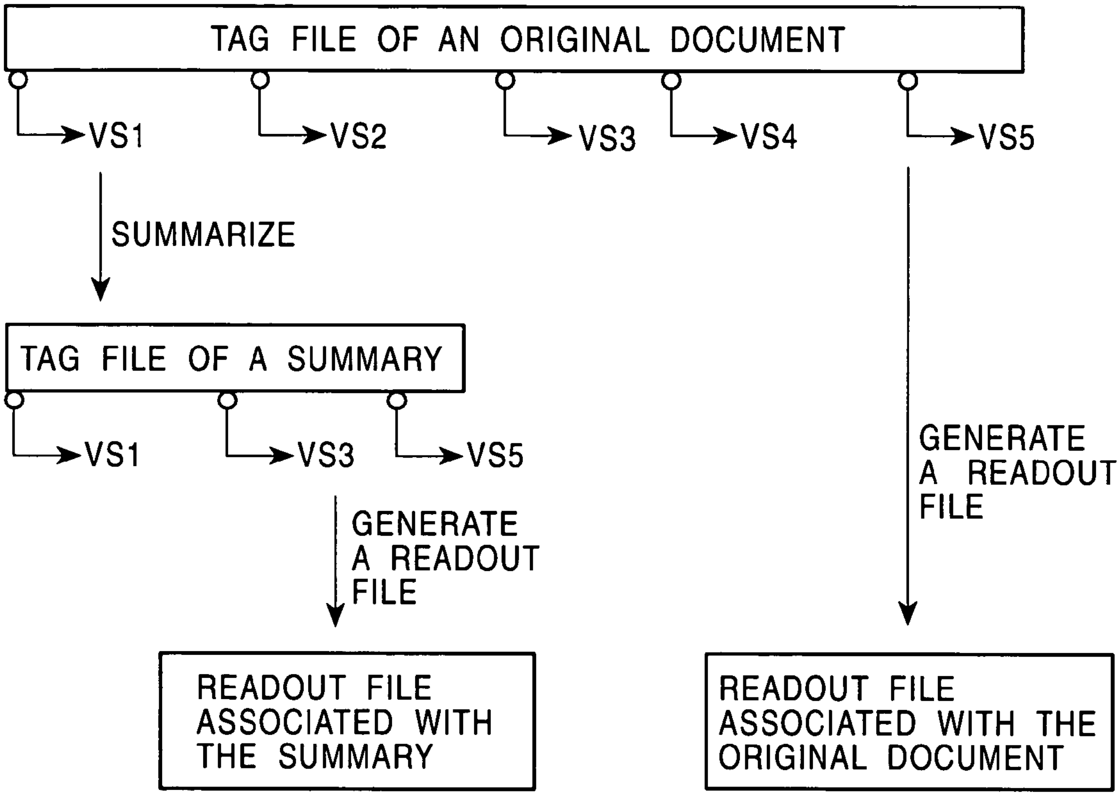
FIG. 45 is a schematic diagram illustrating still another example of a tag file including a video tag according to the embodiment of the invention.

FIGS. 41, 43, and 45 illustrate document tag files, summary tag files generated from the document tag files, and document read-out files and summary read-out files generated in the read-aloud process.

When a document tag file is input to the document processing apparatus 1, a summary tag file is generated by the process described earlier, and read-out files are generated from the above tag files.

In the example shown in FIG. 41, the document tag file includes a video tag indicating that motion video data VM5 is related to the entire document. The document tag file shown in FIG. 32 is a specific example of such a tag file.

In this case, a summary tag file is generated from the document tag file such that the summary tag file also includes a video tag to indicate that the motion image data VM5 is related to the entire summary.

In this case, the operation of outputting video data may be performed in various ways as described below with reference to FIG. 42. In this figure, and also in FIGS. 44 and 46 which will be described later, time is represented along a horizontal axis to illustrate the process of outputting video data. In these figures, solid-line arrows represent information outputs (such as a motion image data output, a telop output, and a reading-aloud audio output) whose contents vary with time. On the other hand, broken lines represent fixed outputs (such as a document or a summary being displayed in a fixed fashion, and a still image data output).

Figure 42A:
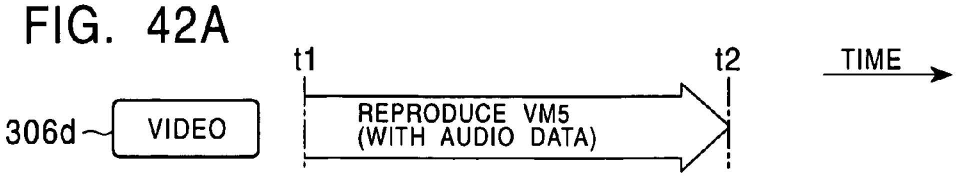
FIGS. 42A, 42B, 42C, 42D and 42E are schematic diagrams illustrating various modes of outputting video data.

If the video button 306*d* is clicked when the document tag file or the summary tag file shown in FIG. 41 is displayed in the browser window 301, video data is output by the video outputting process shown in FIG. 35 as described below, by way of example, with reference to FIG. 42A.

If a user clicks the play button 505 in the video window 501 shown in FIG. 36, reproducing the motion image data VM5 (and audio data) is started at a time t1. The reproduction of the motion image data VM5 is completed at, for example, a time t2.

During the reproduction of the motion image data VM5, if a user issues a command via the user interface in the video window 501, the video data is temporarily stopped, quickly reproduced in the forward or reverse direction, searched, or terminated in response to the command.

When the reproduction is completed at time t2, the video window 501 may be closed or may remain open so that the video data may be reproduced again. Alternatively, a still image representing a particular scene may be displayed after the completion of displaying the motion image data VM5.

If a summarization command is issued to generate a summary of the document tag file shown in FIG. 41 (by clicking the summarization button 306*a*), video data is output and the summary is displayed by the video outputting process shown in FIG. 37 as described below, by way of example, with reference to FIG. 42B or 42C.

Figure 42B:
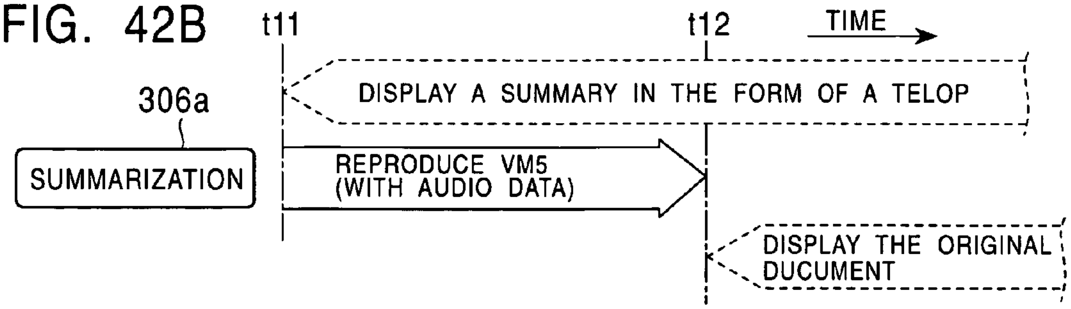

In the example shown in FIG. 42B, the summary generated is displayed in a fixed fashion.

In this example, displaying the summary in the fixed fashion in the browser window 301 shown in FIG. 38 is started at, for example, time t11, and the summary is maintained therein.

At time t11, reproducing the motion image data VM5 (and also audio data) in the video displaying area 330 is also started. If the reproduction of the motion image data VM5 is completed at, for example, time t12, the video displaying area 330 in the browser window 301 is closed, and the document displaying area 303 is opened again to display the document. After time t12, the document and the summary are displayed, for example, as shown in FIG. 27.

Figure 42C:
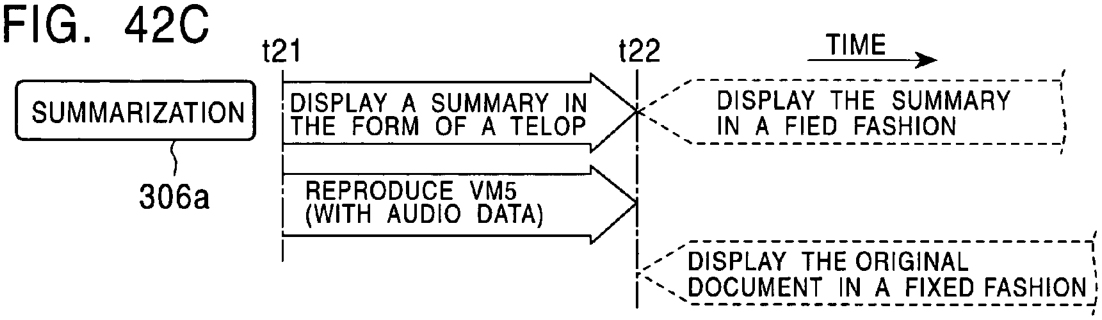

In the example shown in FIG. 42C, the summary is displayed in the form of a telop.

In this case, displaying the summary is started at time t21 such that the summary is displayed in the telop form in the summary displaying area 304 in the browsing window 301 in which the video displaying area 330 is opened, in a similar manner as described earlier with reference to FIGS. 28 and 29. The displaying the summary in the telop form is completed, for example, at time t22. Thereafter, a part of the summary is displayed in a fixed fashion as shown in FIG. 30.

At time t21, reproducing the motion image data VM5 (and also audio data) in the video displaying area 330 in the browsing window 301 is also started.

When displaying the summary in the telop form is completed at time t22, the reproduction of the motion image data VM5 is terminated even if the end of the motion image data VM5 has not been reached. After time t22, the document is displayed in a fixed fashion as shown in FIG. 30.

When a command is issued to read aloud the document tag file or the summary tag file shown in FIG. 43 (by clicking the read-out button 306*c*), the process shown in FIG. 39 is performed to output video data in the read-out widow 401. In this case, the operation of outputting video data may be performed in such a manner as is described below with reference to FIG. 42D or 42E.

Figure 42D:
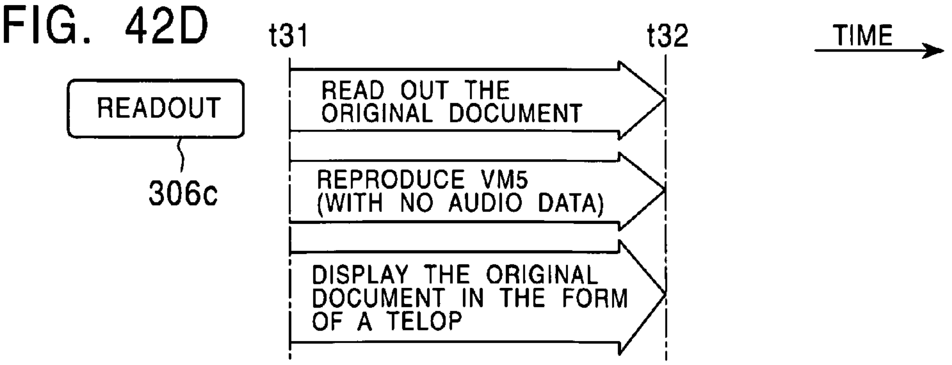

In the example shown in FIG. 42D, the document is read aloud.

If the play button 420 is clicked in the read-out window 401 shown in FIG. 40, reading aloud the document is started at time t31. At the same time, reproducing the motion image data VM5 in the video displaying area 430 is started (in this case, audio data is not reproduced).

In synchronization with the voice reading aloud the document, the document is displayed in the form of a telop in the telop displaying area 402 in the read-out window 401.

When reading aloud the document is completed at time t32, the reproduction of the motion image data VM5 is terminated even if the end of the motion image data VM5 has not been reached.

Figure 42E:
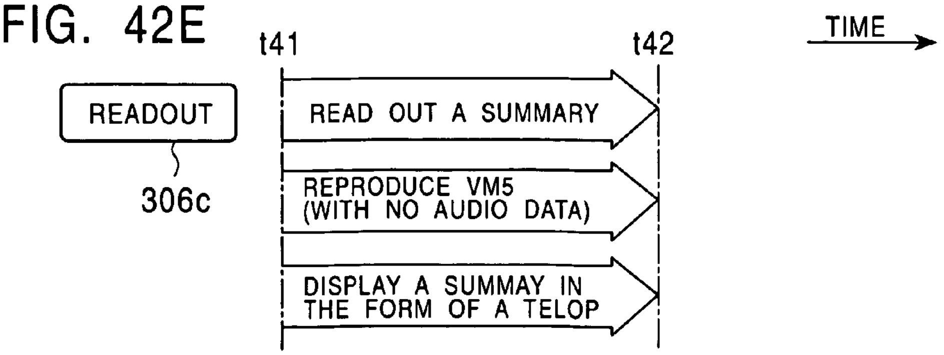

In the example shown in FIG. 42E, the summary is read aloud.

If the play button 420 is clicked in the read-out window 401, reading aloud the summary is started at time t41. At the same time, reproducing the motion image data VM5 in the video displaying area 430 is started (also in this case, audio data is not reproduced). In synchronization with the voice reading aloud the summary, the summary is displayed in the form of a telop in the telop displaying area 402.

When reading aloud the summary is completed at time t42, the reproduction of the motion image data VM5 is terminated even if the end of the motion image data VM5 has not been reached.

In the examples shown in FIGS. 42C, 42D, and 42E, the reproduction of the motion image data is terminated when the reading-aloud operation or the document/summary displaying operation is completed. However, in the case where the reproduction of the entire motion image data has already been completed, the motion image data may be reproduced again from its beginning during the remaining period, or a still image of a particular scene may be displayed.

In the example shown in FIG. 43, the document tag file includes video tags specifying motion image data VM1-VM4 related to paragraphs or sentences.

Herein, it is assumed that the summary tag file generated from the document tag file includes video tags specifying motion image data VM1 and VM2.

In this case, the operation of outputting video data may be performed in various ways as described below with reference to FIG. 44.

Figure 44A:
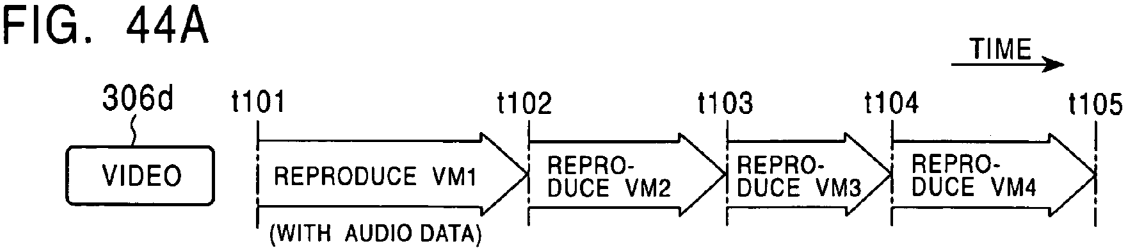
FIGS. 44A, 44B, 44C, 44D and 44E are schematic diagrams illustrating various modes of outputting video data.

If the video button 306*d* is clicked when the document tag file shown in FIG. 43 is displayed in the browser window 301, video data is output by the video outputting process shown in FIG. 35 as described below, by way of example, with reference to FIG. 44A.

In this case, if the play button 505 is clicked in the video window 501 shown in FIG. 36, reproduction of the motion image data VM1 (and audio data not only in this example but also in the examples described later) is started at time t101. When the reproduction of the motion image data VM1 is completed at time t102, reproduction of the motion image data VM2 is started. Similarly, reproduction of the motion image data VM3 is started at time t103, and reproduction of the motion image data VM4 is started at time t104. The reproduction of the motion image data VM4 is completed at time t105, and thus the reproduction of the video data is completed.

During the reproduction of the video data, if a user issues a command via the user interface in the video window 501, the video data is temporarily stopped, quickly reproduced in the forward or reverse direction, searched, or terminated in response to the command.

When the reproduction of the video data is completed at time t102, the video window 501 may be closed or may remain open so that the video data may be reproduced again. Alternatively, a still image representing a particular scene may be displayed after the completion of displaying the motion image data VM5.

If a summarization command is issued to generate a summary of the document tag file shown in FIG. 43 (by clicking the summarization button 306*a*), video data is output and the summary is displayed by the video outputting process shown in FIG. 37 as described below, by way of example, with reference to FIG. 44B or 44C.

Figure 44B:
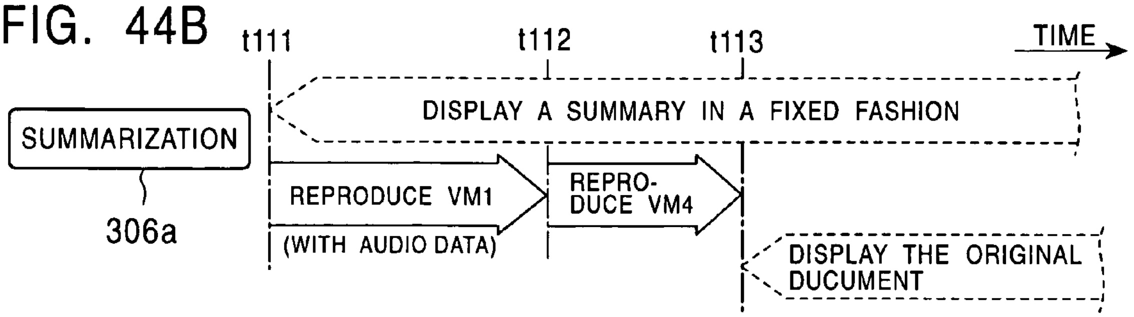

In the example shown in FIG. 44B, the summary generated is displayed in a fixed fashion.

In this case, displaying the summary in the fixed fashion in the browser window 301 shown in FIG. 38 is started at, for example, time t111, and the summary is maintained therein.

At time t111, reproducing the motion image data VM1 (and also audio data) in the video displaying area 330 is also started. When the reproduction of the motion image data VM1 is completed at time t112, reproduction of the motion image data VM4 (and also audio data) is started.

In the example shown in FIG. 43, video tags specifying the motion image data VM2 and VM3 are not described in the summary tag file, and thus these motion image data are not reproduced.

If the reproduction of the motion image data VM4 is completed at, for example, time t113, the video displaying area 330 in the browser window 301 is closed, and the document displaying area 303 is opened again to display the document. After time t113, the document and the summary are displayed, for example, as shown in FIG. 27.

Figure 44C:
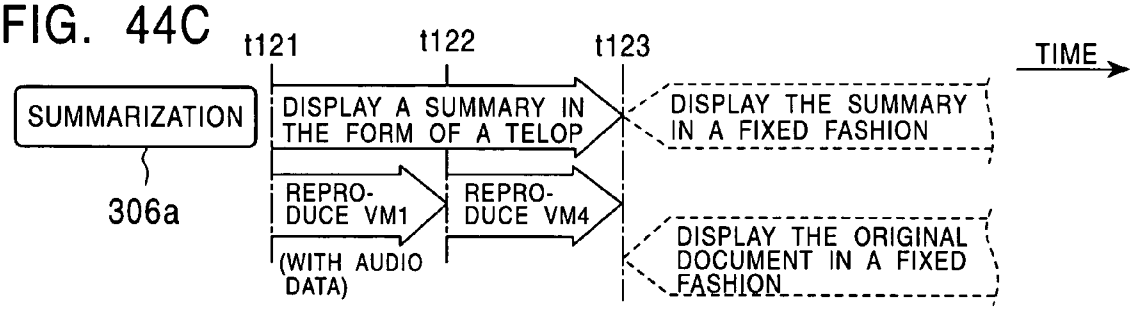

In the example shown in FIG. 44C, the summary is displayed in the form of a telop.

In this example, displaying the summary is started at time t121 such that the summary is displayed in the telop form in the summary displaying area 304 in the browsing window 301 in which the video displaying area 330 is opened, in a similar manner as described earlier with reference to FIGS. 28 and 29. The displaying the summary in the telop form is completed, for example, at time t123. Thereafter, a part of the summary is displayed in a fixed fashion as shown in FIG. 30.

At time t121, reproducing the motion image data VM1 (and also audio data) in the video displaying area 330 in the browsing window 301 is also started.

Thereafter, if the summary displayed in the telop form reaches a part corresponding to the motion image data VM4 at time t122, the reproduction of the motion image data VM1 is terminated and reproduction of the motion image data VM4 is started, even if the end of the motion image data VM1 has not been reached.

When displaying the summary in the telop form is completed at time t123, the reproduction of the motion image data VM4 is terminated even if the end of the motion image data VM4 has not been reached. After time t123, the document is displayed in a fixed fashion as shown in FIG. 30.

When a command is issued to read aloud the document tag file or the summary tag file shown in FIG. 43 (by clicking the read-out button 306*c*), the process shown in FIG. 39 is performed to output video data in the read-out widow 401. In this case, the operation of outputting video data may be performed in such a manner as is described below with reference to FIG. 44D or 44E.

Figure 44D:
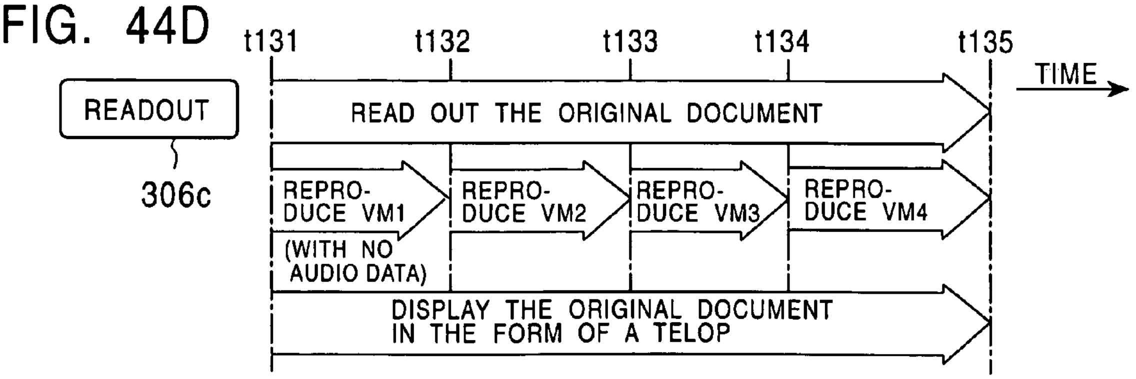

In the example shown in FIG. 44D, the document is read aloud.

If the play button 420 is clicked in the read-out window 401, reading aloud the document is started at time t131. At the same time, reproducing the motion image data VM1 in the video displaying area 430 shown in FIG. 40 is started (in this case, audio data is not reproduced).

In synchronization with the voice reading aloud the document, the document is displayed in the form of a telop in the telop displaying area 402 in the read-out window 401.

Thereafter, if reading aloud the document reaches a part corresponding to the motion image data VM2 at time t132, the reproduction of the motion image data VM1 is terminated and reproduction of the motion image data VM2 is started. Thereafter, in response to the progress of the reading-aloud operation, the reproduction of the motion image data VM2 is terminated and reproduction of the motion image data VM3 is started at time t133, and the reproduction of the motion image data VM3 is terminated and reproduction of motion image data VM4 is started at time 134.

When reading aloud the document is completed at time 135, the reproduction of the motion image data VM4 is terminated. That is, when the reading-aloud operation is completed, the reproduction of the video data is terminated.

Figure 44E:
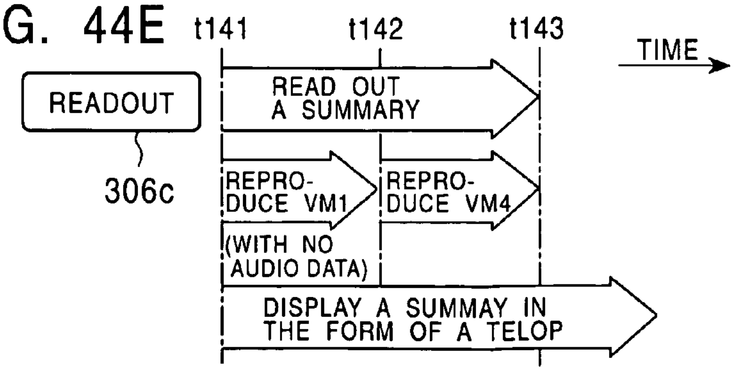

FIG. 44E illustrates an example in which the summary is read aloud.

If the play button 420 is, reading aloud the summary is started at time t141. At the same time, reproducing the motion image data VM1 in the video displaying area 430 shown in FIG. 40 is started (in this case, audio data is not reproduced). In synchronization with the voice reading aloud the summary, the summary is displayed in the form of a telop in the telop displaying area 402 in the read-out window 401.

Thereafter, if reading aloud the summary reaches a part corresponding to the motion image data VM4 at time t142, the reproduction of the motion image data VM1 is terminated and reproduction of the motion image data VM4 is started.

When reading aloud the summary is completed at time t143, The reproduction of the motion image data VM4 is terminated. That is, when the reading-aloud operation is completed, the reproduction of the video data is terminated.

In the examples shown in FIGS. 44C, 44D, and 44E, the reproduction of the motion image data is terminated when the reading-aloud operation or the document/summary displaying operation is completed. However, in the case where the reproduction of the entire motion image data has already been completed, the motion image data may be reproduced again from its beginning during the remaining period, or a still image of a particular scene may be displayed.

FIG. 45 illustrates an example in which the document tag file includes a video tags specifying still image data VS1-VM5 related to paragraphs or sentences.

Herein, let us assume that the summary tag file generated from the document tag file includes video tags specifying still image data VS1, VS3, and VS5.

In this case, the operation of outputting video data may be performed in various ways as described below with reference to FIG. 46.

Figure 46A:
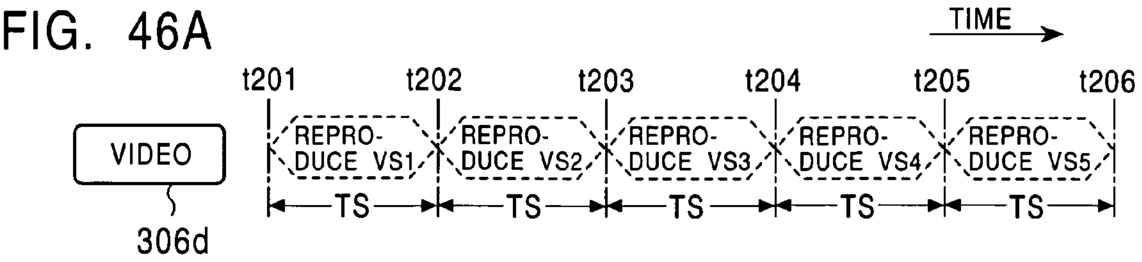
FIGS. 46A, 46B, 46C, 46D and 46E are schematic diagrams illustrating various modes of outputting video data.

If the video button 306*d* is clicked when the document tag file shown in FIG. 45 is displayed in the browser window 301, video data is output by the video outputting process shown in FIG. 35 as described below, by way of example, with reference to FIG. 46A.

In this case, if the play button 505 is clicked in the video window 501 shown in FIG. 36, reproduction of the still image data VS1 is started at, for example, time t201. The still image data VS1 is reproduced for a fixed period of time TS.

After the period of time TS has expired at t202, the still image data VS2 is reproduced for the period of time TS.

After that, the sill image data VS3, VS4, and VS5 are sequentially reproduced for periods TS, respectively.

The reproduction of the video data is completed at time t206.

During the reproduction of the video data, if a user issues a command via the user interface in the video window 501, reproduction is jumped forward or backward to a desired still image or terminated in response to the command.

When the reproduction of a series of still images is completed at time t202, the video window 501 may be closed or may remain open so that the series of still images may be sequentially reproduced again. Alternatively, a particular still image may be displayed.

Instead of automatically switching the still image data every period of time TS, the image data may be switched in response to a forward or reverse jump command issued by a user (by clicking the button 510 or 511).

If a summarization command is issued to generate a summary of the document tag file shown in FIG. 45 (by clicking the summarization button 306*a*), video data is output and the summary is displayed by the process shown in FIG. 37 as described below, by way of example, with reference to FIG. 46B or 46C.

Figure 46B:
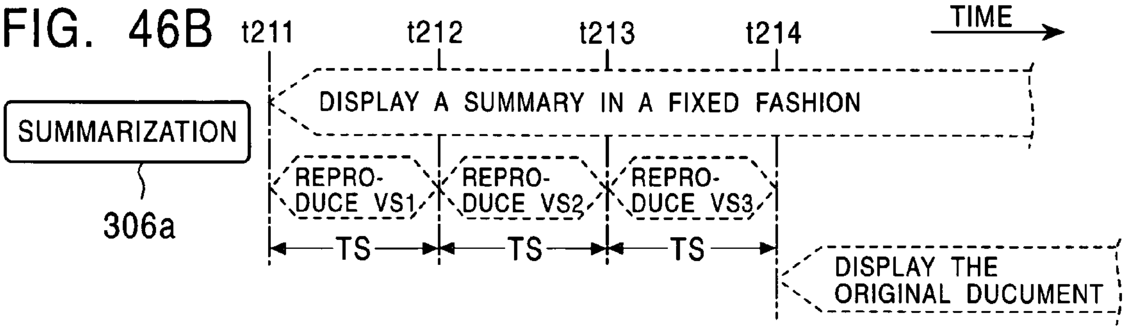

FIG. 46B illustrates an example in which the summary generated is displayed in a fixed fashion.

In this case, displaying the summary in the fixed fashion in the browser window 301 shown in FIG. 38 is started at, for example, time t211, and the summary is maintained therein.

At time t211, reproducing the still image data VS1 in the video displaying area 330 is also started and continued for a predetermined period of time TS. When the period of time TS has expired at t212, the reproduction of the still image data VS3 is started. Similarly, when a further period of time TS has expired at t213, the reproduction of the still image data VS5 is started.

In the example shown in FIG. 45, video tags specifying the still image data VS2 and VS4 are not described in the summary tag file, and thus these still image data are not reproduced.

If the reproduction of all still image data (VS1, VS3, and VS5) is completed at time t214, the video displaying area 330 in the browser window 301 is closed, and the document displaying area 303 is opened again to display the document. After time t214, the document and the summary are displayed, for example, as shown in FIG. 27.

In some cases, audio data is attached to still image data. In such a case, the still image data may be reproduced not for the predetermined period of time TS as in the examples shown in FIG. 46A or 46B but for a period required to reproduce the entire audio data.

Figure 46C:
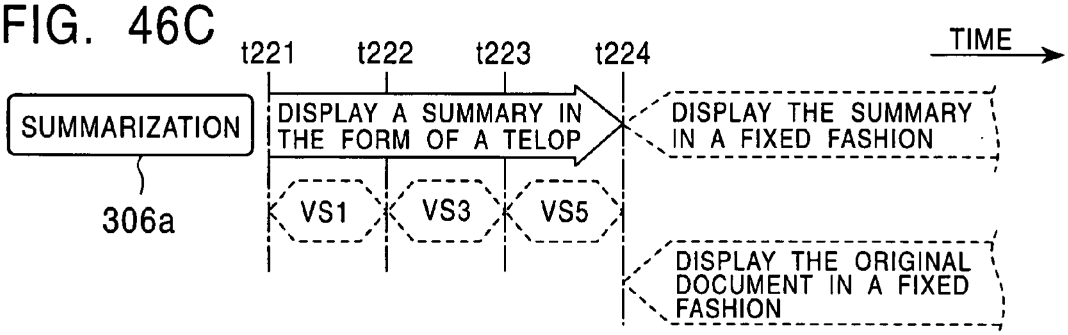

FIG. 46C illustrates an example in which the summary is displayed in the form of a telop.

In this example, displaying the summary is started at time t221 such that the summary is displayed in the telop form in the summary displaying area 304 in the browsing window 301 in which the video displaying area 330 is opened as shown in FIG. 38, in a similar manner as described earlier with reference to FIGS. 28 and 29. The displaying the summary in the telop form is completed, for example, at time t223. Thereafter, a part of the summary is displayed in a fixed fashion as shown in FIG. 30.

At time t221, reproducing the still image data VS1 in the video displaying area 330 in the browsing window 301 is also started.

Thereafter, if the summary displayed in the telop form reaches a part corresponding to the still image data VS3 at time t222, the reproduction of the still image data VS1 is terminated and reproduction of the still image data VS3 is started.

After that, if the summary displayed in the telop form reaches a part corresponding to the still image data VS5 at time t223, the reproduction of the still image data VS3 is terminated and reproduction of the still image data VS5 is started.

When displaying the summary in the telop form is completed at time t224, the reproduction of the video data is terminated. After time t224, the document is displayed in a fixed fashion as shown in FIG. 30.

When a command is issued to read aloud the document tag file or the summary tag file shown in FIG. 45 (by clicking the read-out button 306*c*), the process shown in FIG. 39 is performed to output video data in the read-out widow 401. In this case, the operation of outputting video data may be performed in such a manner as is described below with reference to FIG. 46D or 46E.

Figure 46D:
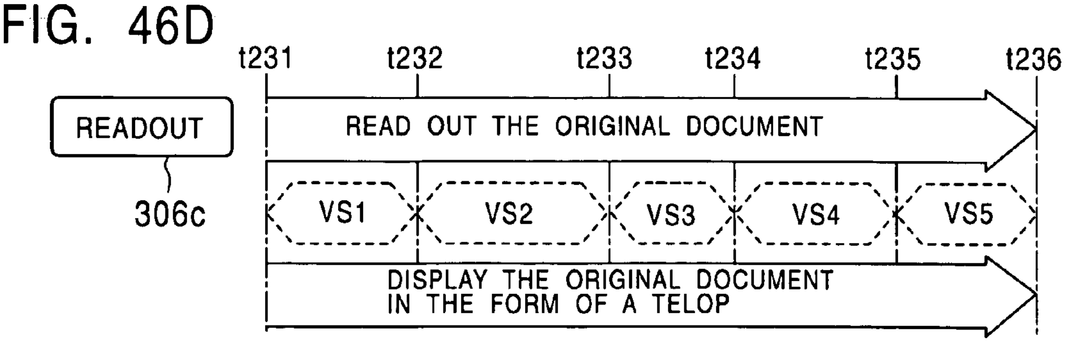
Figure 46E:
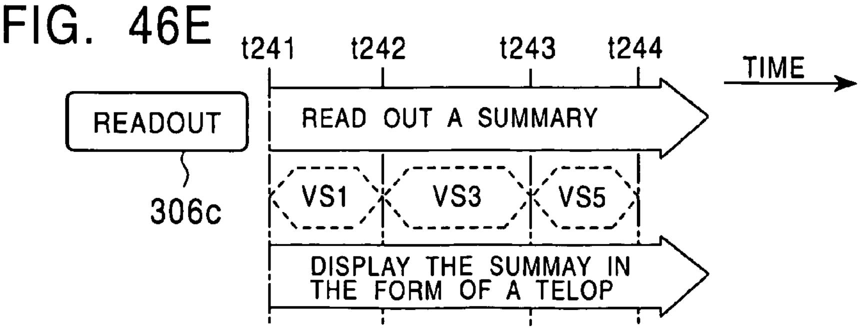

FIG. 46D illustrates an example in which the document is read aloud.

If the play button 420 is clicked in the read-out window 401, reading aloud the document is started at time t231. At the same time, reproducing the still image data VS1 in the video displaying area 430 shown in FIG. 40 is also started.

In synchronization with the voice reading aloud the document, the document is displayed in the form of a telop in the telop displaying area 402 in the read-out window 401.

If reading aloud the document reaches a part corresponding to the still image date VS2 at time t232, the reproduction of the still image data VS1 is terminated and reproduction of the still image data VS2 is started. Thereafter, in response to the progress of the reading-aloud operation, still image data VS3, VS4, and VS5 are reproduced in a similar manner.

When reading aloud the document is completed at time t236, the reproduction of the video data (still image data, in this case) is terminated.

FIG. 44E illustrates an example in which the summary is read aloud.

If the play button 420 is clicked in the read-out window 401, reading aloud the summary is started at time t241. At the same time, reproducing the still image data VS1 in the video displaying area 430 shown in FIG. 40 is also started. In synchronization with the voice reading aloud the document, the document is displayed in the form of a telop in the telop displaying area 402 in the read-out window 401.

Thereafter, if the summary displayed in the telop form reaches a part corresponding to the still image data VS3 at time t242, the reproduction of the still image data VS1 is terminated and reproduction of the still image data VS3 is started. Thereafter, in response to the progress of the reading-aloud operation, still image data VS5 is reproduced in a similar manner.

When reading aloud the summary is completed at time t244, the reproduction of the video data (still image data, in this case) is terminated.

Various modes of outputting video data have been described above. As described above, video data may be output in various ways depending upon whether the specified video data is a motion image or a still image, and also upon the operation conditions under which the video data is output. For example, the manner of outputting video data may vary depending upon whether the video data is to be reproduced independently of other operations or reproduced in synchronization with the operation of displaying or reading aloud a summary.

Of course, video data may be output in various manners different from the examples described above. When a combination of a still image and a motion image is specified in a single tag file, video data may be reproduced in a manner similar to some of the examples described above.

Furthermore, the manner in which video data is output may also vary depending upon the displaying period, the start/end timing, conditions as to synchronization with the operation of displaying or reading aloud a telop, and/or other factors.

8. Functional Block Configuration of the Document Processing Apparatus

The operation of the document processing apparatus 1 in various modes has been described above.

Figure 47:
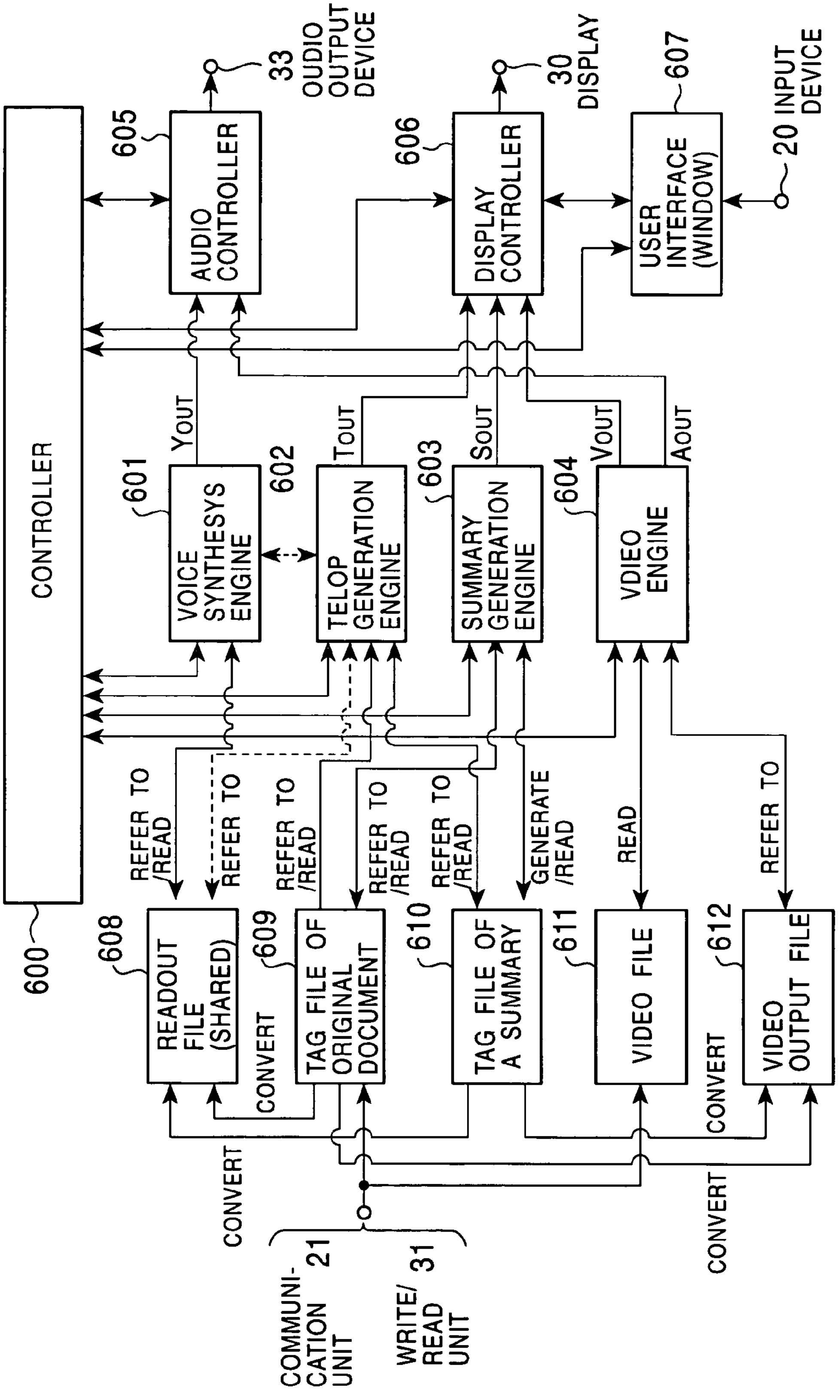
FIG. 47 is a functional block diagram of a document processing apparatus according to the embodiment of the invention.

In order to provide capabilities of performing various processes described above, the document processing apparatus 1 according to the present embodiment is configured with functional blocks and file systems as shown in FIG. 47, which may be implemented by software (or hardware) performed by the controller 11.

As shown in FIG. 47, the document processing apparatus 1 includes the voice synthesis engine 601, the telop generator engine 602, the summary generator engine 603, and the video engine 604, which have been described earlier. The document processing apparatus 1 also includes an audio controller 605 and a display controller 606 wherein the audio controller 605 serves to process an audio signal supplied to the audio output unit 33, and the display controller 606 serves to process an image signal supplied to the display 30.

As for the user interface 607, there is provided a device (such as a mouse in the input unit 20) for operating (clicking) buttons displayed in various windows.

The document processing apparatus 1 further includes a controller 600 for controlling the functional blocks described above.

Files stored in the document processing apparatus 1 includes a read-out file 608, a document tag file 609, a summary tag file 610, video file 611, and a video output file 612.

As described earlier, the document tag file 609 and the video file 611 is input to the document processing apparatus 1 via the communication device 21 or from the write/read unit 31 (storage medium 32). The summary tag file 610 is generated from the document tag file 609 by the summary generator engine 603.

The read-out file 608 is generated by means of conversion from the document tag file 609 or the summary tag file 610.

The video output file 612 is generated by means of conversion (by means of extraction of video tags) from the document tag file 609 or the summary tag file 610.

The various processes that have been described above are performed by the functional blocks shown in FIG. 47 as follows.

Reading-Aloud Process

In order to perform the reading-aloud process described above with reference to FIGS. 16-22, the read-out file 608 is first generated from the document tag file 609 or the summary tag file 610.

The voice synthesis engine 601 analyzes the read-out file 608 in response to a command issued by the controller 600 and synthesizes a voice in accordance with the read-out file 608.

The synthesized voice signal (reading-aloud voice signal) Yout is applied to the audio controller 605. The audio controller 605 adjusts the output level of the voice signal Yout and supplies the resultant signal to the audio output unit 33, which in turn outputs a voice in accordance with the voice signal Yout.

Under the control of the controller 600, the display controller 606 outputs an image signal representing the read-out window 401 to the display 30. The display 30 displays an image in accordance with the received image signal.

A command issued by a user via the read-out window 401 is transferred to the controller 600 via the user interface 607. In accordance with the command, the controller 600 controls the operation of the voice synthesis engine 601.

Generation of Summary

In the summary generation process described earlier with reference to FIG. 23, the controller 600 controls the summary generator engine 603 to generate a summary tag file representing a summary from the document tag file 609.

In the summary generation process, the controller supplies to the summary generator engine 603 information about the size of the summary displaying area 304 so that the summary is generated so as to have a length matching the size of the summary displaying area 3041.

Displaying Summary in Fixed Fashion

As described earlier with reference to FIGS. 23, 24, and 27, when the size of the summary displaying area has a size greater than the predetermined value wsth, the summary tag file 610 is generated such that a summary text has a length matching the size of the summary displaying area 304, and the resultant summary text is displayed in a fixed fashion.

In this case, the generated summary tag file 610 is used by the summary generator engine 603 to generate a text output Sout, which is then supplied to the display controller 606. The display controller 606 combines the received text data with the image of the browser window 300. The resultant image with the text data is displayed on the display 30 as shown in FIG. 27.

Displaying Summary/Document in the Telop Fashion

As described earlier with reference to FIGS. 23, 24, and 27, when the size of the summary displaying area has a size smaller than the predetermined value wsth, the summary tag file 610 is generated such that a summary text has a length greater than the size of the summary displaying area 304, and the resultant summary text is displayed in the form of a telop.

In this case, the generated summary tag file 610 is used by the telop generator engine 602 to successively generate and output telop text data Tout. The display controller 606 embeds the received telop text data into the image of the browser window 300. The resultant image with the telop text data is displayed on the display 30 as described earlier with reference with FIGS. 28-30.

Displaying Telop Text in Synchronization with Reading-Aloud Operation

A telop text may be displayed in synchronization with the progress of the reading-aloud operation, as described earlier.

In this case, the read-out file 608 generated by means of conversion from the summary tag file 601 is used by both the voice synthesis engine 601 and the telop generator engine 602 (a signal line represented by a broken line in FIG. 47 is formed).

Under the control of the controller 600, the voice synthesis engine 601 synthesizes a voice in accordance with the read-out file 608 and outputs the resultant voice signal. However, in this case, the audio controller 605 sets the output level of the synthesized voice signal Yout to zero so that the read-aloud voice is not presented to a user.

The telop generator engine 602 generates a telop text in accordance with the read-out file 608. During the above operation, timing signals are transmitted between the telop generator engine 602 and the voice synthesis engine 601. More specifically, in response to a timing signal received from the voice synthesis engine 601, the telop generator engine 602 generates a telop text and outputs it. This allows the telop text to be displayed in synchronization with the speed at which the text is read aloud.

The controller 600 may change the reading-aloud speed (synchronized with the telop displaying speed, in this case) by changing the setting of the voice synthesis engine 601 in accordance with information supplied from a user via the user interface 607.

Outputting Video Data

The video outputting process described earlier with reference to FIGS. 35 and 36 is performed by the video engine 604 under the control of the controller 600 in accordance with a command issued by a user via the user interface 607.

The video engine 604 analyzes the video output file 612 generated from the document tag file 609 or the summary tag file 610 to detect video data to be reproduced. The video engine 604 then reads the video data from the video file 611.

In accordance with the video data, the video engine 604 generates an image signal Vout and outputs it to the display controller 606. The display controller 606 embeds the received image signal Vout into the image of the video window 501 and supplies the resultant signal to the display 30. The display 30 displays the received signal as shown in FIG. 36. The image displayed on the display 30 may vary with time as described earlier with reference to FIG. 42A, 44A, or 46A.

When video data includes audio data, the video engine 604 generates an audio signal Aout in accordance with the audio data. The resultant audio signal Aout is supplied to the audio controller 605. The audio controller 605 adjusts the level of the audio data Aout and supplies it to the audio output unit 33. The audio output unit 33 outputs an audio signal in accordance with the received audio data.

In the operation of outputting video data, if a command is issued by a user in the video window 501, the command is transferred to the controller 600 via the user interface 607. In accordance with the command, the controller 600 controls the operation of the video engine 604.

Outputting Video Data Together with Summary Text

The operation of outputting video data together with a summary text, described earlier with reference to FIGS. 37 and 38, is performed by the video engine 604 and the summary generator engine 603 under the control of the controller 600. In the case where a summary text is displayed in the form of a telop, the outputting of the video data by the video engine

604 is performed in synchronization with the telop text output by the telop generator engine 602.

In the case where a summary text is displayed in a fixed fashion, when the summary text is displayed in the fixed fashion, the video engine 604 analyzes the video file 612 generated from the summary tag file 610 and detects video data to be reproduced. The video engine 604 then reads the video data from the video file 611. Furthermore, the video engine 604 supplies an image signal Vout to the display controller 606 and an audio signal Aout to the audio controller 605.

The display controller 606 embeds the video signal Vout into the image of the browser window 301 and supplies the resultant image signal to the display 30. The display 30 displays an image in accordance with the received image signal as shown in FIG. 38. The image displayed on the display 30 may vary with time as described earlier with reference to FIG. 42B, 44B, or 46B.

The audio controller 605 outputs the audio signal Aout via the audio output unit 33.

In the case where a summary text is displayed in the form of a telop, when the summary text is displayed in the telop form, the video engine 604 analyzes the video file 612 generated from the summary tag file 610 and detects video data to be reproduced. The video engine 604 then reads the video data from the video file 611. Furthermore, the video engine 604 supplies an image signal Vout to the display controller 606 and an audio signal Aout to the audio controller 605 thereby displaying an image on the display 30 as shown in FIG. 39 and outputting an audio signal via the audio output unit 33.

However, in this case, the video engine 604 receives a timing signal from the telop generator engine 602 via the controller 600 (or directly from the telop generator engine 602), and the video engine 604 switches the video data in accordance with the progress of the operation of displaying the telop text. The image displayed on the display 30 may vary with time as described earlier with reference to FIG. 42C, 44C, or 46C.

Outputting Video Data During Reading-Aloud Operation

The operation of outputting video data during the reading-aloud operation, described earlier with reference to FIGS. 39 and 40, is performed by the video engine 604 and the voice synthesis engine 601 under the control of the controller 600. In this case, the outputting of the video data by the video engine 604 is performed in synchronization with the reading-aloud voice output by the voice synthesis engine 601.

That is, when the reading-aloud process is performed, The video engine 604 analyzes the video output file 612 generated from the document tag file 609 or the summary tag file 610 to detect video data to be reproduced. The video engine 604 then reads the video data from the video file 611. Furthermore, the video engine 604 supplies an image signal Vout to the display controller 606. In this case, no audio signal is supplied to the audio controller 605.

The display controller 606 embeds the video signal Vout into the image of the read-out window 401 and supplies the resultant image signal to the display 30. The display 30 displays an image in accordance with the received image signal as shown in FIG. 40.

However, in this case, the video engine 604 receives a timing signal from the voice synthesis engine 601 via the controller 600 (or directly from the voice synthesis engine 601) and the video engine 604 switches the video data in accordance with the progress of the reading-aloud operation. The image displayed on the display 30 may vary with time as described earlier with reference to FIG. 42D, 42E, 44D, 44E, 46D or 46E.

The audio controller adjust the output level of the synthesized voice signal (reading-aloud voice signal) Yout and supplies the resultant signal to the audio output unit 33, which in turn outputs a voice in accordance with the voice signal Yout.

A command issued by a user via the read-out window 401 is transferred to the controller 600 via the user interface 607. In accordance with the command, the controller 600 controls the operation of the voice synthesis engine 601. In accordance with the command, the controller 600 also controls the operation of the video engine 604.

The functional blocks of the document processing apparatus 1 have been described above with reference to the particular example shown in FIG. 47. However, the functional block configuration and the operation thereof are not limited to those described above.

FIG. 47 shows only those parts related to the operation of outputting signals via the display 30 and the audio output unit 33, and functional blocks required to perform the document reception process, the document categorization process, and other processes are not shown.

Although the present invention has been described above with reference to the specific embodiment, the invention is not limited to the embodiment described above. The configurations associated with hardware and software of the document processing apparatus 1 and the operation thereof may be realized in various ways.

The respective parts of the document processing apparatus 1 may be realized in various forms. For example, the input unit 20 of the document processing apparatus 1 may be realized not only in the form of a keyboard or a mouse but also in the form of a tablet, a light pen, a remote control unit using an infrared ray, etc.

In the embodiments described above, it is assumed that the document processing apparatus 1 receives, using the communication device 22, a document or a video file transmitted from the outside via a telephone line. However, in the present invention, the medium for acquiring a document or video file is not limited to the telephone line. For example, a document or a video file may be received via a satellite or from the storage medium 32 via the write/read unit 31. A document or a video file which has been written in advance in the ROM 15 may also be used.

In the embodiment described above, some examples of manners of tagging a document have been presented. However, the present invention is not limited to such an example.

In the embodiment described above, a document written in Japanese and a document written in English have been taken as examples. However, the present invention is not limited to those languages.

Note that various modifications and changes are possible without departing from the scope and spirit of the present invention.

The functions of the present invention may be realized by an electronic document processing program stored on a storage medium in the form of a disk or a tape. Note that such a storage medium also falls within the scope of the present invention.

Similarly, the functions of the present invention may also be realized by an electronic document processing program stored on the HDD 34 shown in FIG. 1.

Using such a storage medium, it is possible to supply a program for implementing the above-described method of processing a document. This makes it possible to realize the document processing apparatus according to the present invention, on a general-purpose computer or the like.

Various types of storage media may be employed as the storage medium 32. They include a floppy disk, an optical disk, a magnetooptical disk, a magnetic tape, a memory card using a flash memory or the like, and a memory chip.

The program implementing the document processing method according to the present invention may also be supplied via a communication network such as the Internet. This means that the present invention may also be applied to a storage medium used in a program server or used in a communication process.

A storage medium storing document data or video data together with a program for implementing the document processing method according to the present invention is useful in many practical applications.

That is, when electronic document data is supplied to the document processing apparatus 1 via a storage medium, if the program and a video file are supplied together with the electronic document data, it becomes possible for the document processing apparatus to execute the operation of outputting the video data related to the electronic document.

As can be understood from the above description, the present invention has great advantages as described below.

When electronic document data including video data designation information (video tag) is input, video data related to that electronic document data is detected. The video data related to the electronic document data is output in synchronization with or independently of the output of the electronic document data thereby presenting not only the document but also the video data related to the document to a user. This makes it possible to present various kinds of complicated information to the user.

The video data may include a motion image having a large amount of information. The vide data may also include a still image for presenting details of an image to the user.

When a summary generated from electronic document data is output, video data related to the summary may be output together with the summary. This makes it easy for a user to understand the content of the document.

When a document or a summary thereof is read aloud, video data related thereto may be output in synchronization with the reading-aloud operation. This allows the user to understand the content of the document more easily.

When a document being displayed is switched from a part to another part or when a document is displayed in the form of a telop and scrolled or when a document or a summary thereof is read aloud, video data being displayed may be switched in response to the progress of the operation of displaying or reading aloud a telop thereby presenting to the user video data linked in a desirable fashion to the telop being displayed and the reading-out voice being output.

What is claimed is:

1. A document processing apparatus comprising:

an input device;

a display device;

a processor;

a memory device which stores a plurality of instructions, which when executed by the processor, cause the processor to operate with the display device and the input device to:

(a) detect video data designation information attached to electronic document data, the electronic document data including: (i) a first element having a first central activation value used to generate an index; (ii) a second element having a second central activation value used to generate said index; and (iii) read out audio attribute information;

(b) generate a summary of said electronic document data, wherein said generation of said summary includes spreading said first central activation value to said second central activation value;

(c) select video data in accordance with said detected video data designation information;

(d) store a categorization model, the categorization model including a plurality of data categories;

(e) create an automatic categorization based on any one of said video data and electronic document data in accordance with the categorization model;

(f) update the categorization model with the automatic categorization;

(g) control an output of said summary of said electronic document data such that said summary of said electronic data being output is automatically progressed based on at least one of a size of a display area and a length of time displayed;

(h) control an output of said selected video data in correspondence with the output of said summary of said electronic document data such that said selected video data being output is output in synchronization with said progress of the said operation of outputting said summary of said electronic data;

(i) control an output of a read out audio based on read out audio attribute information in said electronic document to synthesize said read out audio; and (j) automatically terminate the output of said video data upon completion of the outputting of said summary of said electronic document data regardless of whether an end of the video data has been reached.

2. The document processing apparatus of claim 1, wherein when executed by the processor, said plurality of instructions cause the processor to operate with the display device to control the outputting of said video data, in synchronization with the progress of the operation of reading aloud said electronic data.

3. The document processing apparatus of claim 1, wherein said video data designation information is attached in the form of tag data to said electronic document.

4. The document processing apparatus of claim 1, wherein said video data is motion image data.

5. The document processing apparatus of claim 1, wherein said video data is still image data.

6. The document processing apparatus of claim 1, wherein before a portion of said electronic document data being output is progressed to not be perceivable, a corresponding portion of said video data is output.

7. The document processing apparatus of claim 1, wherein a portion of said video data corresponding to a portion of said electronic document data is not output before said portion of said electronic document data is progressed to be perceivable.

8. The document processing apparatus of claim 1, wherein the electronic document data being output is displayed at least partly as scrolling text.

9. The document processing apparatus of claim 8, wherein when executed by the processor, said plurality of instructions cause the processor to operate with the display device to output audio data in synchronization with the scrolling of the scrolling text, the audio output including a reading of the scrolling text.

10. The document processing apparatus of claim 1, wherein the categorization model is created on the basis of the categorization that has been manually performed by the user.

11. The document processing apparatus of claim 1, wherein when executed by the processor, said plurality of instructions cause the processor to operate with the display device to create the automatic categorization using a word sense relevance value.

12. The document processing apparatus of claim 1, wherein when executed by the processor, said plurality of instructions cause the processor to operate with the display device to control the outputting of the read out audio by embedding attribute information into a tag file.

13. The document processing apparatus of claim 1, wherein the attribute information includes pronunciation data.

14. A document processing method comprising:

detecting video data designation information attached to electronic document data, the electronic document data including: (i) a first element having a first central activation value used to generate an index; (ii) a second element having a second central activation value used to generate said index; and (iii) read out audio attribute information;

generating a summary of said electronic document data, wherein said generation of said summary includes spreading said first central activation value to said second central activation value;

selecting video data in accordance with said detected video data designation information;

storing a categorization model including a plurality of data categories;

creating an automatic categorization based on any one of said video data and electronic document data in accordance with the categorization model;

updating the categorization model with the automatic categorization;

controlling an output of said summary of said electronic document data such that said summary of said electronic data being output is automatically progressed based on at least one of a size of a display area and a length of time displayed;

controlling an output of said selected video data in correspondence with the output of said summary of said electronic document data such that said selected video data being output is output in synchronization with said progress of the said operation of outputting said summary of said electronic data;

controlling an output of a read out audio based on read out audio attribute information in said electronic document to synthesize said read out audio; and automatically terminate the output of said video data upon completion of the outputting of said summary of said electronic document data regardless of whether an end of the video data has been reached.

15. The document processing method of claim 14, further comprising:

controlling the output of a voice reading aloud said electronic document data; and controlling the outputting of said video data, in synchronization with the progress of the operation of reading aloud said electronic data.

16. The document processing method of claim 14, wherein said video data designation information is attached in the form of tag data to said electronic document.

17. The document processing method of claim 14, wherein said video data is motion image data.

18. The document processing method of claim 14, wherein said video data is still image data.

19. The document processing method of claim 14, wherein before a portion of said electronic document data being output is progressed to not be perceivable, a corresponding portion of said video data is output.

20. The document processing method of claim 14, wherein a portion of said video data corresponding to a portion of said electronic document data is not output before said portion of said electronic document data is progressed to be perceivable.

21. The document processing method of claim 14, wherein creating the automatic categorization uses a word sense relevance value.

22. The document processing method of claim 14, wherein controlling the outputting of the read out audio controls the outputting of said read out audio by embedding attribute information into a tag file.

23. The document processing method of claim 14, wherein the attribute information includes pronunciation data.

24. A storage medium including a computer-controllable program stored thereon, said program comprising the steps of:

detecting video data designation information attached to electronic document data, the electronic document data including: (i) a first element having a first central activation value used to generate an index; (ii) a second element having a second central activation value used to generate said index; and (iii) read out audio attribute information;

generating a summary of said electronic document data, wherein said generation of said summary includes spreading said first central activation value to said second central activation value;

selecting video data in accordance with said detected video data designation information;

storing a categorization model including a plurality of data categories;

creating an automatic categorization based on any one of said video data and electronic document data in accordance with the categorization model;

updating the categorization model with the automatic categorization;

controlling an output of said summary of said electronic document data such that said summary of said electronic data being output is automatically progressed based on at least one of a size of a display area and a length of time displayed;

controlling an output of said selected video data in correspondence with the output of said summary of said electronic document data such that said selected video data being output is output in synchronization with said progress of the said operation of outputting said summary of said electronic data;

controlling an output of a read out audio based on read out audio attribute information in said electronic document to synthesize said read out audio; and automatically terminate the output of said video data upon completion of the outputting of said summary of said electronic document data regardless of whether an end of the video data has been reached.

25. The storage medium including a computer-controllable program stored thereon, according to claim 24, said program further comprising the steps of:

controlling the output of a voice reading aloud said electronic document data; and controlling the outputting of said video data, in synchronization with the progress of the operation of reading aloud said electronic data.

26. The storage medium including a computer-controllable program stored thereon, according to claim 24, wherein said video data designation information is attached in the form of tag data to said electronic document.

27. The storage medium including a computer-controllable program stored thereon, according to claim 24, wherein said video data is motion image data.

28. The storage medium including a computer-controllable program stored thereon, according to claim 24, wherein said video data is still image data.

29. The storage medium including a computer-controllable program stored thereon, according to claim 24, wherein before a portion of said electronic document data being output is progressed to not be perceivable, a corresponding portion of said video data is output.

30. The storage medium including a computer-controllable program stored thereon, according to claim 24, wherein a portion of said video data corresponding to a portion of said electronic document data is not output before said portion of said electronic document data is progressed to be perceivable.

31. The storage medium including a computer-controllable program stored thereon according to claim 24, said program further comprising the step of creating the automatic categorization uses a word sense relevance value.

32. The storage medium including a computer-controllable program stored thereon according to claim 24, wherein said step of controlling the outputting of the read out audio controls the outputting of said read out audio by embedding attribute information into a tag file.

33. The storage medium including a computer-controllable program stored thereon according to claim 24, wherein the attribute information includes pronunciation data.

34. A document processing apparatus comprising:

a detection circuit for detecting video data designation information attached to electronic document data, the electronic document data including: (i) a first element having a first central activation value used to generate an index; (ii) a second element having a second central activation value used to generate said index; and (iii) read out audio attribute information;

a generating circuit for generating a summary of said electronic document data, wherein said generation of said summary includes spreading said first central activation value to said second central activation value;

a video data selection circuit for selecting video data in accordance with said detected video data designation information;

a storage device configured to store a categorization model, the categorization model including a plurality of data categories;

a data categorization circuit for creating an automatic categorization based on any one of said video data and electronic document data in accordance with the categorization model and updating the categorization model with the automatic categorization;

a document output control circuit for controlling an output of said summary of said electronic document data such that said summary of said electronic data being output is automatically progressed based on at least one of a size of a display area and a length of time displayed;

a video output control circuit for controlling an output of said selected video data in correspondence with the output of said summary of said electronic document data such that said selected video data being output is output in synchronization with said progress of the said operation of outputting said summary of said electronic data;

an audio output circuit for controlling an output of a read out audio based on read out audio attribute information in said electronic document to synthesize said read out audio; and wherein said video output control circuit automatically terminates the output of said video data upon completion of the outputting of said summary of said electronic document data regardless of whether an end of the video data has been reached.

35. The document processing apparatus of claim 34, further comprising a voice output control circuit for controlling the output of a voice reading aloud said electronic document data, wherein said video output control circuit controls the outputting of said video data, in synchronization with the progress of the operation of reading aloud said electronic data.

36. The document processing apparatus of claim 34, wherein said video data designation information is attached in the form of tag data to said electronic document.

37. The document processing apparatus of claim 34, wherein said video data is motion image data.

38. The document processing apparatus of claim 34, wherein said video data is still image data.

39. The document processing apparatus of claim 34, wherein before a portion of said electronic document data being output is progressed to not be perceivable, a corresponding portion of said video data is output.

40. The document processing apparatus of claim 34, wherein a portion of said video data corresponding to a portion of said electronic document data is not output before said portion of said electronic document data is progressed to be perceivable.

41. The document processing apparatus of claim 24, wherein creating the automatic categorization uses a word sense relevance value.

42. The document processing apparatus of claim 34, wherein audio output control circuit controls the outputting of the read out audio by embedding attribute information into a tag file.

43. The document processing apparatus of claim 34, wherein the attribute information includes pronunciation data.

* * * * *